US012151625B1

(12) United States Patent
Brown et al.

(10) Patent No.: US 12,151,625 B1
(45) Date of Patent: *Nov. 26, 2024

(54) VEHICLE DRIVE AND CONTROL SYSTEM

(71) Applicant: Hydro-Gear Limited Partnership, Sullivan, IL (US)

(72) Inventors: Alyn G. Brown, Indianapolis, IN (US); K. Mike McCoy, Avon, IN (US); Gregory Barton Moebs, Avon, IN (US); Gregory E. Arends, Fishers, IN (US); Damon J. Hoyda, McCordsville, IN (US); Jesse L. Probst, Strasburg, IL (US); Joseph Hamilton, Ashburn, VA (US); John Tyler Hibbard, Indianapolis, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,654

(22) Filed: Aug. 11, 2023

Related U.S. Application Data

(63) Continuation of application No. 17/822,635, filed on Aug. 26, 2022, now Pat. No. 11,833,985, which is a
(Continued)

(51) Int. Cl.
*B60R 16/023* (2006.01)
*A01D 34/82* (2006.01)
(Continued)

(52) U.S. Cl.
CPC ........ *B60R 16/0231* (2013.01); *A01D 34/824* (2013.01); *A01D 69/02* (2013.01);
(Continued)

(58) Field of Classification Search
CPC .................................................. B60R 16/0231
See application file for complete search history.

(56) References Cited

U.S. PATENT DOCUMENTS

| 5,712,782 A | 1/1998 | Weigelt et al. |
| 6,609,357 B1 | 8/2003 | Davis et al. |
| (Continued) |

FOREIGN PATENT DOCUMENTS

| EP | 1419687 | 10/2006 |
| EP | 1674324 | 5/2014 |
| (Continued) |

OTHER PUBLICATIONS

Alabama Precision AG Extension, Terrain Compensation for Guidance Systems, Auburn University, Jul. 2010, 8 pp.
(Continued)

*Primary Examiner* — David E Martinez
(74) *Attorney, Agent, or Firm* — Neal, Gerber & Eisenberg LLP

(57) ABSTRACT

Vehicle drive and control systems are disclosed. A utility vehicle includes a first electric drive motor configured to drive a first traction wheel, a second electric drive motor configured to drive the a traction wheel, a steering wheel configured to receive a first user input, one or more pedals configured to receive a second user input, a steering input sensor, and a drive input sensor. The steering input sensor is configured transmit a steering input signal that corresponds with a steering input position. The drive input sensor is configured to transmit a drive input signal that corresponds with a drive input position. A plurality of controllers are configured to collectively generate, based on the steering input signal and the drive input signal, a first drive signal to drive the first electric drive motor and a second drive signal to drive the second electric drive motor.

28 Claims, 30 Drawing Sheets

Related U.S. Application Data continuation of application No. 17/176,060, filed on Feb. 15, 2021, now Pat. No. 11,427,203, which is a continuation of application No. 16/445,089, filed on Jun. 18, 2019, now Pat. No. 10,926,768, and a continuation of application No. 16/445,109, filed on Jun. 18, 2019, now Pat. No. 10,919,463.

(60) Provisional application No. 62/686,519, filed on Jun. 18, 2018.

(51) Int. Cl.

| | | |
|---|---|---|
| *A01D 69/02* | (2006.01) | |
| *A01D 69/03* | (2006.01) | |
| *B60K 1/02* | (2006.01) | |
| *B60R 21/13* | (2006.01) | |
| *B60W 10/06* | (2006.01) | |
| *B60W 10/08* | (2006.01) | |
| *B60W 20/50* | (2016.01) | |
| *B60W 30/08* | (2012.01) | |
| *B60W 30/18* | (2012.01) | |
| *B60W 50/14* | (2020.01) | |
| *B62D 11/04* | (2006.01) | |
| *H04L 12/40* | (2006.01) | |
| *A01D 34/66* | (2006.01) | |
| *A01D 101/00* | (2006.01) | |
| *B60K 28/14* | (2006.01) | |
| *B60L 1/00* | (2006.01) | |
| *B60L 15/20* | (2006.01) | |
| *B60L 50/60* | (2019.01) | |
| *B60N 2/00* | (2006.01) | |
| *B60Q 9/00* | (2006.01) | |
| *B60R 21/0132* | (2006.01) | |
| *B60R 21/0136* | (2006.01) | |
| *B60T 17/22* | (2006.01) | |
| *B62D 1/12* | (2006.01) | |
| *H04W 4/80* | (2018.01) | |

(52) U.S. Cl.
CPC .............. *A01D 69/03* (2013.01); *B60K 1/02* (2013.01); *B60R 21/13* (2013.01); *B60W 10/06* (2013.01); *B60W 10/08* (2013.01); *B60W 20/50* (2013.01); *B60W 30/08* (2013.01); *B60W 30/1819* (2013.01); *B60W 50/14* (2013.01); *B62D 11/04* (2013.01); *H04L 12/40013* (2013.01); *A01D 34/66* (2013.01); *A01D 2101/00* (2013.01); *B60K 28/14* (2013.01); *B60L 1/003* (2013.01); *B60L 15/20* (2013.01); *B60L 50/60* (2019.02); *B60N 2/002* (2013.01); *B60Q 9/00* (2013.01); *B60R 21/0132* (2013.01); *B60R 2021/01327* (2013.01); *B60R 21/0136* (2013.01); *B60R 21/131* (2013.01); *B60T 17/22* (2013.01); *B60W 2050/143* (2013.01); *B60W 2050/146* (2013.01); *B60W 2300/156* (2013.01); *B60W 2420/50* (2013.01); *B60W 2420/905* (2013.01); *B60W 2520/105* (2013.01); *B60W 2720/406* (2013.01); *B62D 1/12* (2013.01); *H04W 4/80* (2018.02)

(56) References Cited

U.S. PATENT DOCUMENTS

| | | |
|---|---|---|
| 6,808,032 B2 | 10/2004 | Wuertz et al. |
| 7,154,814 B2 | 12/2006 | Straka |
| 8,207,693 B2 | 6/2012 | Hauser et al. |
| 8,234,026 B2 | 7/2012 | Wyatt et al. |
| 8,434,809 B2 | 5/2013 | Young et al. |
| 9,051,010 B2 | 6/2015 | Young et al. |
| 9,408,343 B2 | 8/2016 | Wyatt et al. |
| 9,764,734 B1 | 9/2017 | Brown |
| 9,794,652 B2 | 10/2017 | Nohra et al. |
| 9,798,451 B2 | 10/2017 | Grevinga et al. |
| 10,058,031 B1 | 8/2018 | Brown et al. |
| 10,150,503 B1 | 12/2018 | Laymon et al. |
| 10,392,007 B1 | 8/2019 | Brown et al. |
| 10,414,436 B1 | 9/2019 | Bonny |
| 10,890,253 B1 | 1/2021 | Probst et al. |
| 10,919,463 B1 | 2/2021 | Brown et al. |
| 10,925,216 B1 | 2/2021 | Brown et al. |
| 10,926,768 B1 | 2/2021 | Brown et al. |
| 11,427,203 B1 | 8/2022 | Brown et al. |
| 2007/0050096 A1* | 3/2007 | Mattes ............... A61G 5/1075 701/1 |
| 2013/0282214 A1* | 10/2013 | Goebel ............... B62D 11/003 701/42 |
| 2014/0053092 A1 | 2/2014 | Grevinga et al. |
| 2015/0039171 A1 | 2/2015 | Koike et al. |
| 2016/0221446 A1* | 8/2016 | Suzuki ................ B60L 58/20 |
| 2017/0120922 A1* | 5/2017 | Schaedler ............ B62D 3/12 |

FOREIGN PATENT DOCUMENTS

| | | |
|---|---|---|
| EP | 2218630 | 12/2016 |
| EP | 2702846 | 11/2018 |
| JP | 5542094 | 7/2014 |
| JP | 5580783 | 8/2014 |
| JP | 6032871 | 11/2016 |
| JP | 2017085814 | 5/2017 |

OTHER PUBLICATIONS

ASI Accelerated Systems Inc., ASi 8000W Controller, Specification Sheet, Date unknown but believed to be published at least as early as Jul. 28, 2016, 1 p.
Control Devices, Specification Sheet, Jun. 18, 2012, 3 pp.
Delta Systems, Advanced Displays, Information Sheet, Date unknown but believed to be at least as early as Feb. 28, 2015, 3 pp.
Gerald, et al., "A new generation of contactless magnetic position sensors," Moving Magnet Technologies, Date unknown but believed to be at least as early as Feb. 28, 2015, 7 pp.
IBM Manual, Synchronous Data Link Control, Fourth Edition, Jun. 1986, 99 pp.
Mandapat, "Development and Evaluation of Positioning Systems for Autonomous Vehicle Navigation," Thesis paper, University of Florida, 2001, 276 pp.
North, et al., "Improved Inertial/Odometry/GPS Positioning of Wheeled Robots Even in GPS-Denied Environments," Global Navigation Satellite Systems—Signal, Theory and Applications, 2012, 23 pp.
Sevcon, Gen4, AC Motor Controller, Data Sheet, Date unknown but believed to be at least as early as Feb. 28, 2015, 2 pp.
Sevcon, Using DVT with Gen4 Systems, Tutorial, Date unknown but believed to be at least as early as Feb. 28, 2015, 11 pp.
Technik, Position Transducers and Rotary Sensors, novotechnik, Siedle Group, Dec. 2000, 36 pp.
U.S. Appl. No. 62/702,086, filed Jul. 23, 2018, 20 pp.

* cited by examiner

VIM I/O
108

- OPERATOR PRESENCE SWITCH OR SENSOR
- ANTI-TIPPING SENSOR
- BRAKE SWITCH OR SENSOR
- REVERSE OPERATING SYSTEM SWITCH OR SENSOR
- LAP BAR NEUTRAL SWITCH OR SENSOR
- BATTERY / VOLTAGE METER
- PTO ON / OFF SWITCH
- PTO RELAY
- KEY ON / OFF SWITCH (START / RUN / OFF)
- STARTER RELAY
- ENGINE KILL RELAY / ENGINE TACH (SPARK COUNT)
- ENGINE OIL PRESSURE WARNING SENSOR
- DRIVE MODE SELECT SWITCH
- ROPS COLLISION SENSOR

FIG. 5

| PIN # | VIM I/O | NOTES |
|---|---|---|
| 1 | GROUND | SYSTEM GROUND (NEGATIVE POST ON BATTERY) |
| 2 | DRIVE MODE (IN) | CONNECTED TO DRIVE MODE SELECTION SWITCH |
| 3 | PTO RELAY (OUT) | PTO SOLENOID ENGAGEMENT |
| 4 | STARTER RELAY (OUT) | STARTER SOLENOID ENGAGEMENT |
| 5 | OPERATOR PRESENCE (IN) | CONNECTED TO SEAT SWITCH |
| 6 | START (IN) | POWER FROM KEY TO START ENGINE |
| 7 | ENGINE KILL RELAY (OUT) | CONNECTED TO ENGINE KILL CIRCUIT |
| 8 | SPARE I/O PIN | |
| 9 | OIL PRESSURE (IN) | OIL PRESSURE SENSOR ON ENGINE |
| 10 | BRAKE ON/OFF (IN) | CONNECTED TO BRAKE SWITCH |
| 11 | PTO ON/OFF (IN) | CONNECTED TO PTO SWITCH |
| 12 | RUN (IN) | POWER SUPPLY FROM KEY TO VIM |

FIG. 6

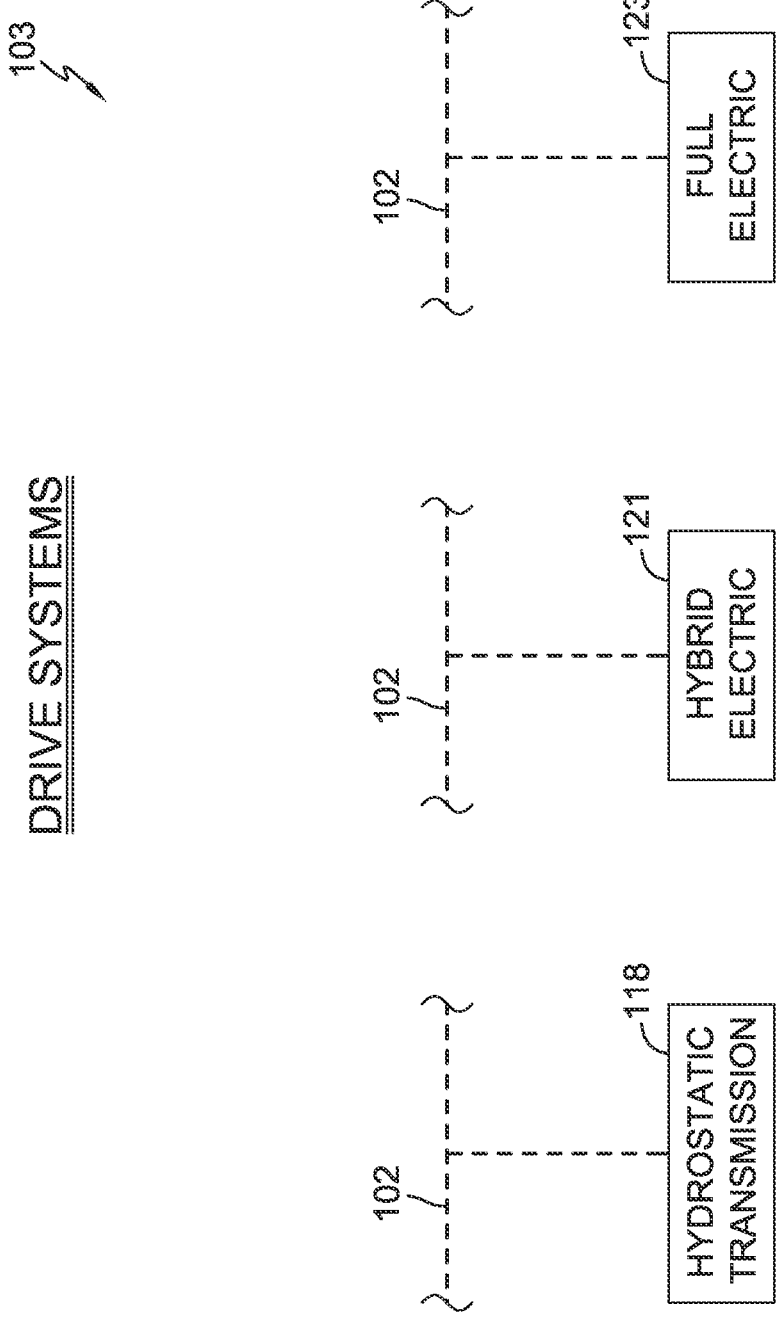

VEHICLE DRIVE AND CONTROL SYSTEM

CROSS-REFERENCE

This application is a continuation of U.S. patent application Ser. No. 17/822,635, filed on Aug. 26, 2022, which is a continuation of U.S. patent application Ser. No. 17/176,060, now U.S. Pat. No. 11,427,203, filed on Feb. 15, 2021, which is a continuation of both U.S. patent application Ser. No. 16/445,089, now U.S. Pat. No. 10,926,768, filed on Jun. 18, 2019, and U.S. patent application Ser. No. 16/445,109, now U.S. Pat. No. 10,919,463, filed on Jun. 18, 2019; both of which claim priority to U.S. Provisional Patent Application No. 62/686,519, filed on Jun. 18, 2018. These prior applications are incorporated by reference herein in their entirety.

TECHNICAL FIELD

The instant disclosure relates to drive and control systems for utility vehicles, including lawnmowers, utility terrain vehicles, all-terrain vehicles, and turf care devices, among others.

BACKGROUND

Utility vehicles exist today in a wide variety of forms and types with lawnmowers being among the most popular. Some utility vehicles are configured as zero turn machines (i.e. vehicles that can turn 360 degrees about a point located midway between a pair of driven wheels having the same axis of rotation and rotating in the same clockwise or counterclockwise sense), such as zero turn radius lawnmowers. Typically, the prime mover for a zero turn radius lawnmower consists of an internal combustion engine. The rotary output from the internal combustion engine is then coupled to a belt and pulley combination and/or a direct shaft link, for turning at least two different drive systems.

The first drive system is usually a belt and pulley combination, or a direct shaft link, that drives a tool, such as a blade system (e.g. the blades of the lawnmower). Other driven tools may include snow blowers, tillers, winches and the like.

The second drive system is usually a belt and pulley combination, or a direct shaft link, that drives a propulsion system, such as a variable speed drive (e.g. hydrostatic, toroidal, friction, CVT or the like) or the generator/alternator of a hybrid propulsion system.

Hydrostatic zero turn propulsion systems are known, including at least two outputs of a transaxle or pair of transaxles that are independently controllable with respect to each other. By independently controlling the first and second transaxle outputs, one can control the operation of the first and second driven wheels.

Although such propulsion systems for zero turn radius vehicles perform their function in a workmanlike manner and provide the basis for operation of a wide variety of highly functional and well received products on the market, room for improvement exists. In particular, room for improvement exists in being able to provide a drive by wire drive and control system for precise electronic control of the propulsion system.

SUMMARY

A drive and control system for a utility vehicle is disclosed, comprising a steering and drive input system, a drive system, a vehicle controller, an electrical power source, and a low voltage CAN-Bus network communicatively coupling all of the foregoing. The steering and drive input system includes a user-manipulated steering and drive input device coupled to an electronic sensor and/or module configured to digitally report user movements of the steering and drive input device in a message posted on the CAN-Bus. The vehicle controller is configured to detect and interpret the message posted on the CAN-Bus, and post a drive output message on the CAN-Bus according to rules and policies programmed into the vehicle controller and CAN-Bus specification. An electronic drive module is configured to detect and interpret the drive output message posted on the CAN-Bus, compute an output control signal based on the drive output message (reflecting the desired movement of the vehicle by the user) as well as the current status, direction, speed, and acceleration of drive output devices, and provide a drive output signal to the drive system that is programmed to a desired vehicle response.

These and other features of the present disclosure will become apparent to those skilled in the art upon a review of the drawings and detailed description contained herein.

BRIEF DESCRIPTION OF THE FIGURES

The description herein makes reference to the accompanying drawings wherein:

FIG. 5 is a representative list of devices that may be connected to the vehicle integration module of the instant disclosure that provide inputs to or receive outputs from the vehicle integration module.

FIG. 6 is a representative pin out list and description for the vehicle integration module.

FIGS. 7, 8, and 9 are schematic views of representative drive systems of the instant disclosure.

DETAILED DESCRIPTION OF THE DRAWINGS

Figure 1:
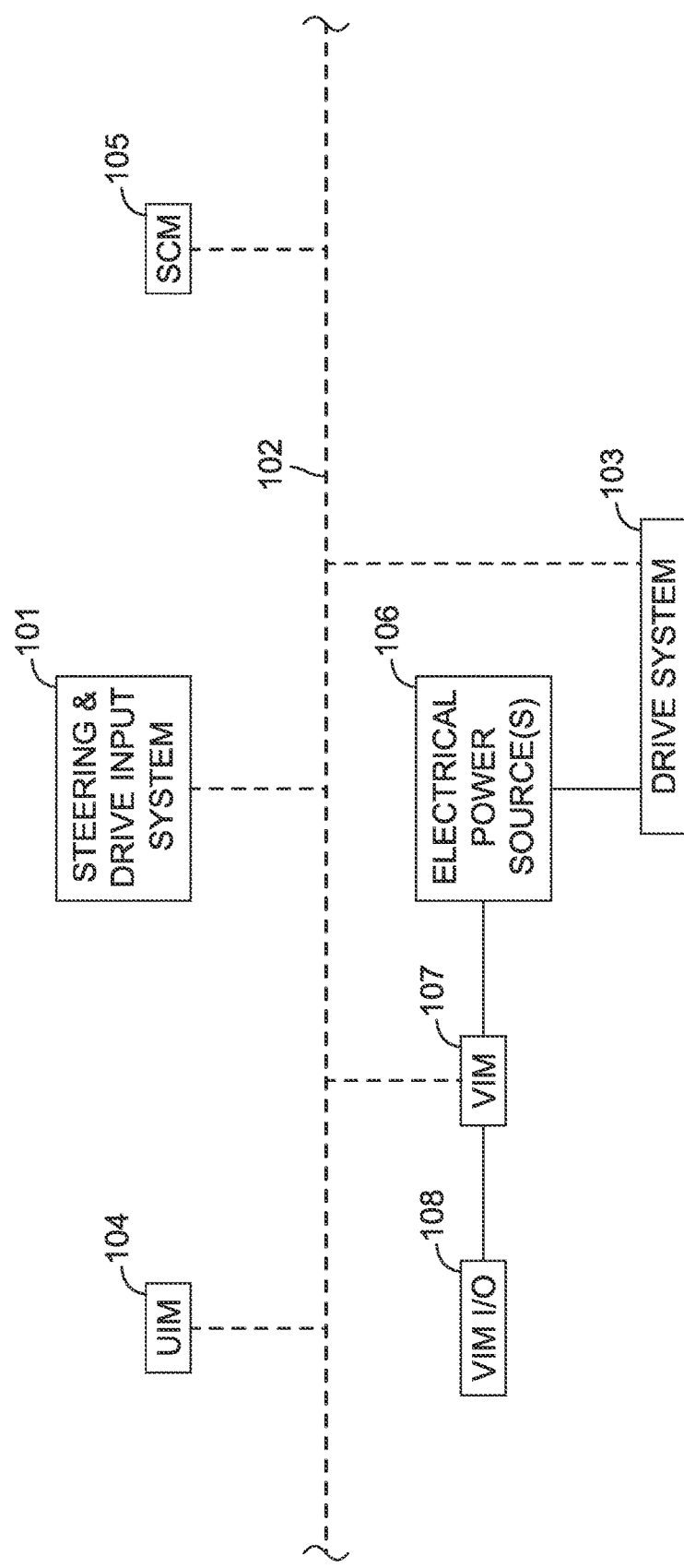
FIG. 1 is a schematic view of a representative vehicle drive and control system of the instant disclosure.

The description that follows describes, illustrates and exemplifies one or more particular embodiments of the present disclosure in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present disclosure is intended to cover all such embodiments that may fall within the scope of the appended claims, either literally or under the doctrine of equivalents.

The present specification is intended to be taken as a whole and interpreted in accordance with the principles of the present disclosure as taught herein and understood by one of ordinary skill in the art. It should be appreciated that any of the features of an embodiment discussed with reference to the figures herein may be combined with or substituted for features discussed in connection with other embodiments in this disclosure.

Disclosed is a vehicle drive and control system that incorporates a vehicle network, such as a CAN-Bus network, to communicate vehicle component health and status messages and to communicate vehicle drive and control commands to the vehicle's drive system and vice-versa. Via a CAN-Bus network, various vehicle components may be connected to one another for communicating and receiving data without being directly connected to one another. Not only does the use of a CAN-Bus simplify vehicle wiring, but the use of a CAN-Bus provides flexibility in positioning hardware components on the vehicle.

The vehicle drive and control system described herein may be adapted to receive user vehicle steering and drive inputs, including vehicle direction, velocity and acceleration commands, from a variety of different steering and drive input devices including one or more input levers such as lap bars, a steering wheel, a joystick, and one or more foot pedals, for example. Such devices may be referred to herein as input devices for simplicity. Similarly, regardless of the actual steering and drive input devices installed on a vehicle, the vehicle drive and control system described herein may be adapted to apply user steering and drive inputs to move the vehicle according to those inputs on a variety of different drive systems including: (1) a hydrostatic transaxle; (2) a hybrid drive system incorporating an internal combustion engine, a generator(s), and an electric drive motor(s); and (3) a fully electric drive system incorporating a battery(s) and an electric drive motor(s) without an internal combustion engine.

In one embodiment, the vehicle drive and control system described herein may be configured to receive user steering and drive inputs from a pair of lap bars, for example, when the user physically moves each lap bar. The vehicle drive and control system of the instant disclosure is configured to interpret the user's physical motion of the lap bars and provide an electronic output command or signal to the vehicle drive system to simulate the user's requested or desired motion of the vehicle, subject to a number of constraints, rules, policies, and the like. In one embodiment, an electronic command or signal representing the physical motion of the lap bars is posted on the CAN-Bus in the form of a CAN-Bus-compatible electronic message for all components connected to the CAN-Bus to receive. A vehicle controller may be configured to receive and interpret the lap bar direction, speed, acceleration, and position data in the message that is posted on the CAN-Bus. Upon interpreting the data, the vehicle controller may be configured to post a drive output command for each driven wheel that simulates the user's movements of the lap bar(s) after assessing vehicle component status and component health messages posted on the CAN-Bus network. In turn, the drive output command or signal may be received and interpreted by a vehicle drive system controller configured to provide a drive output command or signal tailored to drive a particular final drive component, such as a hydrostatic transaxle or an electric drive motor, for example, connected to a driven wheel. In this way, input and output programming for the vehicle controller remains the same regardless of the actual steering and drive input device(s) used by the user and regardless of the actual final drive system on the vehicle.

In some embodiments, physical motion of the vehicle control inputs is not necessary. Instead, user finger, hand, or foot pressure, for example, applied to a control system input device, such as a lap bar, a joystick, a handle, etc., without inducing physical motion of the input device, may be detected by one or more sensors (e.g. a printed force sensitive resistor) on the input device and interpreted by the vehicle drive and control system to control the movement and direction the vehicle. In other embodiments, simultaneous physical motion and pressure applied to an input device may be resolved together by the vehicle controller to result in a drive output command or signal posted in a message on the CAN-Bus network to control the motion of the final drive system.

In one embodiment, the vehicle drive system may include a pair of hydrostatic transaxles, each having an axle shaft configured to drive a wheel connected thereto. To control the direction (i.e. forward and reverse), speed, and acceleration of movement of each axle shaft of the hydrostatic transaxles (and thus each driven wheel), the vehicle drive system may include an electronic drive module (EDM) configured to receive and interpret the desired drive command from the message posted on the CAN-Bus by the vehicle controller, and provide a command to a high speed actuator (HSA) configured to cause movement of the swash plate of the hydrostatic transaxle, or alternatively, a rotatable control shaft of other variable drives (e.g. toroidal, friction, CVT or the like), to achieve the desired direction, speed, and acceleration of the vehicle according to a PID algorithm. The PID algorithm may be selected to reduce the error (i.e., the difference between desired speed, acceleration, and position and the actual speed, acceleration, and position) to zero for each time step in which data is acquired by the electronic drive controller while providing the user with desired vehicle handling and operating characteristics. As described below, a feed forward algorithm may also be employed to achieve desired motion of the vehicle.

Conveniently, as described above, the process by which the user's desired motion of the vehicle and the vehicle's response to the interpreted motion is generally independent of the type of input control device as well as the type of drive system to allow different steering and drive input devices and different final drive systems on a vehicle, thus defining multiple vehicle drive and control permutations. In addition, the vehicle drive and control system of the instant disclosure provides numerous vehicle component parameters that are adjustable or tunable to enable multiple different vehicle handling and operating characteristics for the same vehicle hardware configuration.

Turning now to the figures, FIG. 1 shows a partial schematic of vehicle drive and control systems 100, 200, 300, 400, 500 of the instant disclosure. Drive and control systems 100, 200, 300, 400, 500 include a steering and drive input system 101, a CAN-Bus network 102 (interchangeably used in this disclosure as CAN-Bus 102), a drive system 103, a user interface module (UIM) 104, an optional stability control module (SCM) 105, an electrical power source 106, such as one or more batteries, a vehicle controller 107 (interchangeably used in this disclosure as a Vehicle Integration Module (VIM)), and one or more inputs or outputs to or from the VIM (VIM I/O) 108, generally comprising vehicle sensors, switches, relays and meters, both analog and digital, in communication with the VIM 107. In these embodiments, steering and drive input system 101, drive system 103, UIM 104, optional SCM 105 and VIM 107 are connected to CAN-Bus 102. Drive system 103 and VIM 107 are also each directly connected to electrical power source 106. With this configuration, data messages posted by any component connected to CAN-Bus 102 may be received by any other component connected to CAN-Bus 102. In addition, as discussed more fully below, electrical power is supplied to CAN-Bus 102 via VIM 107 upon activation of a vehicle key switch, such as key switch 162 described below.

Steering and drive input system 101 is configured to receive user steering and drive inputs when the user physically moves or applies pressure to a steering and drive input device(s). Steering and drive input system 101 is configured to interpret the user's physical motion of the steering and drive input device(s) and post a corresponding input command or signal in the form of a message on CAN-Bus 102 for processing by VIM 107.

Figure 2:
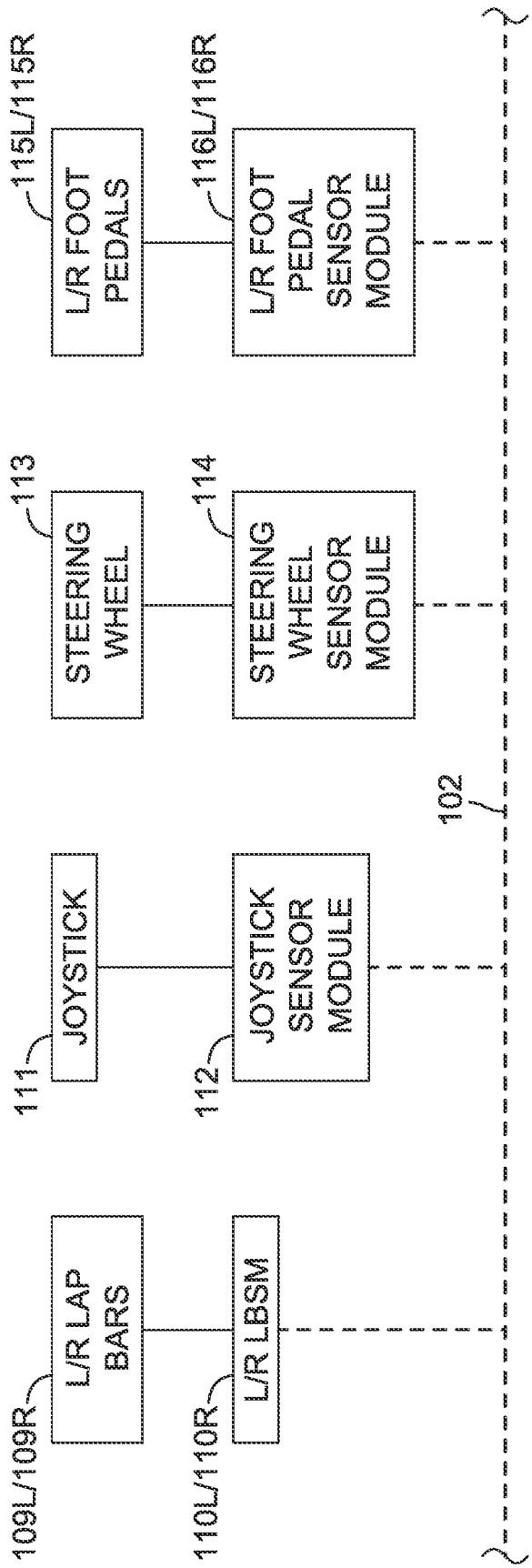
FIG. 2 is a schematic view of representative steering and drive input systems of the instant disclosure.

As shown in FIG. 2, steering and drive input system 101 may include any number of user input devices and systems to receive a user's commands to move (or not move) the vehicle. For example, in one embodiment steering and drive input system 101 may include a pair of lap bars 109L, 109R that may be coupled to a pair of lap bar sensor modules (LBSMs) 110L, 110R, and LBSMs 110L, 110R may be connected to CAN-Bus 102 via a CAN-Bus interface, such as a CAN-Bus T Connection 148, to provide steering and drive input. In another embodiment, steering and drive input system 101 may include a joystick 111 that may be coupled to a joystick sensor module 112, and joystick sensor module 112 may be connected to CAN-Bus 102 to provide steering and drive input. In another embodiment, steering and drive input system 101 may include a steering wheel 113 that may be coupled to a steering wheel sensor module 114, and steering wheel sensor module 114 may be connected to CAN-Bus 102 to provide steering input. For drive input, this embodiment of a steering and drive input system 101 may also include a pair of foot pedals 115L, 115R that may be coupled to a pair of foot pedal sensor modules 116L, 116R, and foot pedal sensor modules 116L, 116R may be connected to CAN-Bus 102. In some embodiments, a vehicle may be configured with multiple steering input options and/or multiple drive input options. For example, a vehicle may include lap bars 109L, 109R connected to LBSMs 110L, 110R for vehicle steering and drive control inputs, as well as a joystick 111 coupled to a joystick sensor module 112 for optional vehicle steering and drive control inputs. These and other steering and drive input devices may be selectively active simultaneously. Any of these or other user steering and drive input devices may operate exclusively of one another, or alternatively may operate in combination with one another, on the same vehicle to provide the user with alternative means to control the vehicle.

Figure 3:
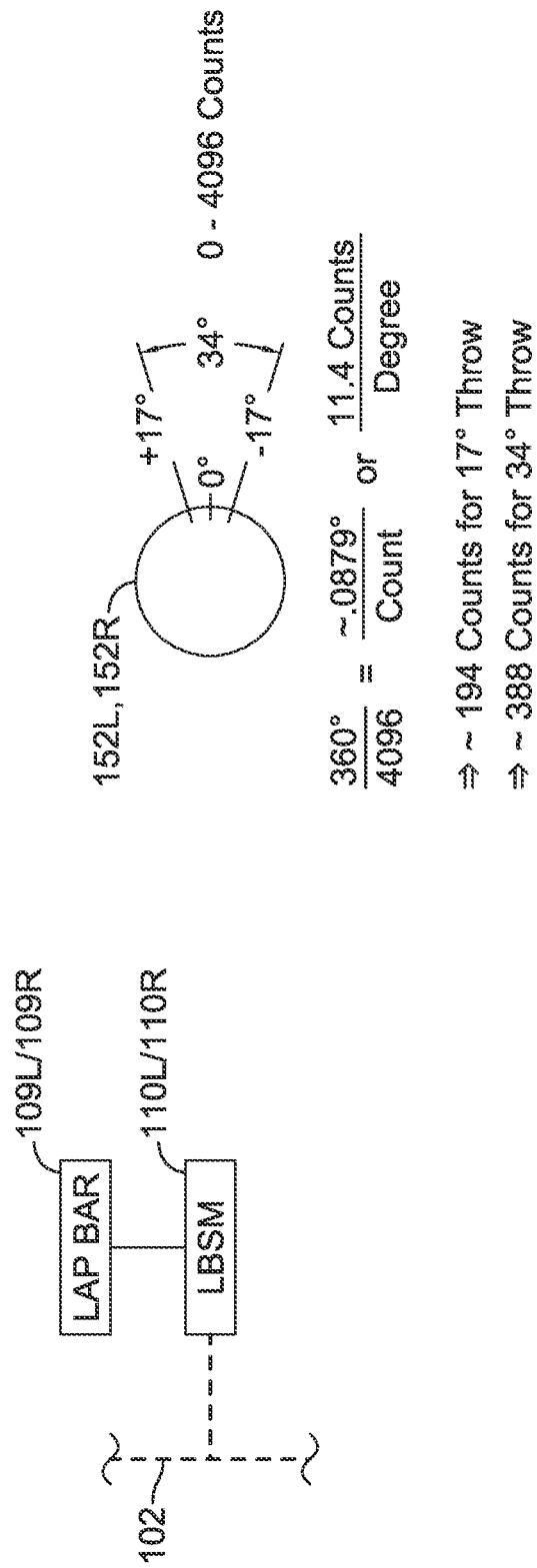
FIG. 3 is a schematic view of a steering and drive input system shown in FIG. 2.

For purposes of this disclosure, steering and drive input system 101 may include the electronic speed control mechanisms, features and functionality described in commonly owned U.S. patent application Ser. No. 15/377,706, filed Dec. 13, 2016, now U.S. Pat. No. 10,414,436, which is incorporated by reference herein in its entirety. As shown in FIG. 3, LBSMs 110L, 110R may include a Hall effect type sensor 152L, 152R for detecting movement of lap bars 109L, 109R. In one embodiment, a suitable Hall effect type sensor 152L, 152R may include an AS5600 microprocessor comprising a 12-bit on-axis magnetic rotary position sensor with analog or PWM output for detecting the absolute angle of a diametrically magnetized on-axis magnet (not shown) positioned in close proximity thereto. In one embodiment, the sensor provides 4096 counts (or 4096 ticks) resolution over 360 rotational degrees of coverage, which provides approximately 0.0879 degrees per count (or approx. 11.4 counts per degree) resolution. In other embodiments, the sensor may provide 1024 counts of resolution. LBSMs 110L, 110R may post detected lap bar movement values in terms of counts, degrees, or both in one or more messages on CAN-Bus 102. LBSMs 110L, 110R may communicate module status, absolute position of the lap bars or other input device, and error codes to other vehicle modules over the CAN-Bus 102.

Figure 10:
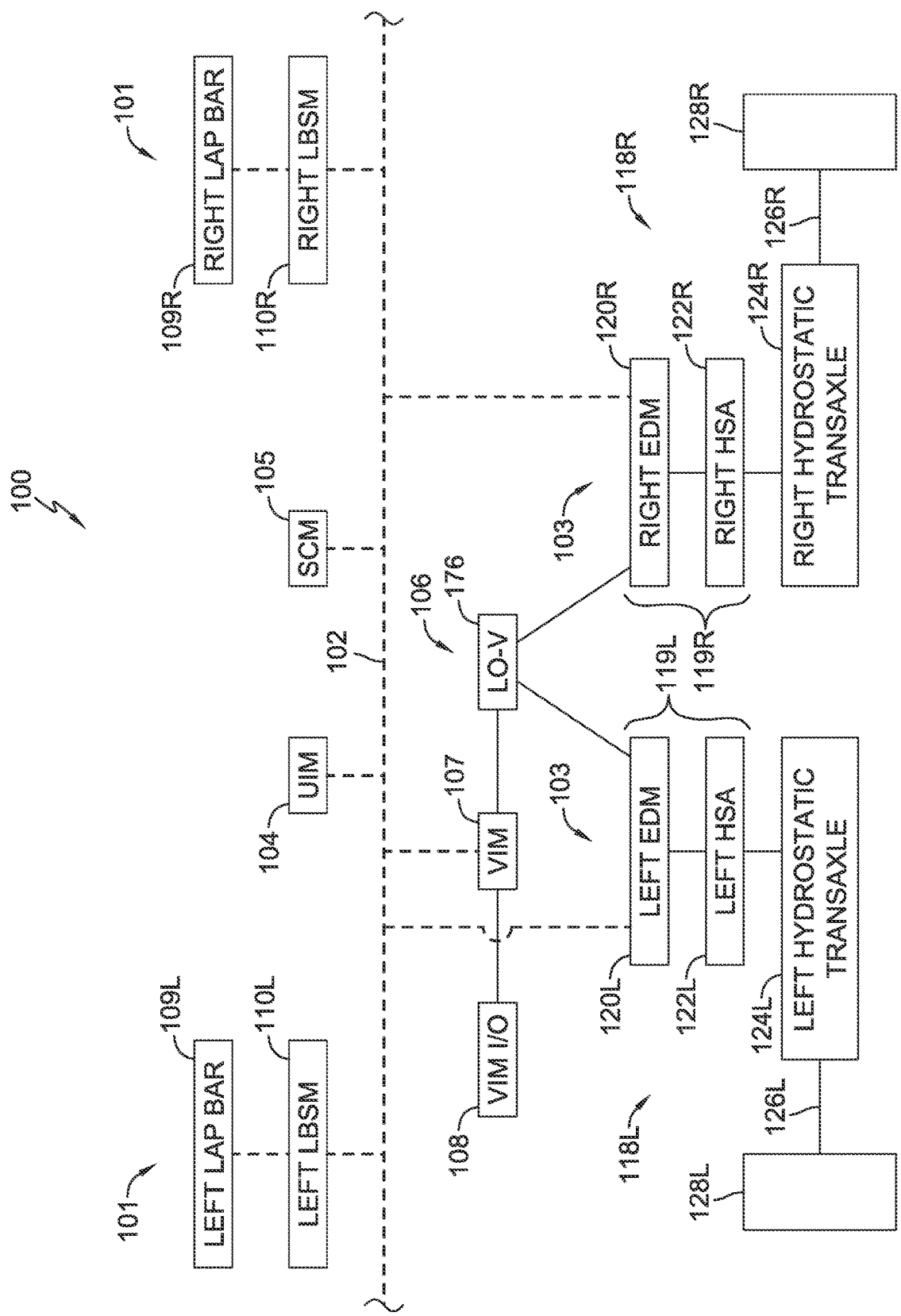
FIGS. 10, 10A, 10B, and 10C are schematic views of representative vehicle drive and control systems of the instant disclosure.

Because LBSMs 110L, 110R may be electrically connected to CAN-Bus 102 on the input end and hydrostatic transaxles 124L, 124R (for example), through a cooperating HSA 122L, 122R and EDM 120L, 120R, may be electrically connected to CAN-Bus 102 on the drive end (as shown in FIG. 10), physical limits or stops in the hydrostatic transaxle that limit the amount of angular movement of the swash plate (e.g. an interference between the swash plate and the surrounding housing of a hydrostatic transaxle 124L, 124R) must be taken into account during setup of steering and drive input system 101 to prevent damage to such components.

In one embodiment, and by way of example only, LBSMs 110L, 110R may be nominally configured to detect +/−17 degrees of movement (or approximately 34 degrees total), forward and aft of the neutral (no drive) position of the left and right lap bars 109L, 109R. This range of movement would preferably be associated during setup with a range of motion for the swash plate wherein an interference with another internal transaxle component is prevented. For example, if +/−15 degrees of swash plate rotation away from neutral produces an interference, EDM 120L, 120R can be programmed to restrict movement of the swash plate to +/−14 degrees of rotation (applying a 0.93 scaler), and such restricted motion can be mapped across all +/−17 degrees of movement for the left and right lap bars 109L, 109R. Similarly, other suitable swash plate rotations may be associated with the full range of lap bar motion. In one embodiment, swash plate rotation in either the forward or reverse sense may be reduced to 70 percent of available rotation (stroke). Alternatively, stroke in only the reverse sense may be appreciably reduced, for example, to 50 percent of available output as a safety factor.

Conversely, one can mechanically restrict the movement of lap bars 109L, 109R with stops or gates such that the outputs of the LBSMs 110L, 110R are less than the calibrated full ranges. In other embodiments, if the swash plate of the hydrostatic transaxle's pump can physically move +/−20 degrees or more, for example, the left and right LBSMs 110L, 110R may be programmed to detect and register lap bar movement to the full extent of motion physically permissible by the lap bar and map that to the pump's full mechanical stroke.

Similar to scaling swash plate rotation through programming of the EDM 120L, 120R, scaling the LBSM-detected data by LBSMs 110L, 110R may provide an alternative to mechanically-imposed limitations. For example, 17 degrees of actual lap bar movement may be converted and/or interpreted by LBSMs 110L, 110R as only a 15 degree lap bar movement by applying a 0.88 (or 88 percent) scaler to the raw data received by the LBSMs 110L, 110R before posting that data to CAN-Bus 102. In other embodiments, if left and right LBSMs 110L, 110R detect approximately 10 degrees of forward motion by each of the left and right lap bars 109L, 109R, LBSMs 110L, 110R may be programmed to scale that data up to approximately 15 degrees. In this way, the left and right lap bars 109L, 109R and left and right LBSMs 110L, 110R may be tuned to provide desired feel to the user.

In operation, if a user moves both lap bars 109L, 109R forward approximately 5 degrees, for example, the left and right LBSMs 110L, 110R may be configured to detect that movement and output approximately 60 counts (or ticks) in the form of a message posted on CAN-Bus 102. In some embodiments, instead of counts or ticks posted in the message, the counts or ticks may be converted to an angle and the angle may be contained in the message. Messages may be posted at any interval useful for a vehicle system to function properly. For example, vehicle component status and health messages posted on CAN-Bus 102 may be posted in 100 millisecond intervals. By contrast, vehicle steering and drive input and data messages may be posted to CAN-Bus 102 in 8 millisecond intervals to ensure drive system 103 can operate smoothly and react quickly to the user's steering and drive inputs. In other embodiments, any frequency other than 8 milliseconds or 100 milliseconds may be utilized.

A CAN-Bus compatible message can contain a certain number of bits for the address as well as the priority of the message to provide 8 bytes of data. In general, in this configuration, each of the 8 bytes in each of the 8 millisecond messages posted on CAN-Bus 102 may be full with information, while a secondary message posted at 100 millisecond intervals may include any additional information that a component like VIM 107 may need for decision-making purposes. For example, the 100 millisecond messages may include raw LBSM angle data for comparison against the 8 millisecond count data. A tertiary message posted at another interval may also be used by VIM 107.

Vehicle controller (VIM) 107 may include a microprocessor, non-volatile memory, one or more data I/O ports, and a CAN-Bus interface for communicating data to and from CAN-Bus 102. In some embodiments, VIM 107 includes or is connected to a Bluetooth module, a near-field communications module, a Wi-Fi router, a cellular transceiver, and/or a satellite transceiver for communicating with a remote device, such as a portable communications device or a web server. VIM 107 may be configured to monitor vehicle and safety interlock status via messages received on CAN-Bus 102 or via one or more VIM I/O 108 and to respond to changes in status as needed. For example, VIM 107 may monitor data packets from other modules connected to CAN-Bus 102 and initiate a vehicle fail-safe mode if multiple data packets are lost or corrupted. VIM 107 may be configured to monitor, receive, and interpret requested steering and drive commands, such as requested direction, speed, acceleration, and position data, in the message(s) that are posted on the CAN-Bus 102. VIM 107 may be configured to provide a drive output command or signal in the form of a message(s) tailored to drive a particular final drive component of drive system 103, such as a hydrostatic transaxle or an electric drive motor, for example, connected to a driven wheel. One possible configuration of a VIM 107 and its operation is described in more detail below.

Figure 4:
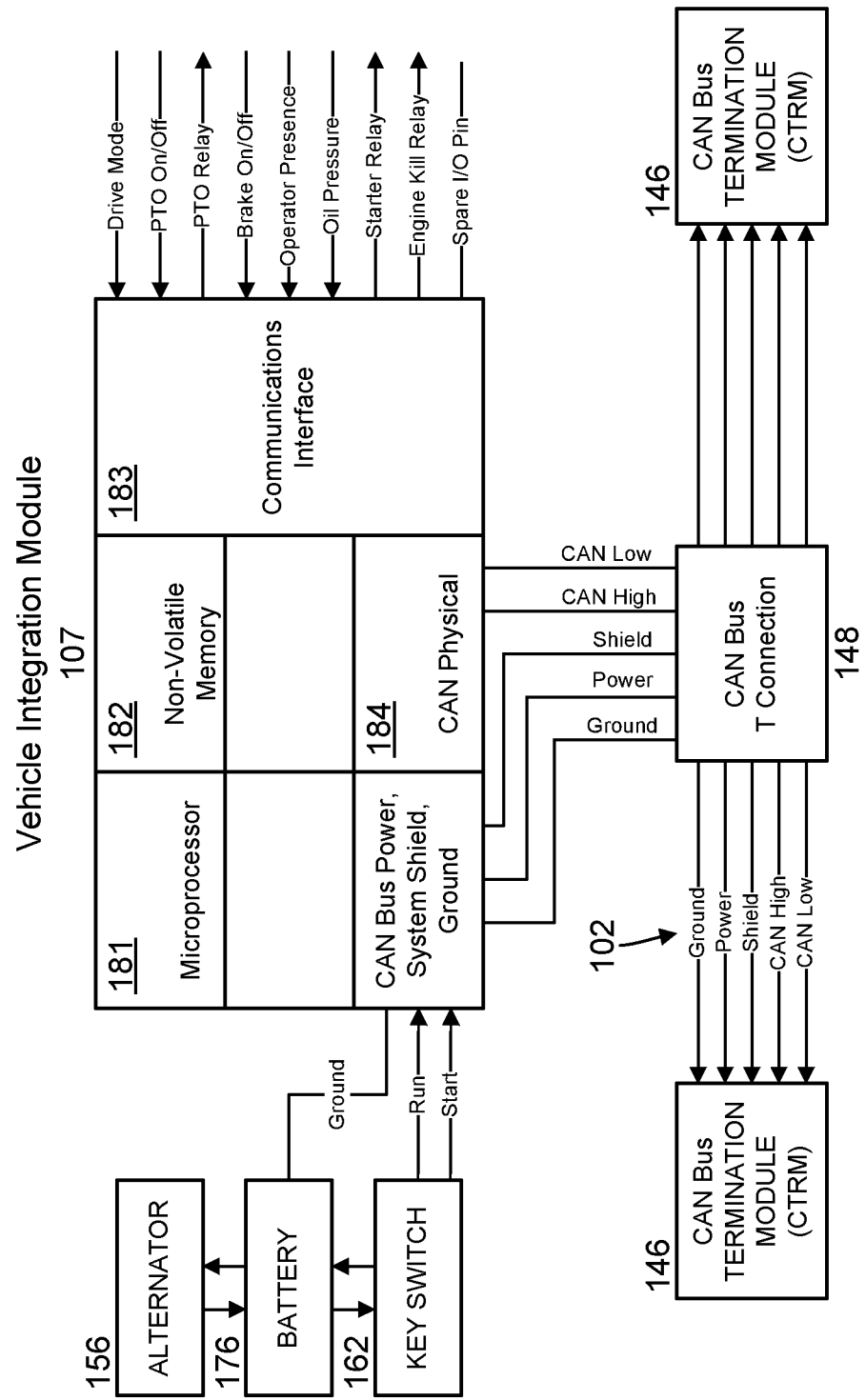
FIG. 4 is a schematic view of an embodiment of a vehicle integration module of the instant disclosure.

Turning to FIG. 4, a representative VIM 107 is shown in more detail and in one exemplary configuration for use with a vehicle with, for example, an internal combustion engine 191 and a battery 176. VIM 107 may include a DC to DC power supply, microprocessor-based control board, and input/output bus housed in a rugged enclosure, and may be configured to operate on a 12V power source. The VIM 107 may include microprocessor 181, non-volatile memory 182, one or more I/O terminals, pins or ports on a communications interface 183 for one or more VIM I/O 108, and CAN-Bus interface 184. The VIM 107 may be configured to communicate information to UIM 104 via CAN-Bus 102. Alternatively, VIM 107 may be configured to enable one or more display modules or devices to be plugged into one or more ports of the VIM 107 to enable a user to interface with the VIM 107. The VIM 107 may be configured to receive commands, such as module status signals, and process those signals within 5 ms of reception. The VIM 107 may be configured to transmit data, such as system safety data, or retransmit data, such as operator inputs, such that the transmitted or retransmitted data is not more than 5 ms old at the time of transmission.

Like one or more of the components connected to CAN-Bus 102, the VIM 107 is configured to receive each and every message posted on CAN-Bus 102. Assuming VIM 107 "sees" each of the components of the vehicle (according to the CAN-Bus specification described below) and receives LBSM commands for a user requested direction, speed, and acceleration for the vehicle, VIM 107 may be configured to combine the left and right LBSM messages into a single drive message containing left and right drive commands. The single message is expandable to include front left and right drive systems as well as rear left and right drive system commands if the vehicle has front wheel drive and rear wheel drive. The message is further expandable to accommodate any member of drive systems on the vehicle. While discussion herein primarily references user inputs in the form of LBSM commands posted to CAN-Bus 102, it will be understood that messages posted on CAN-Bus 102 by other user input devices comprising steering and drive input system 101 may similarly be translated into left and right drive commands by VIM 107.

Each electrical component of the vehicle that is connected to CAN-Bus 102 may be defined by a unique address to identify the component on the CAN-Bus network. This unique address, also known as a "CAN ID," allows arbitration of all messages posted on the CAN-Bus 102 network. In this way, VIM 107 may be able to determine which component is posting messages on CAN-Bus 102 and determine what to do next. For example, VIM 107 may be configured to know that messages having CAN IDs that correspond with LBSMs 110L, 110R should be processed so as to output and post on CAN-Bus 102 a drive output message that can be read by the electronic controller associated with drive system 103, assuming all component health and status messages, for example, are deemed acceptable by VIM 107.

Individual components of drive system 103 may be configured to identify which messages posted on CAN-Bus 102 are a drive message, and with respect to left and right drive components, whether a portion of the message applies to it. More particularly, a CAN-Bus specification lists each and every message, the type of message, and identifies its purpose, among other things. The CAN-Bus specification lists each and every tunable parameter of each and every tunable component that is connected to CAN-Bus 102, and stores this data in the code of the microprocessor of each such component or on memory associated with each such component.

As shown in FIG. 5, one or more VIM I/O 108, both analog and digital, may include one or more devices that are electrically coupled to VIM 107. For example, VIM I/O 108 may include a drive mode selection switch, a PTO selection switch, a PTO relay, a brake switch or sensor, an operator presence switch or sensor, an engine oil pressure sensor, a starter relay, an engine kill relay, a vehicle anti-tipping sensor, a Roll-Over Protective Structure (ROPS) collision sensor, a reverse operating switch or sensor, a battery/volt meter, a key "On/Off" switch, left and right lap bar neutral switch or sensor to verify stowed (disengaged) or unstowed (engaged) positions of left and right lap bars, left and right transaxle neutral position sensors, and left and right transaxle output speed sensors. VIM 107 via communications interface 183 may include one or more additional I/O terminals, pins, or ports to connect additional VIM I/O 108. In some embodiments, VIM 107 may be configured to infer engine speed by counting the number of ignition sparks detected over a period of time on the engine kill relay wire. VIM 107 may use engine speed data to confirm that the engine is running (or not running) as part of commanding and verifying safe operation of the vehicle.

The number and type of devices connected to VIM I/O 108 and the associated inputs and outputs may be different for, and/or tailored to, different vehicles depending on the configuration of each particular vehicle. For example, a vehicle that is configured with a hydrostatic drive system 118 (as described below) may be coupled to an internal combustion engine 191 for vehicle propulsion purposes Thus, VIM I/O 108 in this case may include engine-related inputs and outputs, among others. By contrast, a fully electric drive system 123 that is coupled to a high voltage battery 375 for vehicle propulsion purposes may include battery-related inputs and outputs and omit any engine-related inputs and outputs. As shown in FIG. 12B, for example, exemplary inputs to VIM I/O 108 for a fully electric drive system 123 include a key "On/Off" switch or "start/run" signal from key switch 162, a drive mode selection switch, a PTO selection switch, a blade auxiliary boost input, a brake switch or sensor, an operator presence switch or sensor, a vehicle anti-tipping sensor, a Roll-Over Protective Structure (ROPS) collision sensor, a reverse operating switch or sensor, a battery/volt meter, left and right lap bar neutral switch or sensor to verify stowed (disengaged) or unstowed (engaged) positions of left and right lap bars, and left and right transaxle output speed sensors.

FIG. 6 shows one embodiment of an exemplary 12-pin assignment to couple one or more VIM I/O 108 to communications interface 183 of VIM 107. For example, pin 1 may be connected to a ground wire connected to the negative terminal on electrical power source 106. Pin 2 may be connected to a drive mode selection switch. Pin 3 may be connected to a PTO relay that is connected to a PTO engagement solenoid. Pin 4 may be connected to a starter relay that is connected to a starter solenoid. Pin 5 may be connected to an operator presence sensor or switch. Pin 6 may be connected to key switch 162 and configured to detect user selection of the key switch 162 in the engine start position. Pin 7 may be connected to an engine kill relay that is connected to a magneto kill line on the engine. Pin 8 may be an unused, spare terminal. Pin 9 may be connected to an oil pressure sensor that is connected to the engine. Pin 10 may be connected to a brake sensor or switch to detect activation of a vehicle braking system. Pin 11 may be connected to a PTO selection sensor or switch that reports selection/deselection to the VIM 107 of a selected PTO device. Pin 12 may be connected to key switch 162 and configured to detect user selection of the key switch 162 in the engine run position. VIM 107 may be configured with more or fewer input/output terminals, pins or ports of communications interface 183 than that shown in FIG. 6. In addition, the one or more VIM I/O 108, as listed in FIG. 5, may be assigned to different pins than that shown in FIG. 6.

Optional stability control module (SCM) 105 may include memory and a microprocessor configured to receive direction, motion, and/or attitude data corresponding to the vehicle direction (e.g., magnetic heading), motion (e.g., speed and acceleration), and/or attitude (e.g. pitch—up/down, roll—left/right, and/or yaw—left/right). SCM 105 may be configured to provide stability control and related features and benefits, including straight line tracking, wheel slip and traction control, hillside stability and rollover protection. SCM 105 may include some or all of the features and functionality described in U.S. patent application Ser. No. 15/707,869, filed Sep. 18, 2017 as a continuation-in-part of U.S. Pat. No. 9,764,734, and issued as U.S. Pat. Nos. 10,392,007, and 10,058,031, all of which are commonly owned and are incorporated by reference herein in their entirety. As discussed more fully below, SCM 105 may include an Inertial Measurement Unit (IMU) module configured to provide real-time, continuous vehicle direction, motion, and attitude data in messages posted on the CAN-Bus 102 for processing by the VIM 107.

User interface module (UIM) 104 may include a display screen, a touch screen, or any other user interface to receive user input and/or to display or communicate system or component function, status, or other data to the user. For example, UIM 104 may be configured to display vehicle system level or component level status messages that are posted on CAN-Bus 102. The vehicle system level or component level status messages may include, for example, on/off status, engaged/disengaged status, settings, or parameters, of a particular component, assembly, or system of the vehicle, whether generated by steering and drive input system 101 or one or more components thereof, drive system 103 or one or more components thereof, UIM 104, SCM 105, VIM 107, one or more VIM I/O 108 or any other components on the vehicle or remotely (wired or wirelessly) connected to the vehicle. UIM 104 may include a microprocessor, memory, and appropriate input/output devices for communicating data to and from UIM 104 and CAN-Bus 102 and for displaying application software on one or more display screens to the user.

Turning to FIGS. 7, 8, and 9, various embodiments of a drive system 103 are shown connected to CAN-Bus 102. In one embodiment, drive system 103 may include a hydrostatic drive system 118 that is powered mechanically by a prime mover, such as internal combustion engine 191, and powered electrically by an electrical power source 106, such as battery 176. As discussed more fully below, FIG. 10 discloses an embodiment of a hydrostatic drive system 118 including left and right hydrostatic drive systems 118L, 118R, each including a hydrostatic transaxle 124L, 124R coupled to a high speed electric actuator (HSA) 122L, 122R and an electronic drive module (EDM) 120L, 120R for driving drive wheels 128L, 128R. Each hydrostatic drive system 118L, 118R may include a CAN-Bus interface for communicating data to and from CAN-Bus 102. In another embodiment, drive system 103 may include a hybrid electric drive system 121 that is powered mechanically by a prime mover, such as internal combustion engine 191, and powered electrically by an electrical power source 106, such as battery 275, and/or by a generator, such as generator 287. As discussed more fully below, FIG. 10A discloses an embodiment of a hybrid electric drive system 121 including left and right hybrid electric drive systems 121L, 121R, each including an electric transaxle 217L, 217R coupled to an electronic controller 220L, 220R for driving drive wheels 228L, 228R. Each hybrid electric drive system 121L, 121R may include a CAN-Bus interface for communicating data to and from CAN-Bus 102. Commonly owned U.S. Pat. No. 10,150,503 discloses various embodiments of a hybrid electric drive system and is incorporated herein by reference in its entirety. In yet another embodiment, drive system 103 may include a fully electric drive system 123 that is powered electrically by an electrical power source 106, such as battery 375. As discussed more fully below, FIG. 10B discloses an embodiment of a fully electric drive system 123 including left and right electric drive systems 123L, 123R, each including an electric transaxle 217L, 217R coupled to an electronic controller 220L, 220R for driving drive wheels 228L, 228R. Each electric drive system 123L, 123R may include a CAN-Bus interface for communicating data to and from CAN-Bus 102. Commonly owned U.S. Pat. No. 9,408,343 discloses various embodiments of an electric drive system and is incorporated herein by reference in its entirety.

Referring to FIGS. 10, 11, 12, and 13, embodiments of drive and control system 100 are shown configured with left and right lap bars 109L, 109R, left and right LBSMs 110L, 110R. VIM 107, SCM 105, UIM 104, electrical power source 106, VIM I/O 108, and left and right hydrostatic drive systems 118L, 118R. Left and right hydrostatic drive systems 118L, 118R include left and right EDMs 120L, 120R, left and right HSAs 122L, 122R, left and right hydrostatic transaxles 124L, 124R, drive axles 126L, 126R, and drive wheels 128L, 128R. In some embodiments, left and right EDMs 120L, 120R may be packaged separately from the left and right hydrostatic transaxles 124L, 124R. In some embodiments, left and right EDMs 120L, 120R may be integrated with or otherwise packaged together with respective left and right HSAs 122L, 122R, and the left HSA-EDM 120L/122L and right HSA-EDM 120R/122R integrated/packaged assemblies (designated as HSA-EDMs 119L, 119R) may be supported by respective left and right hydrostatic transaxles 124L, 124R. Commonly owned U.S. patent application Ser. No. 15/944,571, filed Apr. 3, 2018, the contents of which are incorporated herein by reference in their entirety, describes a hydrostatic drive system including left and right hydrostatic transaxles coupled to respective high speed actuators with integrated electronic drive modules (HSA-EDMs).

Figure 11:
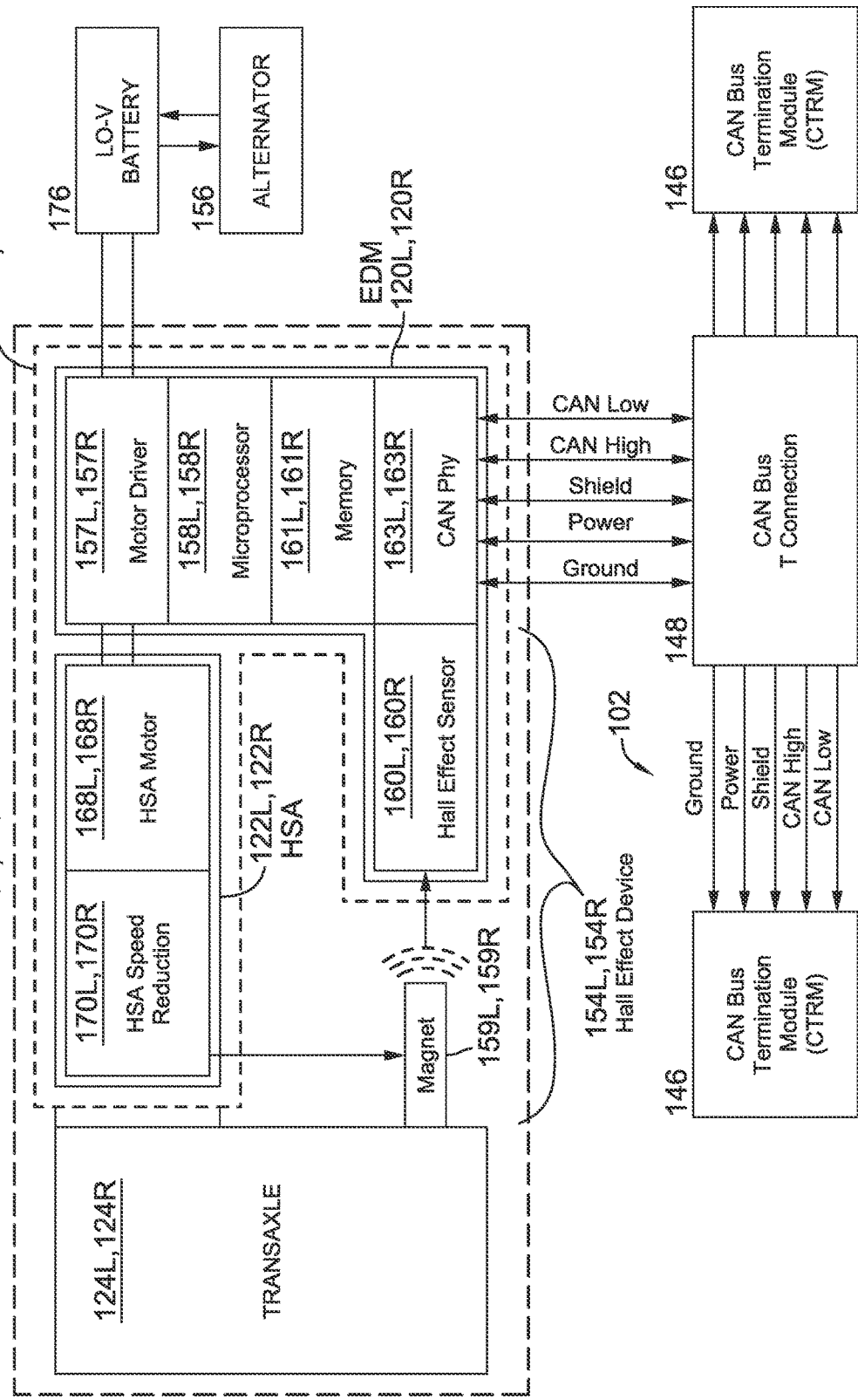
FIG. 11 is a schematic view of an aspect of the vehicle drive and control system shown in FIG. 10.

FIG. 11 shows a detailed schematic view of hydrostatic drive systems 118L, 118R coupled to CAN-Bus 102. Respective EDMs 120L, 120R include a microprocessor 158L, 158R, non-volatile memory 161L, 161R, HSA motor driver 157L, 157R, CAN-Bus interface 163L, 163R, and Hall effect sensor 160L, 160R. Left and right EDMs 120L, 120R of hydrostatic drive system 118L, 118R are connected to and receive electrical power from electrical power source 106 via respective HSA motor drivers 157L, 157R. In addition, left and right EDMs 120L, 120R are connected to CAN-Bus 102 via respective CAN-Bus interfaces 163L, 163R to communicate messages to and from CAN-Bus 102. Left and right EDMs 120L, 120R are connected to left and right HSAs 122L, 122R, respectively. More specifically, respective left and right HSA motor drivers 157L, 157R are electrically connected to respective left and right HSA motors 168L, 168R. Left and right HSA motors 168L, 168R are connected via a worm gear to respective left and right speed reduction gearing 170L, 170R, which are connected to left and right hydrostatic transaxles 124L, 124R, respectively.

In operation, left and right EDMs 120L, 120R may monitor data packets or messages from other modules connected to CAN-Bus 102 and initiate a vehicle fail-safe mode if multiple data packets are lost or corrupted. Left and right EDMs 120L, 120R are configured to respond to speed, drive commands and diagnostic requests received over CAN-Bus 102. For example, when a drive message is posted on CAN-Bus 102 from VIM 107, each of the left and right EDMs 120L, 120R are configured to look for that message based on the sender's CAN ID (in this case the ID corresponding to VIM 107) and according to the CAN ID associated with the left and right EDM 120L, 120R, respectively. Upon detecting that the message includes a drive command, each EDM 120L, 120R may be configured to: (1) determine the current direction of motion, speed, and acceleration of respective drive axles 126L, 126R or a transaxle component associated therewith or connected thereto, (2) determine if any difference exists between those values and the corresponding values in the incoming drive message and (3) if a difference exists beyond a predetermined threshold value, the respective left and right EDMs 120L, 120R may individually compute a new drive output command to the respective left and right HSAs 122L, 122R according to a motion profile PID algorithm selected to make up the difference while achieving a vehicle feel and operability desired by the user. For example, if the difference is large, rather than outputting an equivalent to a "maximum acceleration" to close the difference quickly, the PID algorithm may be selected to close the difference to zero by slowly ramping up the acceleration to avoid throwing the user off the vehicle. The PID algorithm may also incorporate a feed-forward (F) algorithm to better predict the needed target output. The drive and control system 100 of the instant disclosure may be configured to simulate the operation and feel to the user of any OEM utility vehicle by simulating the operation and feel of a non-drive-by-wire OEM vehicle using the tunable parameters discussed herein.

Each EDM 120L, 120R may be configured to continuously compare actual actuator positions to the operator requested positions and drive respective HSAs 122L, 122R to the commanded positions using the motion profile PID algorithm based on tunable parameters stored in the non-volatile memory of each EDM 120L, 120R.

Figure 13:
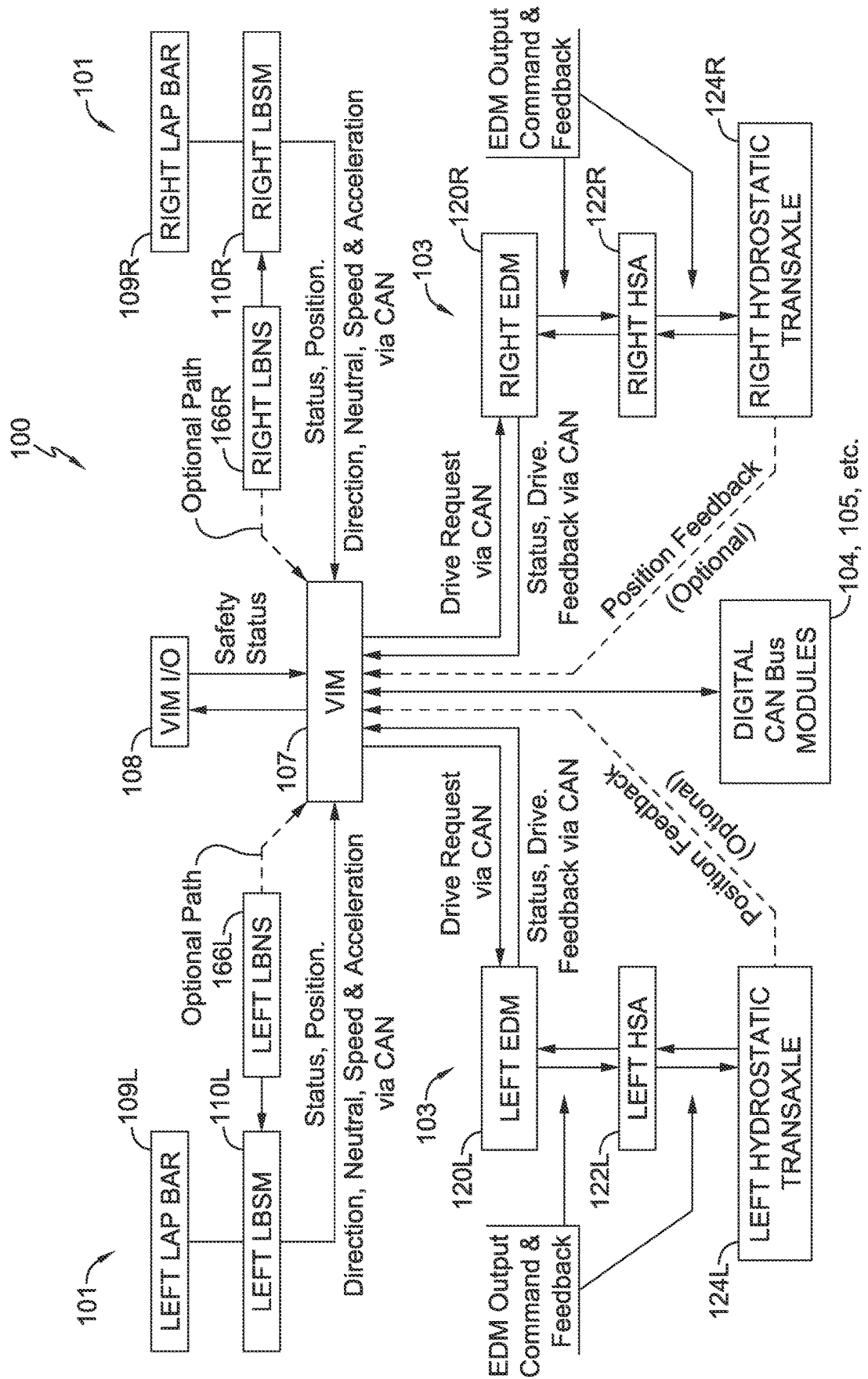
FIG. 13 is a schematic view of another aspect of the vehicle drive and control system shown in FIG. 10.

To determine the current drive system direction of rotation, speed, and acceleration, each of the left and right hydrostatic drive systems 118L, 118R may be configured to include a Hall effect device 154L, 154R to detect direction of rotation, speed, and acceleration of a rotating component associated with each of the hydrostatic transaxles 124L, 124R. Such rotating component may be, for example, the trunnion arm or trunnion control shaft, or a component associated with speed reduction gearing 170L, 170R positioned between HSA motors 168L, 168R of HSAs 122L, 122R and the trunnion control shaft, for example. The Hall effect device 154L, 154R may include a Hall effect sensor 160L, 160R and a polarized magnet 159L, 159R. The Hall effect sensor 160L, 160R may be positioned on a printed circuit board associated with each EDM 120L, 120R, and the polarized magnet 159L, 159R may be positioned in close proximity to the Hall effect sensor 160L, 160R and mounted on, for example, an end of the trunnion arm or on the speed reduction gearing 170L, 170R. In operation, the Hall effect sensor 160L, 160R may detect changes in the magnetic field of the polarized magnet 159L, 159R as the trunnion control arm (or speed reduction gearing if applicable) rotates to move the swash plates of the respective hydrostatic transaxles 124L, 124R to drive the drive axles 126L, 126R to a desired direction of rotation, speed, and acceleration. The detected changes in the magnetic field correspond to a voltage that is communicated to the microprocessor 158L, 158R of the respective EDMs 120L, 120R. Based on the reported voltage, the microprocessor 158L, 158R may determine the difference between the user input commands (received in messages posted on the CAN-Bus 102 from the VIM 107) and the current swash plate angle (and potentially the rate of change of the swash plate angle) of the hydrostatic transaxles 124L, 124R from which the direction of rotation, speed, and acceleration of the drive axles 126L, 126R may be inferred. In some embodiments, a sensor, such as a Hall effect sensor, may also be positioned on or near the gear train of the respective hydrostatic transaxles 124L, 124R to provide added assurance that the movement of the gear train, drive axles 126L, 126R and/or other components in the hydrostatic drive system 118L, 118R: (1) corresponds with the commanded swash plate angle, and optionally, (2) corresponds with other safety-related inputs received by VIM 107 to justify continued movement of the vehicle. To do this, the voltage output from this sensor may be posted directly on the CAN-Bus 102 for receipt and processing by VIM 107. Alternatively or additionally, as shown in FIG. 13, respective left and right hydrostatic transaxle position feedback sensors may be connected via dedicated electrical paths to respective I/O terminals, pins or ports of communications interface 183 of VIM 107 for receipt and processing of the sensor output voltage by VIM 107. Using the sensor output voltage, VIM 107 may verify actual motion against expected motion of one or more drive output component(s) in the gear train of the hydrostatic transaxles 124L, 124R as discussed above as well as confirm that the sensor voltage output lies within expected values and corresponds with safety-related messages received by VIM 107 via CAN-Bus 102 or via analog or digital inputs received via one or more terminals, pins or ports on communications interface 183 from one or more VIM I/O 108.

The proximity to one another and configuration of drive system 103 components on either the left or right sides of the drive system 103, such as left EDM 120L, left HSA 122L, and left hydrostatic transaxle 124L on the one side, and right EDM 120R, right HSA 122L, and right hydrostatic transaxle 124R on the other, together with the relatively short 8 millisecond communication signals helps enable fast assessment and drive correction computations in response to changing input commands from the user. In other words, the relatively short distance for communication signals to travel together with the 8 millisecond reporting of both desired and current direction of rotation, speed, and acceleration of respective drive axles 126L, 126R helps enable respective EDMs 120L, 120R to compute new target directions and positions for the respective left and right HSAs 122L, 122R according to the motion profile PID and feed forward algorithms to close the difference with a previously commanded drive output command from VIM 107 while also receiving new drive output commands from the VIM 107 which require a new output command from respective EDMs 120L, 120R.

Once the EDM 120L, 120R determines what output to provide to respective HSAs 122L, 122R, it does so immediately as described above. Each respective HSA 122L, 122R may be configured to respond accordingly, having its motor output shaft driven either clockwise or counterclockwise at up to 6000 RPMs while consuming up to approximately 130 amps in the process. Each respective HSA motor output shaft may include a worm that engages a non-backdrivable helical gear (worm gear) in each respective HSA 122L, 122R. Because 130 amps is not available on a continuous basis, bypass capacitors and a deep cycle 12V battery provide the instantaneous power needed to rotate the output shaft up to 6000 RPM as needed. A non-backdrivable helical gear, utilizing the internal friction at the interface with the worm, helps to minimize power consumption by avoiding the need for the HSA motor to expend energy to hold an output position. And during the time when the commanded motor output shaft position is not changing, the HSA motor current reduces to zero, which allows the battery to be recharged by the vehicle charging system.

Figure 14:
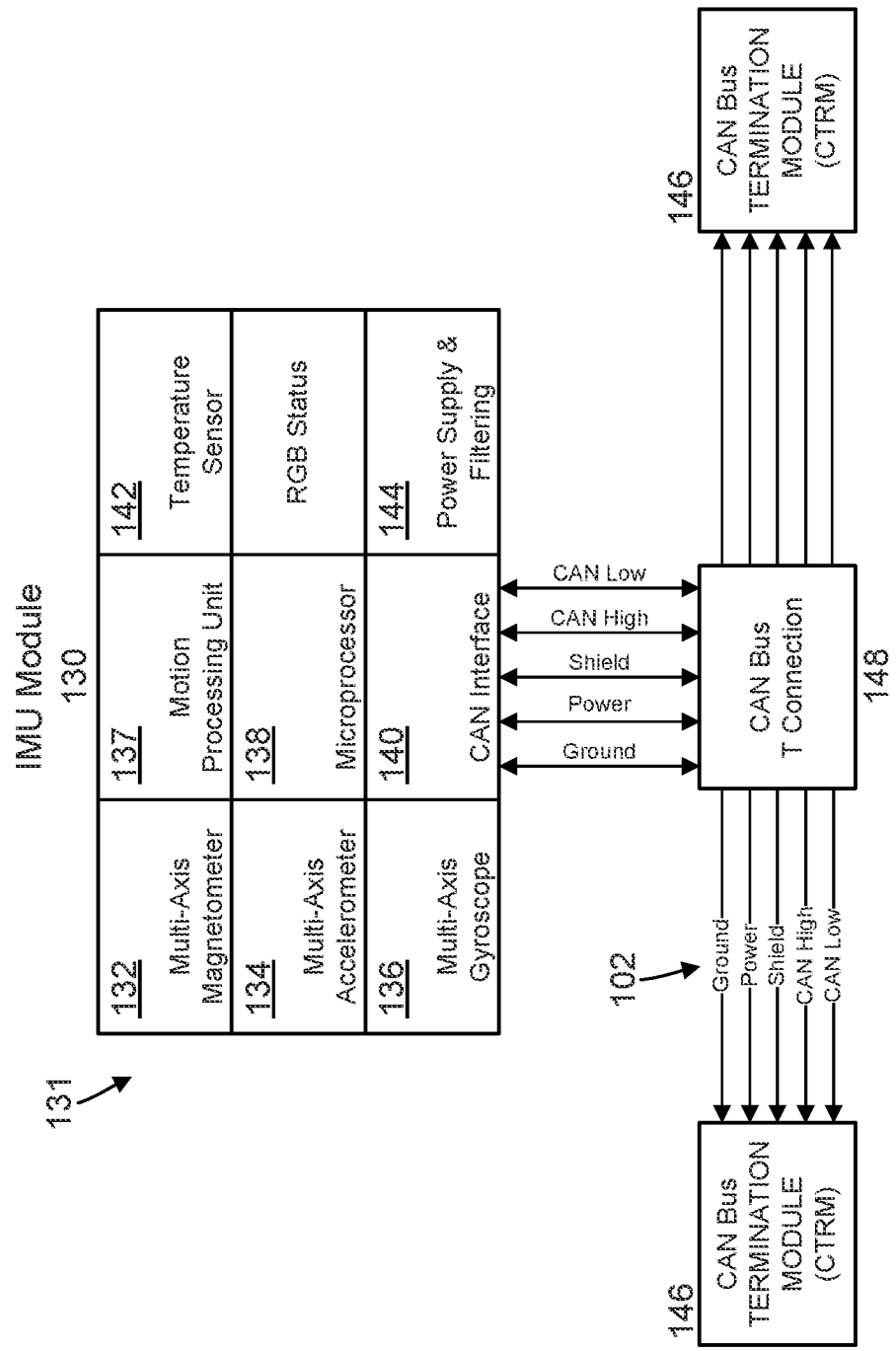
FIG. 14 is a schematic view of an embodiment of an inertial measurement module of the instant disclosure.

VIM 107 may also incorporate output messages posted by SCM 105. In some embodiments, SCM 105 may include an Inertial Measurement Unit (IMU) Module 130. As shown in FIG. 14, IMU Module 130 may include a multi-axis IMU 131 on, for example, an Invensense 9250 chip, which may include a multi-axis magnetometer 132, a multi-axis accelerometer 134, and a multi-axis gyroscope 136. IMU module 130 may also include a microprocessor 138, power supply and filtering 144, temperature sensor 142, and a CAN interface 140 for communicating data over CAN-Bus 102. The microprocessor 138 may be configured to fuse the output of the multi-axis magnetometer 132, multi-axis accelerometer 134, and multi-axis gyroscope 136 and provide that data to motion processing unit 137, which is described below. Temperature sensor 142 may be used to continuously adjust the output of the multi-axis gyroscope 136 to correct for temperature-driven drift in the output of the multi-axis gyroscope 136 that typically arise from heat generated by the gyroscope.

In one embodiment, IMU 131 includes a 3-axis accelerometer 134, a 3-axis gyroscope 136, and a 3-axis magnetometer 132 on the chip. In this way, the IMU module 130 may be capable of 9-axis motion processing, including 3-axis accelerometer processing, 3-axis gyroscope processing, and 3-axis magnetometer processing for traction and stability control of the vehicle, and particularly, to ensure the vehicle maintains a straight track on level ground as well as maintaining a straight track while traversing a side slope.

IMU module 130 may also include an attitude and heading reference system for yaw, pitch, and roll control of the vehicle. To do this, the IMU module 130, via one or more algorithms, may fuse the output from each of the multi-axis accelerometer 134, the multi-axis gyroscope 136, and the multi-axis magnetometer 132 to obtain a vector in 3 dimensions. In other embodiments, the output of each of the multi-axis accelerometer 134, the multi-axis gyroscope 136, and the multi-axis magnetometer 132 may be utilized separately. From the user's standpoint, the one or more algorithms may be configured to provide real-time, dynamic, and effortless control of the vehicle when the vehicle is operating on a hill, for example.

In some embodiments, the multi-axis accelerometer 134, the multi-axis gyroscope 136, and the multi-axis magnetometer 132 begin operating when the vehicle is turned "on." An on/off switch (not shown) may be used to activate or enable the one or more algorithms to utilize the output from the multi-axis accelerometer 134, the multi-axis gyroscope 136, and/or the multi-axis magnetometer 132 to automatically adjust vehicle yaw and vehicle speed to compensate or account for detected vehicle roll angle. The one or more algorithms may dynamically adjust vehicle drive control input signals to result in a user experience of effortless control of the vehicle in response to changes in terrain or operator control inputs. The one or more algorithms may be user-selected or predetermined.

Output from the IMU Module 130 may be posted on CAN-Bus 102 for processing for VIM 107 together with the processing of LBSMs 110L, 110R. When IMU Module 130 is present and enabled on the vehicle, IMU Module 130 may provide stability control configured to automatically adjust and optimize the output of drive system 103. Stability control may come in the form of straight line tracking, side hill straight line tracking, hill limit, side hill limit, traction control, and anti-scuff algorithms. In addition, stability control options may include multiple profiles such as economy operating profile, or sport mode operating profile, all of which may be readily selectable by an operator of the vehicle. In one embodiment, when the IMU Module 130 is enabled and providing data to CAN-Bus 102, if both lap bars 109L, 109R are positioned by the user in a forward 15 degrees position and LBSMs 110L, 110R detect the same, but the IMU Module 130 is detecting a yaw at 0.1 degrees, for example, VIM 107 may be configured to adjust the drive output signal to either the left EDM 120L or the right EDM 120R as necessary to keep driving in a straight line irrespective of small changes in the position of either lap bar 109L, 109R away from the forward 15 degree position (or any other generally parallel alignment), a tolerance parameter that may be tuned as discussed below. Thus, if the vehicle is being driven on a side hill, drive and control system 100 can be configured to automatically compensate for drift in heading of the vehicle, thereby reducing the workload of the user. The ability to automatically maintain the heading of the vehicle in this way may be switched on or off by the user as desired.

IMU 131 may be isolation mounted in a housing to minimize noise and data loss of the IMU 131. The IMU module 130 may itself be isolation mounted to the vehicle by means of a shock and vibration damping material or device. For example, a visco-elastic material such as Sorbothane®, which is available from Sorbothane, Inc., may be used to isolate the IMU module 130 from shock and vibration during use of the vehicle. The SCM 105 and the IMU module 130 may be electrically powered via CAN-Bus 102 as described herein.

In one embodiment, a Motion Processing Unit (MPU) 137 of the IMU module 130 is configured to receive data from the 3-axis gyroscope 136 and the 3-axis accelerometer 134 of the 9-axis IMU 131. The MPU 137 may be configured to fuse the data based on Digital Motion Processor (DMP) settings and produce quaternions. The data will be placed on an internal bus along with data from the 3-axis magnetometer 132 as well as any other selected data. An interrupt pin may be asserted so the microprocessor 138 will know data is ready. The microprocessor interrupt service routine may be configured to read the FIFO and load the data into a Motion Processing Library (MPL). The microprocessor 138 can then query the MPL for quaternions, Euler angles, heading, etc. The microprocessor 138 may be configured to generate appropriate messages based on the module configuration settings and place the messages on CAN-Bus 102. In some embodiments, the user can set the rate at which the MPL reads the multi-axis gyroscope 136 data, whether it be 10 Hz or 200 Hz, for example. Various modes of filtering the data from the multi-axis accelerometer 134 are also possible with user-selectable 2G, 4G, 6G, and 8G modes, for example, to eliminate noise or to adjust the sensitivity of the IMU 131.

In some embodiments, the data available from the IMU module 130 may include:
Module system status
IMU calibration status
IMU self-test status
IMU Temperature® C.
Quaternion (w, x, y, z)
Yaw, Pitch, Roll degrees
Heading degrees
Heading (fused) degrees
Accelerometer (x, y, z) g
Gyroscope (x, y, z) (°/s)
Magnetometer (x, y, z)
Magnetometer strength uT
Accumulated Gyroscope (x, y, z) degrees
Accelerometer tilt x to z degrees
Accelerometer tilt y to z degrees
Accelerometer tilt x to y degrees Vehicle drive and control system 100 may include multiple IMU modules, (including an IMU module 130) of one or more configurations. Each IMU module may be capable of parameter tuning or adjustment over CAN-Bus 102 via a plug-in interface or via remote programming device described in the previously incorporated U.S. Pat. No. 10,058,031. As discussed below, tunable parameters may be defined by user access level so that only a user with the specified access level may modify the value of the parameter.

Figure 15:
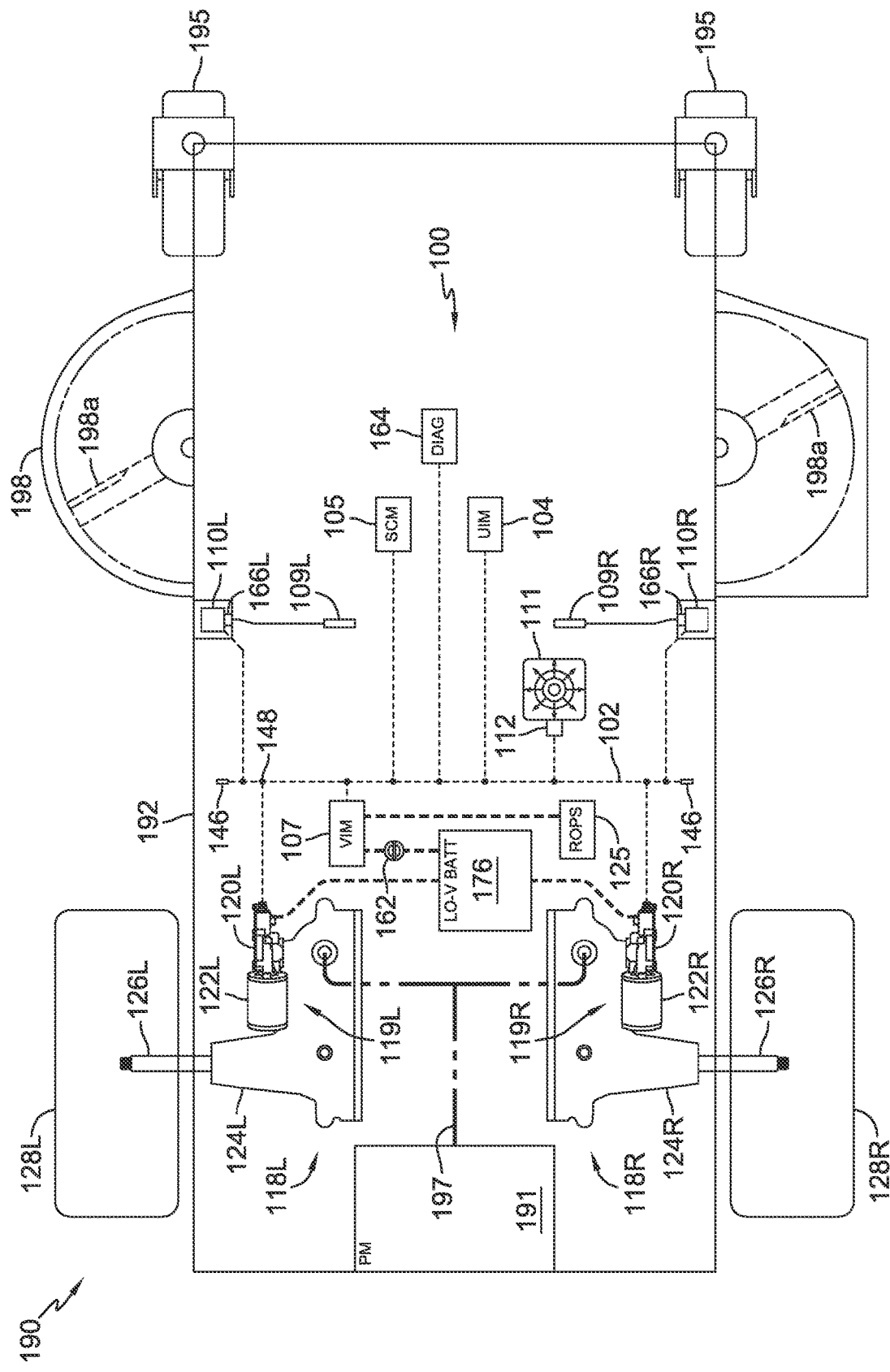
FIG. 15 is a schematic view of a vehicle incorporating a vehicle drive and control system in accordance with the instant disclosure.

FIG. 15 illustrates an embodiment of a zero turn vehicle 190 incorporating drive and control system 100 as described above. Vehicle 190 may include a frame 192 on which is mounted a prime mover, such as internal combustion engine 191, that drives a pair of hydrostatic transaxles 124L, 124R by means of a conventional power transfer apparatus, such as belt and pulley system 197. Internal combustion engine 191 may further drive (by means of belt and pulley system 197) an optional mowing deck 198 having mowing blade(s)

198a. Mowing deck 198 may be selectively engaged by operation of a manual or electric clutch-brake-pulley mechanism (not shown).

Each of the hydrostatic transaxles 124L, 124R includes an output drive axle 126L, 126R engaged to a drive wheel 128L, 128R to provide propulsion and steering as directed by the vehicle operator via lap bars 109L, 109R engaged to respective LBSMs 110L, 110R or via optional joystick 111 (including a joystick sensor module 112). Other alternative steering and drive input systems 101 may be incorporated. Unlike the left and right LBSMs 110L, 110R, joystick sensor module 112 may be configured to synthesize at least a portion of the position, direction of rotation, speed and acceleration data generated by movements of joystick 111 by the user prior to posting the data onto CAN-Bus 102 for processing a drive output command by VIM 107.

Vehicle 190 also has a pair of non-driven, non-steered caster wheels 195 that freely pivot and track in response to the steering impetus provided by the drive wheels 128L, 128R. Each hydrostatic transaxle 124L, 124R has an electric actuator 122L, 122R mounted thereon to control the output thereof. Connected to each electric actuator 122L, 122R is an EDM 120L, 120R configured to drive each electric actuator 122L, 122R. Each EDM 120L, 120R and electric actuator 122L, 122R receive power from an electrical power source 106, such as 12V battery 176, that is charged by an alternator or similar power generating device (not shown). Each EDM 120L, 120R is connected to VIM 107 by way of CAN-Bus 102. CAN-Bus 102 is powered through the VIM 107, which receives power from battery 176 when key switch 162 is turned on, and directs power and serial communication through CAN-Bus 102. The aforementioned LBSMs 110L, 110R are also in communication with the VIM 107 via CAN-Bus 102. Control signals are generated and transmitted by LBSMs 110L, 110R via CAN-Bus 102 in response to operator manipulation of the left and right lap bars 109L, 109R.

Figure 12:
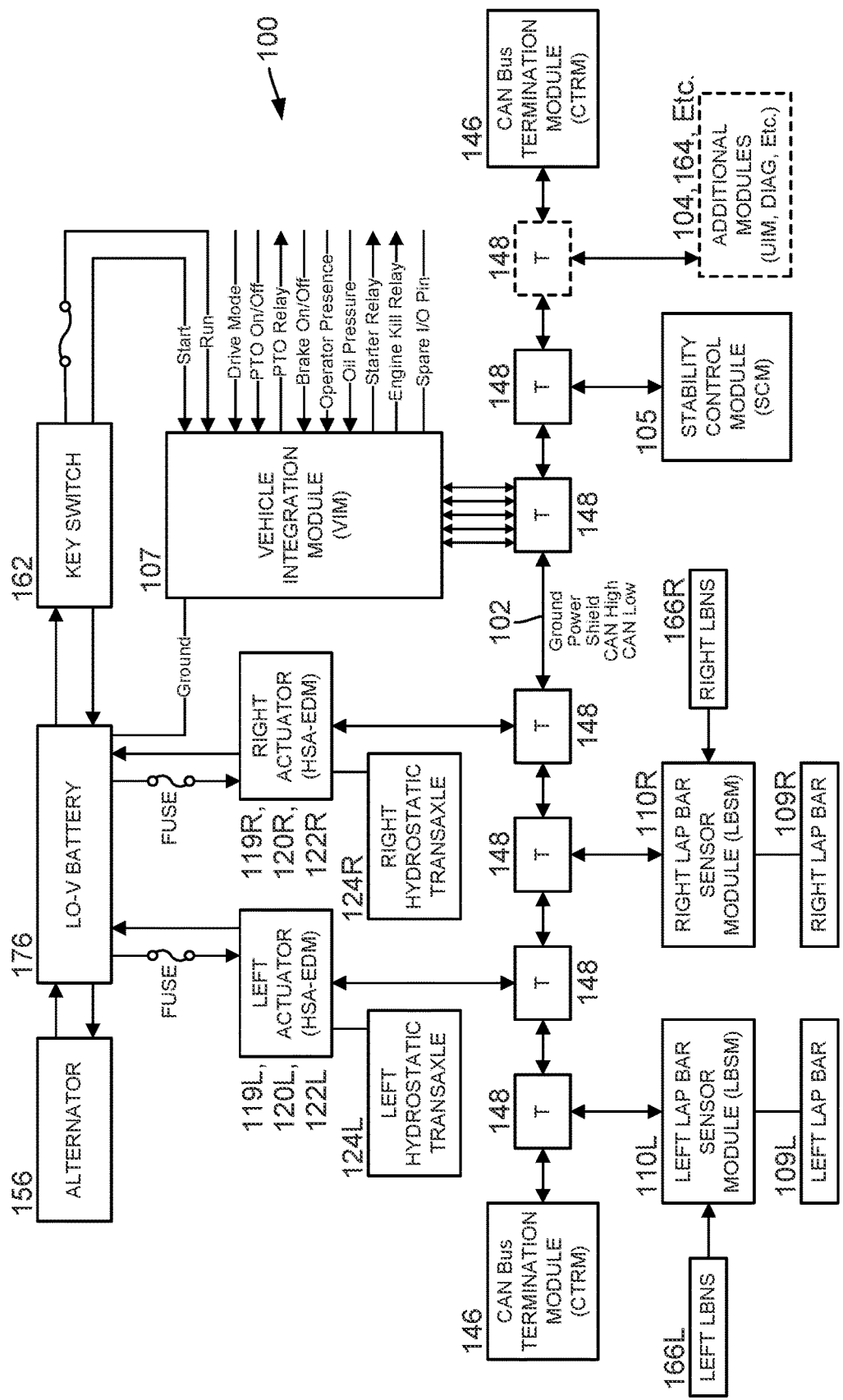
FIG. 12 is a schematic view of another aspect of the vehicle drive and control system shown in FIG. 10.
Figure 12A:
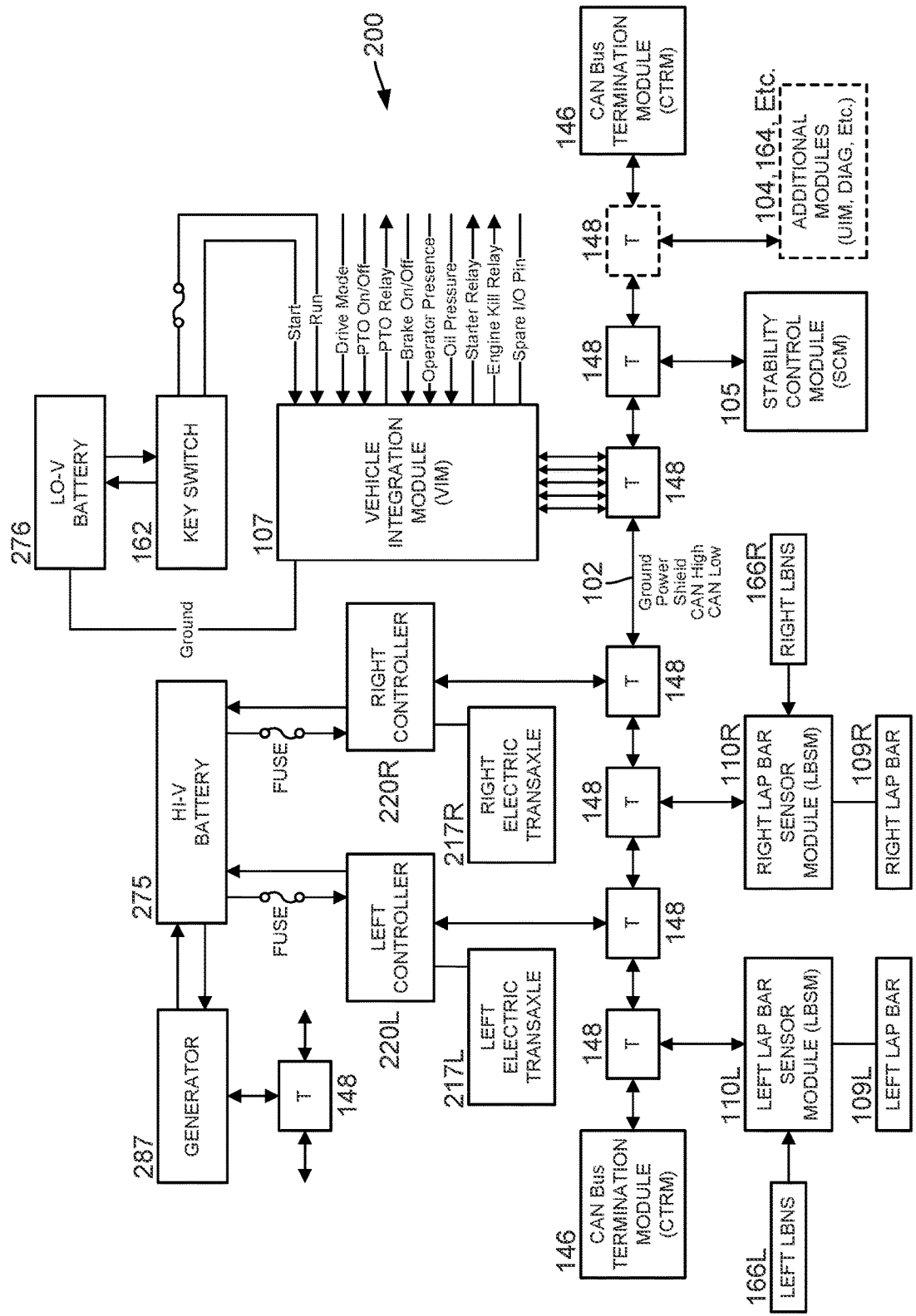
FIG. 12A is a schematic view of another aspect of the vehicle drive and control system shown in FIG. 10A.
Figure 12B:
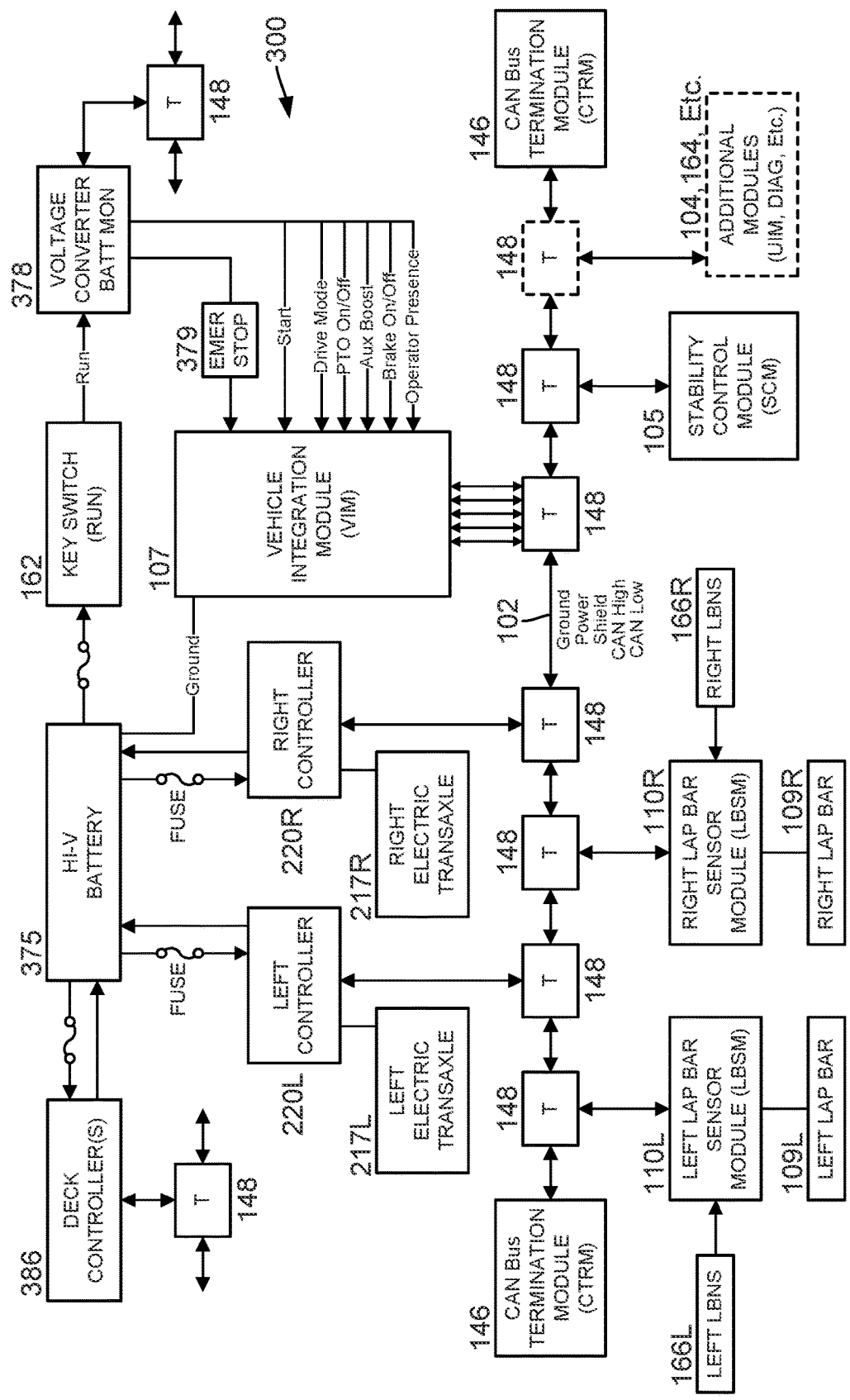
FIG. 12B is a schematic view of another aspect of the vehicle drive and control system shown in FIG. 10B.

As shown in FIGS. 12 and 15, a lap bar neutral switch (LBNS) 166L, 166R may be included with respective LBSMs 110L, 110R to detect whether one or both of the lap bars 109L, 109R are positioned in a stowed (neutral or disengaged) position or an unstowed (non-neutral or engaged) position, where the stowed or unstowed lap bar status signal is posted in a message on the CAN-Bus 102 by the respective LBSM 110L, 110R for receipt and processing by VIM 107. Alternatively, as shown in FIG. 13, the stowed or unstowed lap bar status signal (i.e., neutral switch position signal) from respective neutral switches 166L, 166R may be communicated directly to VIM 107 via dedicated electrical paths to respective I/O terminals, pins or ports of communications interface 183 of VIM 107.

A CAN-Bus termination module (CTRM) 146 (comprising a resistor) is connected to each end of the CAN-Bus 102 network wiring harness to ensure communication speed and signal integrity on CAN-Bus 102. This type of termination is necessary and typical in a CAN-Bus communication system. A CAN-Bus T-Connector 148 facilitates connection of any of the aforementioned components to CAN-Bus 102.

For purposes of this disclosure, the EDMs 120L, 120R and electric actuators 122L, 122R may include any or all of the features and functionality described in the previously incorporated U.S. patent application Ser. No. 15/944,571, filed Apr. 3, 2018.

As described throughout this disclosure and as shown in FIG. 15, vehicle drive and control system 100 may include a number of intelligent, electronic modules functioning as a single system and coordinating their activities via CAN-Bus 102. These modules include (but are not limited to) the aforementioned VIM 107, LBSMs 110L, 110R, joystick 111 with joystick sensor module 112, HSAs 122L, 122R with integrated EDMs 120L, 120R, CTRM 146, UIM 104, and SCM 105, among others. In this embodiment, an optional Diagnostic Module and graphical user interface or GUI (DIAG) 164 is shown connected to CAN-Bus 102 for logging error messages and allowing a user to diagnose or troubleshoot one or more system functions via an integrated GUI or via UIM 104.

Operator commands (in the form of absolute position data of the lap bars 109L, 109R) are generated by the left and right LBSMs 110L, 110R (or, optionally, via joystick 111 with joystick sensor module 112) and communicated to the CAN-Bus 102 network. EDMs 120L, 120R and VIM 107 may be configured to monitor these commands and if valid, respond by driving the actuator(s) to the requested position(s). Invalid commands are responded to with appropriate error handling or failsafe routines.

In one embodiment, the VIM 107 may monitor LBSM position updates received over the CAN-Bus 102 and respond if data is invalid. For example, the VIM 107 may be configured to monitor vehicle status and override operator position commands if necessary for proper control of vehicle 190. VIM 107 may provide status information to the operator of vehicle 190 for a variety of system functions including speed, operating temperature and battery status when the vehicle contains a UIM 104 and this feature is enabled. UIM 104 may be configured to display vehicle status information messages generated by VIM 107 and transmitted via CAN-Bus 102 to the vehicle operator. UIM 104 may include any form of display device or system that may be connected to VIM 107 and removed if desired by the user.

EDMs 120L, 120R may be configured to respond to speed, position and diagnostic requests received over the CAN-Bus 102 as described in this disclosure, and communicate status, absolute position and error codes, among others, to the VIM 107 over the CAN-Bus 102. For example, EDMs 120L, 120R may continuously compare the actual actuator positions to the operator-requested positions and drive the actuator motors to the commanded positions using a motion profile based on tunable parameters stored in the non-volatile memory of each EDM 120L, 120R.

As described above, in this embodiment, CAN-Bus 102 is powered through the VIM 107. The power initiation sequence begins when key switch 162 is turned on. Power from battery 176 when key switch 162 is turned on is directed to CAN-Bus 102 to power CAN-Bus 102. When vehicle 190 is running, power from alternator 156 (as shown in FIGS. 4 and 11) may be directed (via battery 176) to the VIM 107 and to CAN-Bus 102.

During vehicle operation, control signals are generated and transmitted via CAN-Bus 102 in response to operator manipulation of the left and right-side lap bars 109L, 109R engaged to the pair of LBSMs 110L, 110R. VIM 107 may be configured to determine system operational status based on the status of the individual modules described above as well as safety interlock sensor data, etc., and control the state of the EDMs 120L, 120R as appropriate.

System data logging to memory 182, providing vehicle system messages to the user via UIM 104, and vehicle system management and control may be performed entirely by VIM 107. For example, VIM 107 may be configured to log and store the safety interlock status, vehicle sensor alarm status, error and fault condition status, and minimum and maximum VIM temperatures.

VIM 107 may be configured to send a control signal to EDMs 120L, 120R to reduce the speed of the vehicle to a predetermined speed, including stopping all vehicle motion, upon receiving or detecting one or more fault conditions, errors or data lying outside of predetermined ranges or limits.

VIM 107 may be configured to receive engine kill requests from any of the modules described above. When an engine kill request is received by VIM 107, VIM 107 may provide an active low (GND) signal to shut down the vehicle prime mover, such as internal combustion engine 191. Likewise, when the vehicle operator turns the key switch 162 to the off position, VIM receives a low power signal, which causes VIM 107 to initiate the step of powering down vehicle systems. VIM 107 may be configured to maintain its own internal power for a short period of time to enable it to perform vehicle power down functions safely.

VIM 107 may also be configured to receive engine kill requests from analog sensors, such as the ROPS collision sensor 125 depicted in FIG. 15. For example, an impact sensor strip (contact or pressure sensor strip) disposed about the forward or leading edge of a ROPS bar typically found on zero turn mowers to protect the user in the event of a rollover may, upon impact with a solid object such as a low hanging tree limb, trigger the VIM 107 to initiate the active low (GND) signal to shut down the prime mover, such as internal combustion engine 191. Alternatively, VIM 107 may interpret the signal received from ROPS collision sensor 125 in combination with other vehicle status information to formulate an appropriate control response. In one embodiment, data from the multi-axis accelerometer 134 of IMU module 130 may be interpreted in combination with the signal from ROPS collision sensor 125, indicating that a rapid change in the pitch of vehicle 190 is occurring as the impact of the vehicle's ROPS bar with a substantial tree limb lifts its front end from the ground. A zero turn mower under power is capable of counter-rotation in such a situation, or under rapid acceleration, or even on steep slopes. VIM 107 may be programmed to initiate a host of control responses in this situation, including by way of example only: (1) shut down the prime mover; (2) command HSAs 122L, 122R (through EDMs 120L, 120R) to return to neutral; (3) command HSAs 122L, 122R (through EDMs 120L, 120R) to reverse the direction of travel of vehicle 190; (4) shut down the PTO, if activated; (5) display a warning or flashing light to the user on the UIM 104, if so equipped; and/or (6) transmit an emergency signal to an external monitoring station via transmitter, if so equipped, or by blue tooth signal through the user's smart phone. In another embodiment, responses (1)-(5) may be triggered by a ROPS collision sensor 125 intended to prevent impending collisions, such as LIDAR, radar, electromagnetic or ultrasonic sensors, and the like. In such cases, ROPS collision sensor 125 may digitally communicate with VIM 107 via CAN-Bus 102.

Figure 16:
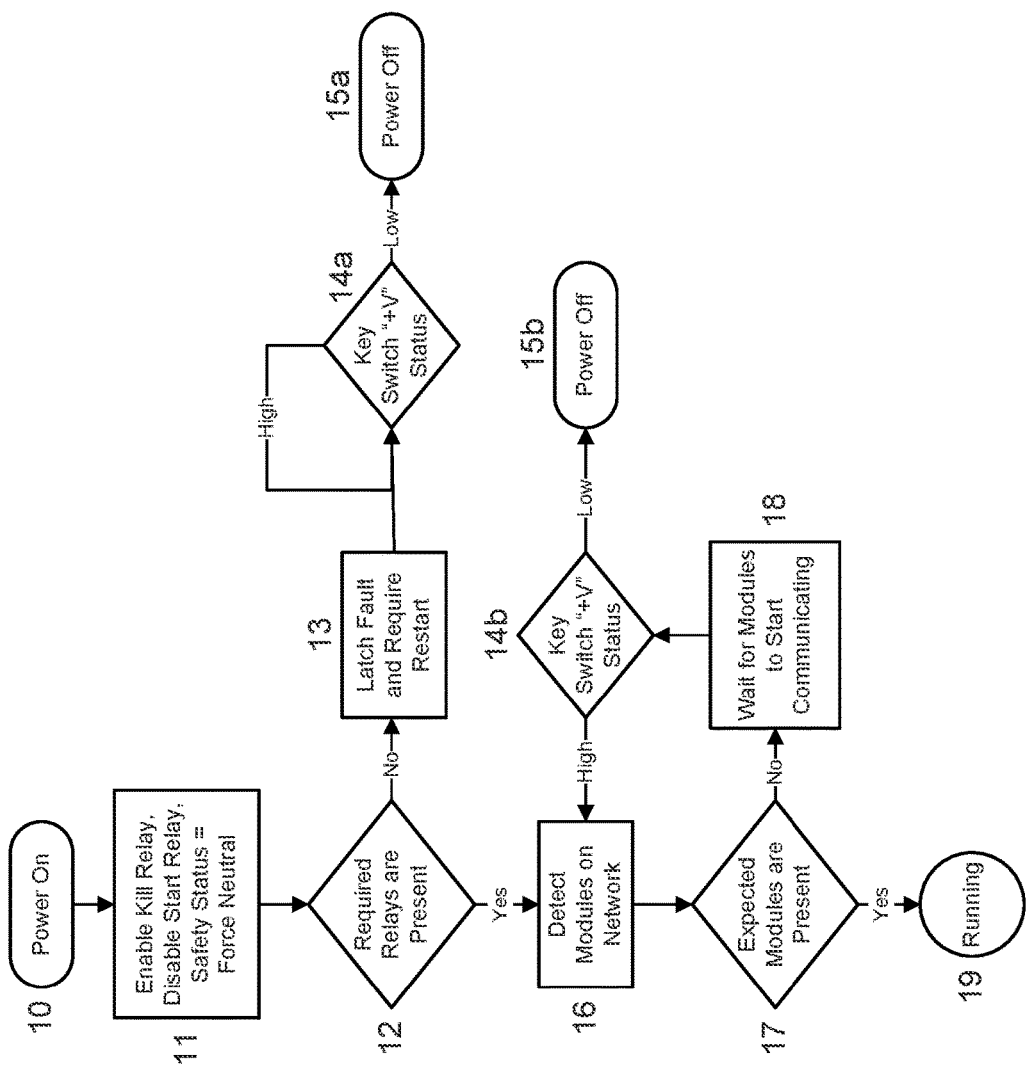
FIGS. 16 and 17 are block diagrams illustrating the functionality of one embodiment of a vehicle integration module of the present disclosure.
Figure 17:
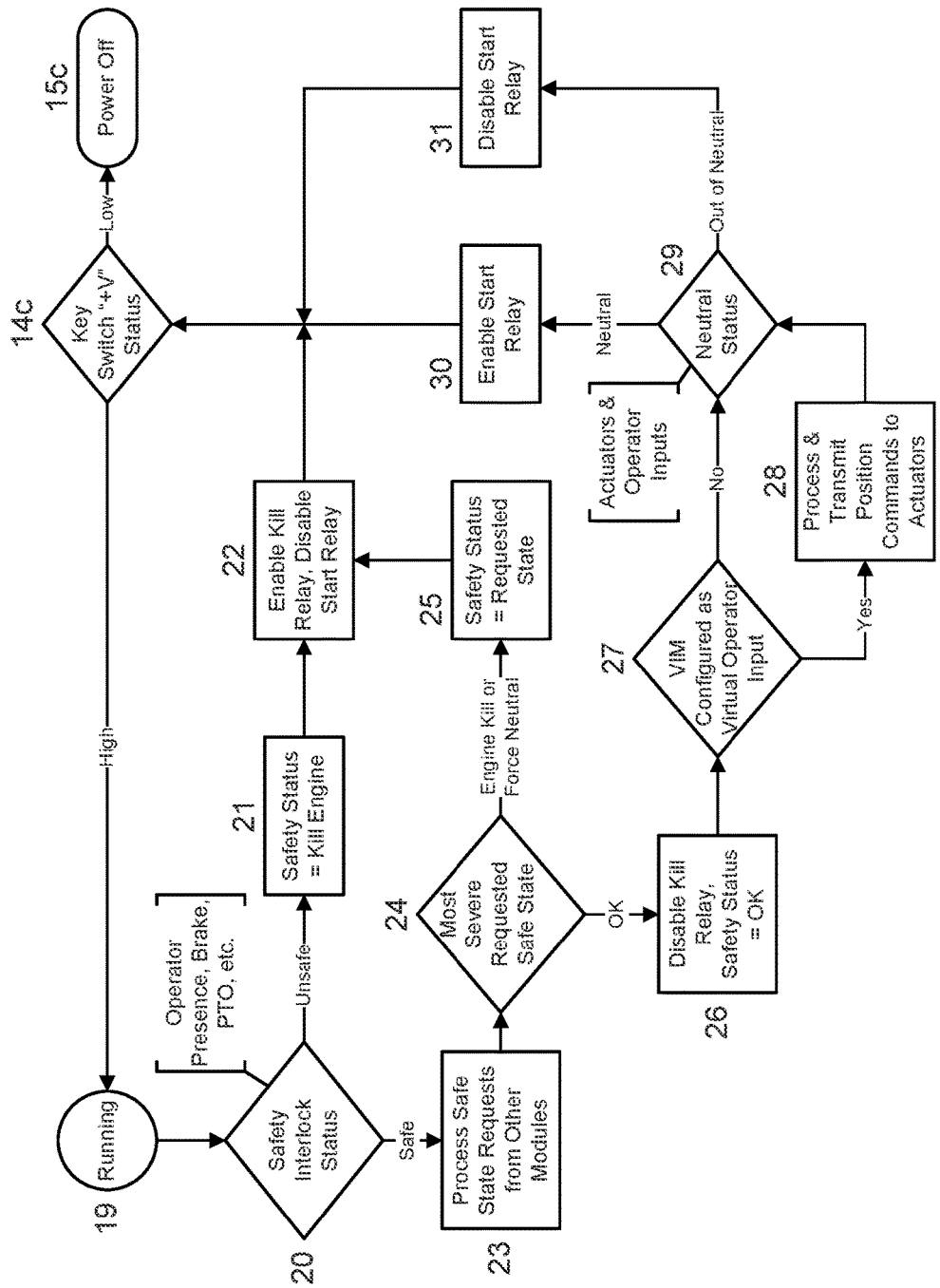

Turning to FIGS. 16 and 17, there is shown a schematic flow diagram illustrating the operational behavior of one embodiment of VIM 107 implemented with an exemplary drive and control system of the instant disclosure in combination with an exemplary vehicle having an internal combustion engine. Because different vehicles may be configured with different components and functionality, differently configured vehicles may have different inputs or outputs to or from the VIM (VIM I/O) 108 of VIM 107. For example, in fully electric vehicles without an internal combustion engine, the steps described below that pertain to an engine would be omitted and appropriate steps pertaining to components that are pertinent to a fully electric vehicle may be substituted.

Beginning at step 10, power from battery 176 is commanded "on" by virtue of the vehicle operator turning the key switch 162 to the "on" position. At step 11, VIM 107 performs power-on functional self-checks, and sets the initial conditions for one or more relays and safety sensors. For example, VIM 107 may set to "enable" a Kill Relay configured to provide a kill engine signal to the engine. Simultaneously, VIM 107 may set to "disable" a Start Relay to avoid prematurely powering a starter motor of the engine before VIM 107 determines that all required relays are present and functional in accordance with Step 12.

If VIM 107 determines that not all required relays are present or functional, then a latch fault condition occurs, which sets in motion a signal from VIM 107 to power off vehicle systems, as shown at Steps 13, 14a, and 15a. If VIM 107 instead determines that all required relays are present and functional, then at Step 16 VIM 107 detects whether all required modules are present and functional.

If VIM 107 detects that not all required modules are present and functional at Step 17, then at Step 18 VIM 107 is programmed to wait a predetermined period of time to allow all of the modules to start communicating with VIM 107 over the CAN-Bus 102. At Step 14b, VIM 107 confirms the key switch 162 is still in the on position, and if not, VIM 107 may provide an active low (GND) signal to power off vehicle systems, as shown at Step 15b. If VIM 107 confirms the key switch 162 is still in the "on" position at step 14b, then VIM 107 may provide an active high signal, and restarts the module detection Step 16.

If VIM 107 detects that all modules are present and functional at step 17, the communication system is allowed to enter a "running" mode at step 19. Then, at Step 20, VIM 107 determines the status of the safety interlock system. The safety interlock system may include one or more sensors, such as any of the sensors described above including a neutral sensor, brake sensor, operator seat sensor, and power take-off sensor. (It should be noted that some of these "sensors" may be simple switches.) VIM 107 may be configured to detect a fault condition with respect to any signal provided to VIM 107 from any one or more of these sensors. At Step 20, if VIM 107 determines that the signal from one or more of these sensors is indicative of an unsafe condition, then at Step 21 VIM 107 sets the vehicle safety status to "Kill Engine," and at Step 22 VIM 107 enables the Kill Engine relay while disabling the Start Relay. At Step 14c, VIM 107 provides an active low (GND) signal regardless of whether the position of the key switch 162 is set to "on" to power off vehicle systems, as shown at Step 15c.

If at Step 20 VIM 107 determines that the signal from one or more of these sensors is indicative of a safe condition, then at Step 23 VIM 107 is configured to process safe state requests from other vehicle modules. At Step 24, VIM 107 evaluates the most severe requested safe state from the other modules, and if VIM 107 receives a signal corresponding to an Engine Kill state or a Force to Neutral state, then at Step 25, VIM 107 sets the safety status to the requested state, and enables the Kill Relay while disabling the Start Relay at Step 22, and provides an active low (GND) signal at Step 14c to power off vehicle systems, as shown in Step 15c.

If at Step 24 VIM 107 receives no Engine Kill signal or Force to Neutral signal from any of the other modules, then at Step 26 VIM 107 disables the Kill Relay and sets the safety status to "OK." At Step 27, VIM 107 confirms whether it is configured to receive virtual operator input, and if yes, then at Step 28 VIM 107 processes and transmits position commands to EDMs 120L, 120R via CAN-Bus 102. If VIM 107 is not configured to receive virtual operator input, then at Step 29 VIM 107 determines whether the hydrostatic transaxles 124L, 124R are in a neutral position.

If at Step 29 VIM 107 determines that one or both of the hydrostatic transaxles 124L, 124R are not in a neutral position, the VIM 107 at Step 31 disables the Start Relay and provides an active low (GND) signal to power off vehicle systems, as shown in Step 15c.

If both of the hydrostatic transaxles 124L, 124R are determined by VIM 107 to be in a neutral position, then at Step 30 VIM 107 enables the start relay and provides an active high signal to enable power from the battery 176 to be directed to the engine starter motor to start the engine 191, assuming the key switch 162 remains in the "on" position. Apart from mechanical engine failure, the engine 191 will remain running until the key switch 162 is turned to the "off" position or until the VIM 107 enables the Kill Relay and thereafter provides an active low (GND) signal upon determination of a fault condition.

Figure 18:
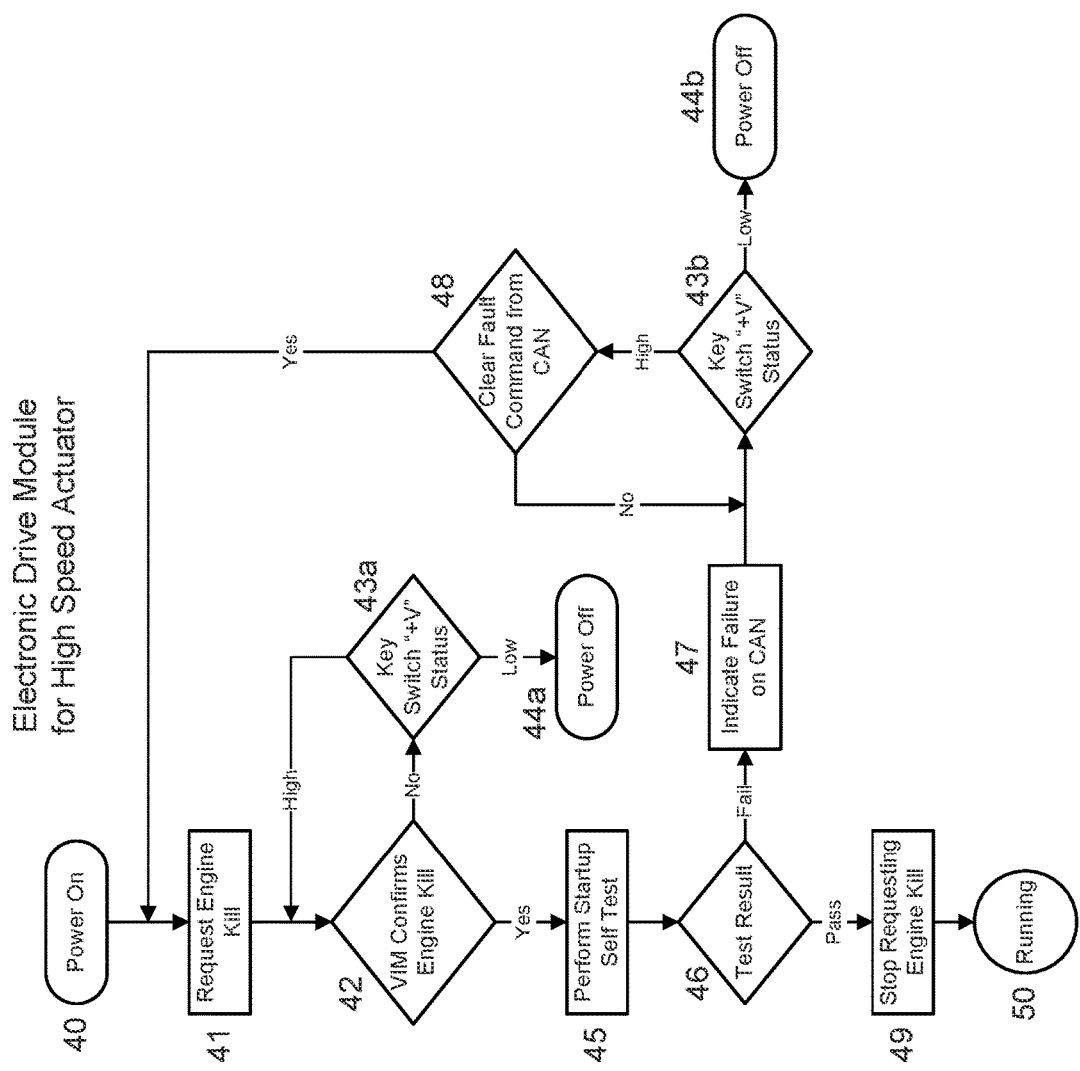
FIG. 18 depicts a first portion of a flow chart illustrating control logic of an electronic drive module of the present disclosure.
Figure 19:
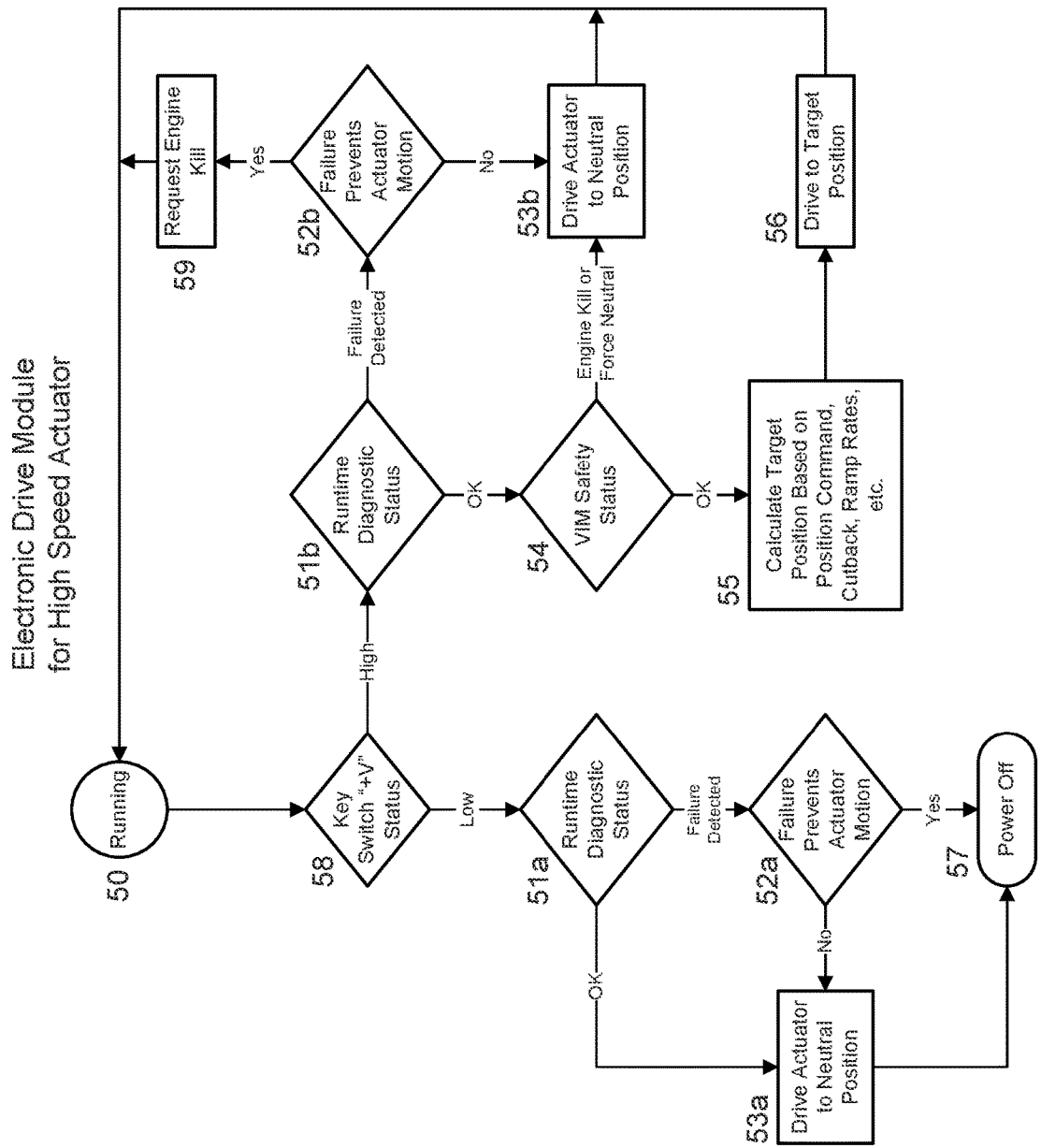
FIG. 19 depicts a second portion of the flow chart of FIG. 18.

Turning to FIGS. 18 and 19, there is shown a schematic flow diagram illustrating representative control logic for left and right EDMs 120L, 120R on an exemplary vehicle equipped with drive and control system 100. In FIG. 18, after power is turned on at step 40, EDMs 120L, 120R at step 41 post an engine kill message on CAN-Bus 102. At step 42, VIM 107 confirms that the engine 191 is not set to run mode. At step 43a, if the engine 191 is running and the key switch 162 has a low voltage status indicative of a desire to turn the vehicle off, then power is commanded off as shown at step 44a. At step 45, if VIM 107 confirms that the engine 191 is not running, then EDMs 120L, 120R perform a startup self-test where HSAs 122L, 122R are driven to a neutral position. If neutral position of HSAs 122L, 122R is confirmed at step 46, then EDMs 120L, 120R stop requesting engine kill at step 49, and engine 191 is allowed to run at step 50. If the HSAs 122L, 122R are not confirmed to be in a neutral position at step 46, then the offending EDM 120L or 120R posts an error on the CAN-Bus 102 at step 47 and the status of key switch 162 is checked at step 43b. If the voltage at the key switch 162 is low, which is indicative of a desire to turn the vehicle off, then power is command off at step 44b. If the voltage at the key switch 162 is high, which is indicative of a desire to operate the vehicle, then EDMs 120L, 120R clear the error on the CAN-Bus 102 at step 48, and the process of FIG. 18 is repeated beginning at step 41. Otherwise, the system continues to check status of key switch 162 at step 43b.

FIG. 19 depicts additional steps when the engine 191 is running, as shown at step 50. The status of the key switch 162 is confirmed at step 58. If the key switch 162 voltage is low, indicating a desire to turn the vehicle off, then a self-diagnostic check of each EDM 120L and 120R is performed at step 51a. If the check passes, then EDMs 120L, 120R command respective HSAs 122L, 122R to a neutral position at step 53a and power is turned off at step 57. If, on the other hand, at step 51a either EDM 120L or 120R detects an error and at step 52a either EDM 120L or 120R detects that the error would prevent the HSAs 122L, 122R from moving and thus returning to neutral, then power is turned off at step 54. But if the error is one that would not prevent the HSAs 122L, 122R from moving and returning to neutral, then EDMs 120L, 120R command respective HSAs 122L, 122R to a neutral position at step 53a and power is turned off at step 54. At step 58, if key switch 162 voltage is high, indicating a desire to operate the vehicle, then a self-diagnostic check of each EDM 120L and 120R is performed at step 51b. If no error is detected, then VIM 107 performs a safety status check to detect whether any vehicle module is reporting an error message on Can-Bus 102. If no errors are reported, then at step 55, EDMs 120L, 120R calculate a target position for the respective HSA 122L, 122R based on the position command message posted on the CAN-Bus 102 by VIM 107, the PID (and optionally F) parameters stored in nonvolatile memory corresponding to desired ramp rates, etc., and the position sensor data received from Hall effect device 154 At step 56, respective EDMs 120L, 120R command the respective HSAs 122L, 122R to the desired actuator position and control returns to step 50. Returning to step 54, if VIM 107 detects an error posted on the CAN-Bus 102 during its safety status check, then at step 53b the respective EDMs 120L, 120R command the respective HSAs 122L, 122R to their neutral position and control returns to step 50. Returning to step 51b, if an error is detected by either EDM 120L or 120R and at step 52b either EDM 120L or 120R detects that the error would prevent the HSAs 122L, 122R from moving and thus returning to neutral, then at step 59 the respective EDM 120L or 120R posts an engine kill message on CAN-Bus 102 and control returns to step 50. But if the error is one that would not prevent the HSAs 122L, 122R from moving and returning to neutral, then EDMs 120L, 120R command respective HSAs 122L, 122R to a neutral position at step 53b and control returns to step 50.

As described above, the vehicle drive and control system 100 of the instant disclosure provides numerous vehicle component parameters that are adjustable or tunable to enable multiple different vehicle handling and operating characteristics for the same vehicle hardware configuration. The adjustable or tunable parameters may be stored in the CAN-Bus specification, and the CAN-Bus specification may be stored in any of the microprocessors associated with one or more of components or modules discussed herein.

In some embodiments, the tunable parameters may be adjustable or customizable according to authorization level, which may vary on a scale of 1 to 10, for example, with level 1 providing the least access and level 10 providing the most access to the tunable parameters (or vice-versa). For example, an OEM manufacturer may have authorization level 10, which may correspond to unrestricted access to all tunable parameters on all components and modules of drive and control system 100. Similarly, a distributor may have authorization level 7, which may allow the distributor to access most, but not all tunable parameters. A dealer may have authorization level 4, which may allow the dealer to access fewer or different parameters than would be available under authorization level 7. A consumer or other end-user of a vehicle comprising vehicle drive and control system 100 may have authorization level 1, which may allow the consumer or other end-user to access fewer or different parameters than would be available under authorization level 4. Drive and control system 100 may include fewer than 10 different authorization levels (i.e. fewer than 1 through 10). In other embodiments, drive and control system 100 may include more than 10 different authorization levels.

In some embodiments, certain drive and control system parameters for a particular authorization level may be made available to a user for adjustment or tuning via a SAE J1939 compatible process. In other embodiments, drive and control system 100 may be configured to prevent adjustment of those same parameters for the same authorization level. In some embodiments, drive and control system 100 may display a parameter but not allow adjustment of the parameter by the user. In other embodiments, drive and control system 100 may be configured to hide or otherwise not display the same parameter for the same authorization level.

Within each authorization level (apart from an authorization level that grants total or complete access to all parameters), drive and control system 100 may be configured to provide limited access to some modules while simultaneously providing greater access to other modules. In some embodiments, access to tunable parameters may depend on the device or module. For example, in an authorization level, drive and control system 100 may be configured to allow access and adjustment/tuning of LBSM parameters while preventing adjustment/tuning of EDM parameters. In other embodiments, drive and control system 100 may allow access and adjustment/tuning of VIM parameters but not LBSM parameters or EDM parameters. Drive and control system 100 may be configured to provide multiple different selectable values or settings for one or more of the adjustable/tunable parameters.

Tunable parameters of drive and control system 100 may be bundled together and stored in one or more user-defined profiles, or one or more predetermined profiles, according to authorization level. For example, tunable parameters that bias movement of the vehicle for high speed motion in response to user movement of the lap bars 109L, 109R, for example, may be stored in a "high speed" profile. Similarly, tunable parameters that bias movement of the vehicle for low speed or "speed-capped" motion in response to user movement of the lap bars 109L, 109R may be stored in a "low speed" profile. Tunable parameters, such as the PIDF parameters noted above, that affect the acceleration and deceleration ramps of the vehicle in response to user movement of the lap bars 109L, 109R, for example, may be stored in respective profiles for easy selection and deselection as desired. For example, the acceleration and/or deceleration ramps may be linear or nonlinear, as defined by either a linear or a nonlinear equation.

Tunable parameters of drive and control system 100 may include vehicle operational settings such as maximum vehicle forward and/or reverse speed, and maximum vehicle speed while a PTO device is engaged. For example, drive and control system 100 may be programmed to not exceed a maximum forward and/or maximum reverse speed by not exceeding a predetermined rotational speed of one or more driven wheels.

Tunable parameters of drive and control system 100 may also include vehicle operational settings such as stability control settings. Stability control may be deployed in the form of straight line tracking, side hill straight line tracking, hill limit, side hill limit, traction control, and anti-scuff algorithms. Stability control parameter options may include multiple profiles such as economy mode operating profile or sport mode operating profile, for example, all of which may be readily selectable by an operator of the vehicle. For example, an economy mode may include predefined, tunable parameters having values and settings biased by default to cause the vehicle to move less aggressively in response to user input of the lap bars, for example, than a vehicle configured to operate in sport mode. To do this, the values and settings of the tunable parameters may cause commands to be provided to the respective left and right HSAs 122L, 122R according to a PIDF motion algorithm that results in a slower or damped response, for example, than the values and settings stored in the sport mode.

Tunable parameters of drive and control system 100 may be updateable and/or upgradeable. For example, depending on authorization level, the list of tunable parameters may be updated, either manually or automatically, to include a greater or fewer number of parameters, or a greater of fewer number of parameters that are accessible or adjustable, for a given authorization level.

Referring to FIGS. 10A, 11A, 12A, and 13A, embodiments of drive and control system 200 for a hybrid vehicle are shown configured with left and right lap bars 109L, 109R, left and right LBSMs 110L, 110R, VIM 107, SCM 105, UIM 104, electrical power source 106, VIM I/O 108, and left and right hybrid electric drive systems 121L, 121R. In the embodiment shown in FIGS. 10A and 12A, VIM 107 is powered by electrical power source 106 comprising one or more batteries, such as low voltage battery 276. VIM 107 is configured to provide electrical power to CAN-Bus 102. In this embodiment, low voltage battery 276 is designed to deliver approximately 12V to key switch 162, which when in the run position completes the circuit to provide 12V to VIM 107. In other embodiments, low voltage battery 276 may be sized to deliver any voltage suitable for powering electrical components connected thereto. CAN-Bus 102 may be configured to operate on approximately, 5V but may be any suitable voltage.

Left and right hybrid electric drive systems 121L, 121R include left and right electronic controllers 220L, 220R coupled to left and right electric transaxles 217L, 217R for driving left and right drive wheels 228L, 228R via left and right drive axles 226L, 226R. Left and right electronic transaxles 217L, 217R of drive and control system 200 may include respective left and right gearboxes to transfer power from left and right electric drive motors 269L, 269R to respective left and right drive axles 226L, 226R. For example, left and right electric drive motors 269L, 269R may be coupled to the input end of the respective left and right gearboxes, and left and right drive axles 226L, 226R may be coupled to the output end of the respective left and right gearboxes. In some embodiments, left and right electronic controllers 220L, 220R may be packaged separately from the left and right electric transaxles 226L, 226R. In some embodiments, left and right electronic controllers 220L, 220R may be integrated with or otherwise packaged together with respective left and right electric transaxles 217L, 217R.

Figure 11A:
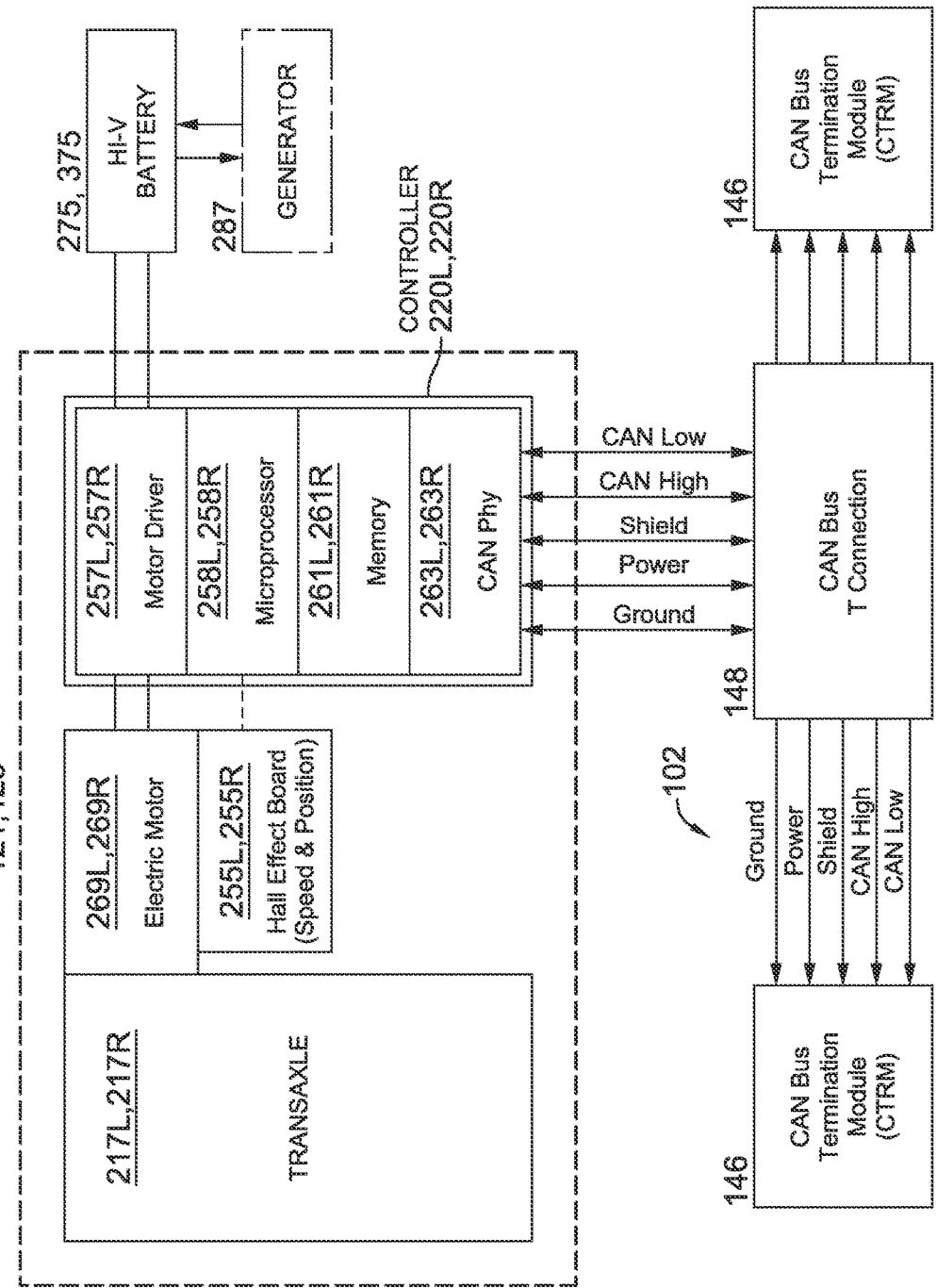
FIG. 11A is a schematic view of an aspect of the vehicle drive and control system shown in FIGS. 10A, 10B, and/or 10C.

FIG. 11A shows a detailed schematic view of left and right electronic controllers 220L, 220R coupled to CAN-Bus 102 for use with hybrid electric drive systems 121L, 121R. Respective left and right electronic controllers 220L, 220R include a microprocessor 258L, 258R, non-volatile memory 261L, 261R, motor driver 257L, 257R, CAN-Bus interface 263L, 263R, and one or more Hall effect sensor circuit boards 255L, 255R comprising a Hall effect sensor for detecting rotational speed, position and/or direction of rotation of corresponding left and right electric rotor shafts of electric drive motors 269L, 269R. Left and right electronic controllers 220L, 220R of hybrid electric drive systems 121L, 121R are connected to and receive electrical power from electrical power source 106, such as high voltage battery 275 (e.g., 48V). In some embodiments, a generator, such as generator 287, may be connected to electrical power source 106, such as high voltage battery 275. In addition, left and right electronic controllers 220L, 220R and generator 287 are connected to CAN-Bus 102 via respective CAN-Bus interfaces 263L, 263R to communicate messages to and from CAN-Bus 102. Left and right electronic controllers 220L, 220R are connected to left and right electric transaxles 217L, 217R, respectively, to: (1) provide drive commands to the respective left and right electric transaxles 217L, 217R corresponding to a desired rotational speed, position and/or direction of rotation the left and right drive wheels 228L, 228R; (2) detect, via the Hall effect sensors of the Hall effect sensor circuit boards 255L, 255R, actual rotational speed, position and/or direction of rotation of the respective left and right electric drive motors 269L, 269R of the respective left and right electric transaxles 217L, 217R, (3) provide updated drive commands to the left and right electric transaxles 217L, 217R while taking into account the difference between the actual and the desired rotational speeds, positions and/or directions of rotation of the respective left and right electric drive motors 269L, 269R; and (3) repeat the detection step and the step of providing updated drive commands until the desired target rotational speed and direction of rotation of the left and right drive wheels 228L, 228R is achieved.

Left and right electronic controllers 220L, 220R of drive and control system 200 may function in the same or similar way as left and right EDMs 120L, 120R discussed above for drive and control system 100. For example, left and right electronic controllers 220L, 220R may monitor data packets or messages from other modules connected to CAN-Bus 102 and initiate a vehicle fail-safe mode if multiple data packets are lost or corrupted. Left and right electronic controllers 220L, 220R are configured to respond to speed, drive commands and diagnostic requests received over CAN-Bus 102. For example, when a drive message is posted on CAN-Bus 102 from VIM 107, each of the left and right electronic controllers 220L, 220R are configured to look for that message based on the sender's CAN ID (in this case the ID corresponding to VIM 107) and according to the CAN ID associated with the left and right electronic controllers 220L, 220R, respectively. Upon detecting that the message includes a drive command, each electronic controller 220L, 220R may be configured to: (1) determine the current direction of motion, speed, and acceleration of respective drive axles 226L, 226R or a transaxle component associated therewith or connected thereto, (2) determine if any difference exists between those values and the corresponding values in the incoming drive message and (3) if a difference exists beyond a predetermined threshold value, the respective left and right electronic controllers 220L, 220R may individually compute a new drive output command to the respective left and right electric transaxles 217L, 217R according to a motion profile PID algorithm selected to make up the difference while achieving a vehicle feel and operability desired by the user. For example, if the difference is large, rather than outputting an equivalent to a "maximum acceleration" to close the difference quickly, the PID algorithm may be selected to close the difference to zero by slowly ramping up the acceleration to avoid throwing the user off the vehicle. The PID algorithm may also incorporate a feed-forward (F) algorithm to better predict the needed target output. The drive and control system 200 of the instant disclosure may be configured to simulate the operation and feel to the user of any OEM utility vehicle by simulating the operation and feel of a non-drive-by-wire OEM vehicle using the tunable parameters discussed herein. For example, each electronic controller 220L, 220R may be configured to continuously compare actual rotational speed, position and/or direction of rotation to operator-requested speed and direction of the vehicle and drive respective electric transaxles 217L, 217R to the desired rotational speed, position and/or direction of rotation using the motion profile PID algorithm based on tunable parameters stored in the non-volatile memory 261L, 261R of each electronic controller 220L, 220R.

Figure 13A:
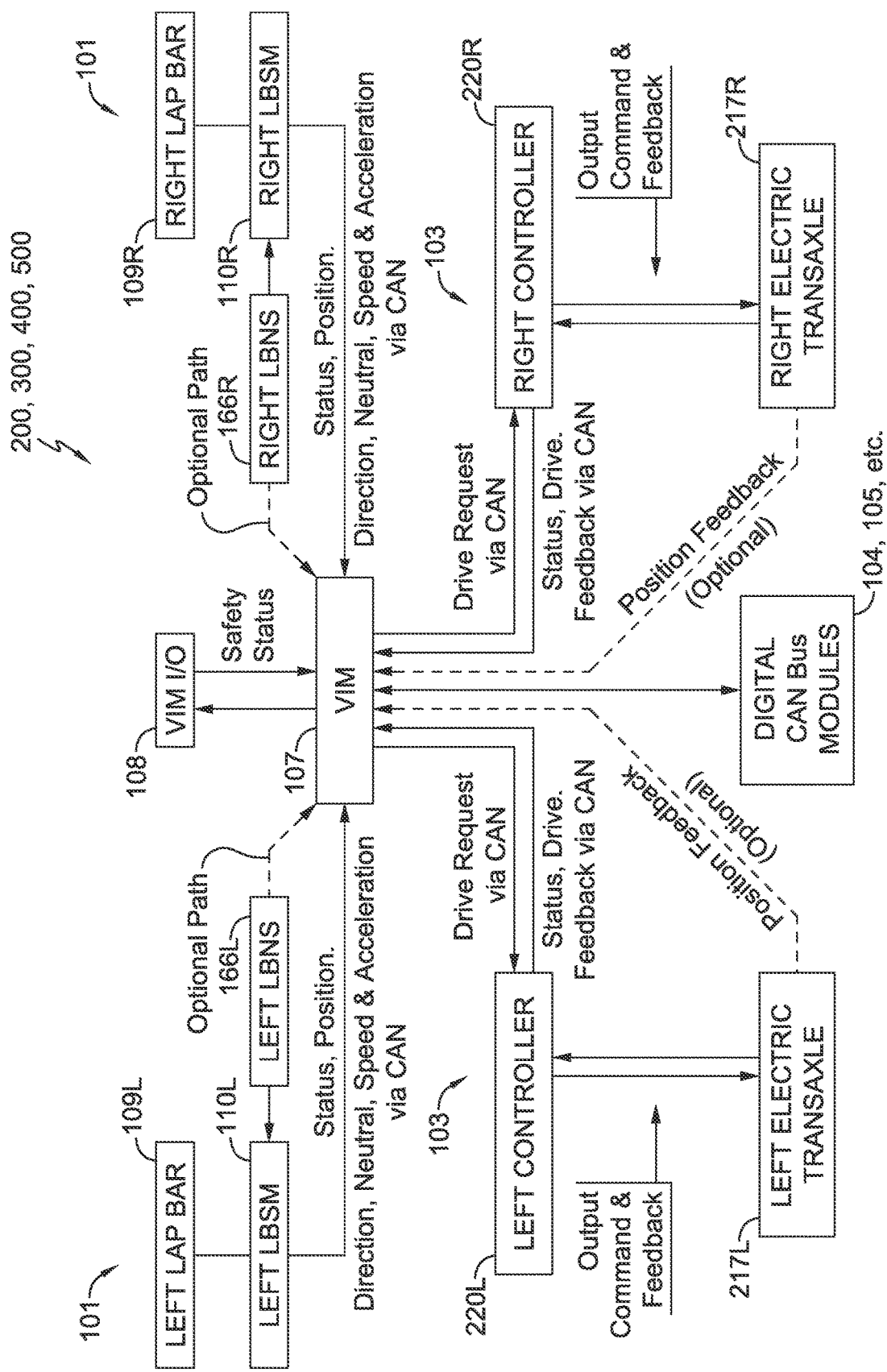
FIG. 13A is a schematic view of another aspect of the vehicle drive and control system shown in FIGS. 10A, 10B, and/or 10C.

The one or more Hall effect sensor circuit boards 255L, 255R comprising a Hall effect sensor in each of the respective left and right electronic controllers 220L, 220R may be configured to detect changes in the magnetic field of the left and right electric rotor shafts of electric motors 269L, 269R that are positioned in close proximity to the respective Hall effect sensor. The detected changes in the magnetic field correspond to a voltage that is communicated to the microprocessor 258L, 258R of the respective electronic controllers 220L, 220R. Based on the reported voltage, the microprocessor 258L, 258R may determine the difference between the user input commands (received in messages posted on the CAN-Bus 102 from the VIM 107) and the current rotational speed, rotational acceleration/deceleration, and/or direction of rotation of the left and right electric rotor shafts of electric motors 269L, 269R from which the direction of rotation, speed, and acceleration/deceleration of the drive axles 226L, 226R may be inferred. In some embodiments, a sensor, such as a Hall effect sensor, may also be positioned on or near the gear train of the respective electric motors 269L, 269R to provide added assurance that the movement of the gear train, drive axles 226L, 226R and/or other components in the left and right hybrid electric drive systems 121L, 121R: (1) corresponds with the operator-requested speed and direction of the vehicle, and optionally, (2) corresponds with other safety-related inputs received by VIM 107 to justify continued movement of the vehicle. To do this, the voltage output from this sensor may be posted directly on the CAN-Bus 102 for receipt and processing by VIM 107. Alternatively or additionally, as shown in FIG. 13A, respective left and right electric transaxles 217L, 217R position feedback sensors may be connected via dedicated electrical paths to respective I/O terminals, pins or ports of communications interface 183 of VIM 107 for receipt and processing of the sensor output voltage by VIM 107. Using the sensor output voltage, VIM 107 may verify actual motion against expected motion of one or more drive output component(s) in the gear train of the electric transaxles 217L, 217R as discussed above as well as confirm that the sensor voltage output lies within expected values and corresponds with safety-related messages received by VIM 107 via CAN-Bus 102 or via analog or digital inputs received via one or more terminals, pins or ports on communications interface 183 from one or more VIM I/O 108.

The proximity to one another and configuration of drive system 103 components on either the left or right sides of the drive system 103, such as left controller 220L, and left electric transaxle 217L on the one side, and right controller 220R and right electric transaxle 217R on the other, together with the relatively short 8 millisecond communication signals helps enable fast assessment and drive correction computations in response to changing input commands from the user. In other words, the relatively short distance for communication signals to travel together with the 8 millisecond reporting of both desired and current direction of rotation, speed, and acceleration of respective drive axles 226L, 226R helps enable respective electronic controllers 220L, 220R to compute new target directions and speeds for the respective left and right electric transaxles 217L, 217R according to the motion profile PID and feed forward algorithms to close the difference with a previously commanded drive output command from VIM 107 while also receiving new drive output commands from the VIM 107 which require a new output command from respective electronic controllers 220L, 220R. Once each electronic controller 220L, 220R determine what output to provide to respective left and right electric transaxles 217L, 217R, it does so immediately as described above.

VIM 107 of drive and control system 200 may also incorporate output messages posted by SCM 105. In some embodiments of drive and control system 200, SCM 105 may include IMU Module 130, which may include MPU 137 as discussed above for drive and control system 100. Functionality of SCM 105 and/or IMU 131 of drive and control system 200 may be the same or similar to that described above for drive and control system 100. Consequently, VIM 107 of drive and control system 200 may be configured to dynamically adjust the drive output signal to either the left or the right or to both the left and right electronic controllers 220L, 220R to keep driving in a straight line irrespective of small changes in the position of either lap bar 109L, 109R away from the forward 15 degree position (or any other generally parallel alignment), a tolerance parameter that may be tuned as discussed above. Thus, if the vehicle is being driven on a side hill, drive and control system 200 can be configured to automatically compensate for drift in heading of the vehicle, thereby reducing the workload of the user. The ability to automatically maintain the heading of the vehicle in this way may be switched on or off by the user as desired.

Figure 20:
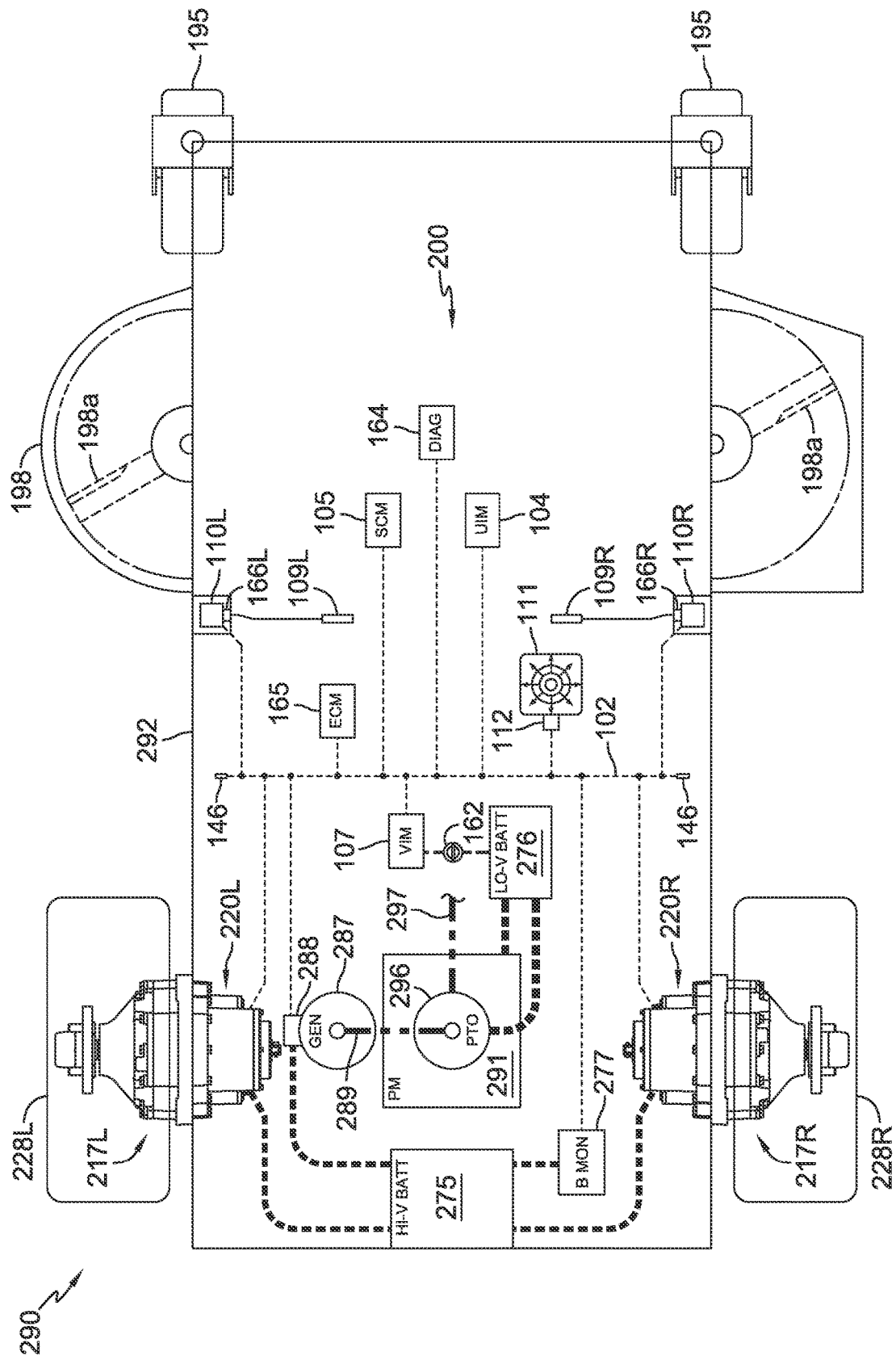
FIG. 20 is a schematic view of a hybrid vehicle incorporating a vehicle drive and control system in accordance with the instant disclosure.

FIG. 20 depicts a hybrid electric zero-turn vehicle 290 incorporating at least some aspects of the previously described drive and control system 200. Vehicle 290 may also include vehicle functionality and components described in U.S. Patent Application No. 62/702,086, filed Jul. 23, 2018, which is incorporated by reference herein in its entirety. As shown in the embodiment of FIG. 20, vehicle 290 includes a frame 292, a CAN-Bus network 102, left and right lap bars 109L, 109R, left and right LBSMs 110L, 110R, VIM 107 including VIM I/O 108, SCM 105, UIM 104, (optional) ECM 165, (optional) DIAG 164, electrical power source 106 including low voltage battery 276 (e.g., 12V) and high voltage battery 275 (e.g., 48V), a pair of caster wheels 195, and left and right hybrid electric drive systems 121L, 121R comprising left and right electronic controllers 220L, 220R coupled to left and right electric transaxles 217L, 217R via for driving left and right drive wheels 228L, 228R via left and right drive axles 226L, 226R.

Vehicle 290 also includes a prime mover 291 (e.g. an internal combustion engine), which drives a power take-off clutch/brake 296 that drives a power transfer assembly 297 (represented schematically as a belt and pulley assembly) to power blades 198a on mowing deck 198. Generator 287 is also connected to prime mover 291 by means of power transfer assembly 289 (represented schematically as a belt and pulley assembly) and controlled by generator controller 288. It should be noted that generator 287 may optionally be directly driven by an output shaft of prime mover 291. A high voltage battery 275 (e.g., 48V) is engaged to generator 287 and provides power to both of the left and right electric transaxles 217L, 217R.

In addition to or instead of left and right lap bars 109L, 109R and left and right LBSMs 110L, 110R, drive and control system 200 of vehicle 290 may include a joystick 111 that may be coupled to a joystick sensor module 112, and joystick sensor module 112 may be connected to CAN-Bus 102 to provide alternative steering and drive input. It will be understood that vehicle 290 may also include other steering and drive input systems 101, such as steering wheel 113, steering wheel sensor 114, foot pedals 115L, 115R, and foot pedal sensor modules 116L, 116R as described above. It will also be understood that the drive and control system 200 and related components of vehicle 290 shown herein can also be used in an autonomous vehicle.

A key switch 162 is disposed between low voltage battery 276 (e.g. 12V) and VIM 107, and low voltage battery 276 is connected to prime mover 291 and clutch/brake 296 for starting/stopping purposes. An optional battery monitor 277 may also be connected to CAN-Bus network 102 and high voltage battery 275, although battery monitor 277 could be connected directly to VIM 107 rather than to CAN-Bus network 102. For this embodiment, elements that may be identical to those described above are shown with identical numerals, whereas those elements that may be modified or connected differently are depicted with similar numerals but using a different prefix (e.g., prime mover 191 and prime mover 291).

Vehicle 290 may include an interface, such as a touch sensitive display screen, connected to drive and control system 200 for receiving user input. Further, by installing optional ECM 165, drive and control system 200, like drive and control system 100, may receive user input via a remote device (not shown) wirelessly connected to UIM 104 or to VIM 107 via Wi-Fi, cellular, satellite, Bluetooth, digital spectrum modulation (DSM) or other wireless protocols or technologies. All embodiments discussed in this application contemplate, and can accommodate, use of a remote device with UIM 104 or to VIM 107. In this embodiment, ECM 165 includes receiver components to accept commands from the remote control device, and may include optional processor components featuring onboard logic to process commands and liaise between the remote device and the UIM 104 or VIM 107. Although disclosed in FIG. 20 as a separate component, internal wireless functionality of ECM 165 can feature as part of VIM 107, thus preventing the need for connecting ECM 165 to the VIM 107.

ECM 165 connects to CAN-Bus 102 and permits a user to use a remote device to connect with vehicle 290. As a result, the remote device can communicate with UIM 104 or VIM 107 to enable the Start Relay, enable the Kill Relay, power mowing blade(s) 198a by disengaging the blades' associated electric clutch-brake-pulley mechanism (discussed above), and steer, drive, and return the vehicle to the neutral (no drive) setting.

Referring to FIGS. 10B, 11A, 12B, and 13A embodiments of drive and control system 300 for a fully electric vehicle are shown configured with left and right lap bars 109L, 109R, left and right LBSMs 110L, 110R, VIM 107, SCM 105, UIM 104, electrical power source 106, VIM I/O 108, and left and right fully electric drive systems 123L, 123R. In the embodiment shown in FIGS. 10B and 12B, VIM 107 is powered by electrical power source 106 comprising one or more batteries, such as high voltage battery 375 (e.g., 48V). VIM 107 is configured to provide electrical power to CAN-Bus 102. In this embodiment, high voltage battery 375 is designed to deliver approximately 48V to key switch 162, which when in the run position completes the circuit to provide 48V to voltage converter and battery monitor 378. In turn, voltage and battery monitor 378 provides approximately 12V to VIM 107 via emergency stop switch 379. In other embodiments, high voltage battery 375 may be sized to deliver any voltage suitable for powering electrical components connected thereto. CAN-Bus 102 may be configured to operate on approximately, 5V but may be any suitable voltage. High voltage battery 375 is also configured to provide 48V to one or more deck controllers 386. Deck controller 386 for controlling the operation of electric deck motors 385 for driving blades 398a and voltage converter and battery monitor 378 are connected to CAN-Bus 102 to provide status messages to VIM 107 via VIM I/O 108.

High voltage battery 375 is designed to deliver approximately 48V to left and right fully electric drive systems 123L, 123R, which include left and right electronic controllers 220L, 220R coupled to left and right electric transaxles 217L, 217R for driving left and right drive wheels 228L, 228R via left and right drive axles 226L, 226R. In some embodiments, left and right electronic controllers 220L, 220R may be packaged separately from the left and right electric transaxles 226L, 226R. Left and right electronic transaxles 217L, 217R of drive and control system 200 may include respective left and right gearboxes to transfer power from left and right electric drive motors 269L, 269R to respective left and right drive axles 226L, 226R. For example, left and right electric drive motors 269L, 269R may be coupled to the input end of the respective left and right gearboxes, and left and right drive axles 226L, 226R may be coupled to the output end of the respective left and right gearboxes. In some embodiments, left and right electronic controllers 220L, 220R may be integrated with or otherwise packaged together with respective left and right electric transaxles 217L, 217R.

FIG. 11A shows a detailed schematic view of left and right electronic controllers 220L, 220R coupled to CAN-Bus 102 for use with fully electric drive systems 123L, 123R. As described above for rive and control system 200, respective left and right electronic controllers 220L, 220R include a microprocessor 258L, 258R, non-volatile memory 261L, 261R, motor driver 257L, 257R, CAN-Bus interface 263L, 263R, and one or more Hall effect sensor circuit boards 255L, 255R comprising a Hall effect sensor for detecting rotational speed, position and/or direction of rotation of corresponding left and right electric rotor shafts of electric drive motors 269L, 269R. Left and right electronic controllers 220L, 220R of fully electric drive systems 123L, 123R are connected to and receive electrical power from electrical power source 106, such as high voltage battery 375 (e.g. 48V). In addition, left and right electronic controllers 220L, 220R are connected to CAN-Bus 102 via respective CAN-Bus interfaces 263L, 263R to communicate messages to and from CAN-Bus 102. Left and right electronic controllers 220L, 220R are connected to left and right electric transaxles 217L, 217R, respectively, to: (1) provide drive commands to the respective left and right electric transaxles 217L, 217R corresponding to a desired rotational speed, position and/or direction of rotation the left and right drive wheels 228L, 228R; (2) detect, via the Hall effect sensors of the Hall effect sensor circuit boards 255L, 255R, actual rotational speed, position and/or direction of rotation of the respective left and right electric drive motors 269L, 269R of the respective left and right electric transaxles 217L, 217R, (3) provide updated drive commands to the left and right electric transaxles 217L, 217R while taking into account the difference between the actual and the desired rotational speeds, positions and/or directions of rotation of the respective left and right electric drive motors 269L, 269R; and (3) repeat the detection step and the step of providing updated drive commands until the desired target rotational speed and direction of rotation of the left and right drive wheels 228L, 228R is achieved.

Left and right electronic controllers 220L, 220R of drive and control system 300 may function in the same or similar way as discussed above for drive and control systems 100, 200. For example, left and right electronic controllers 220L, 220R may monitor data packets or messages from other modules connected to CAN-Bus 102 and initiate a vehicle fail-safe mode if multiple data packets are lost or corrupted. Left and right electronic controllers 220L, 220R are configured to respond to speed, drive commands and diagnostic requests received over CAN-Bus 102. For example, when a drive message is posted on CAN-Bus 102 from VIM 107, each of the left and right electronic controllers 220L, 220R are configured to look for that message based on the sender's CAN ID (in this case the ID corresponding to VIM 107) and according to the CAN ID associated with the left and right electronic controllers 220L, 220R, respectively. Upon detecting that the message includes a drive command, each electronic controller 220L, 220R may be configured to: (1) determine the current direction of motion, speed, and acceleration of respective drive axles 226L, 226R or a transaxle component associated therewith or connected thereto, (2) determine if any difference exists between those values and the corresponding values in the incoming drive message and (3) if a difference exists beyond a predetermined threshold value, the respective left and right electronic controllers 220L, 220R may individually compute a new drive output command to the respective left and right electric transaxles 217L, 217R according to a motion profile PID algorithm selected to make up the difference while achieving a vehicle feel and operability desired by the user. For example, if the difference is large, rather than outputting an equivalent to a "maximum acceleration" to close the difference quickly, the PID algorithm may be selected to close the difference to zero by slowly ramping up the acceleration to avoid throwing the user off the vehicle. The PID algorithm may also incorporate a feed-forward (F) algorithm to better predict the needed target output. The drive and control system 300 of the instant disclosure may be configured to simulate the operation and feel to the user of any OEM utility vehicle by simulating the operation and feel of a non-drive-by-wire OEM vehicle using the tunable parameters discussed herein. For example, each electronic controller 220L, 220R may be configured to continuously compare actual rotational speed, position and/or direction of rotation to operator-requested speed and direction of the vehicle and drive respective electric transaxles 217L, 217R to the desired rotational speed, position and/or direction of rotation using the motion profile PID algorithm based on tunable parameters stored in the non-volatile memory 261L, 261R of each electronic controller 220L, 220R.

The one or more Hall effect sensor circuit boards 255L, 255R comprising a Hall effect sensor in each of the respective left and right electronic controllers 220L, 220R may be configured to detect changes in the magnetic field of the left and right electric rotor shafts of electric motors 269L, 269R that are positioned in close proximity to the respective Hall effect sensor. The detected changes in the magnetic field correspond to a voltage that is communicated to the microprocessor 258L, 258R of the respective electronic controllers 220L, 220R. Based on the reported voltage, the microprocessor 258L, 258R may determine the difference between the user input commands (received in messages posted on the CAN-Bus 102 from the VIM 107) and the current rotational speed, rotational acceleration/deceleration, and/or direction of rotation of the left and right electric rotor shafts of electric motors 269L, 269R from which the direction of rotation, speed, and acceleration of the drive axles 226L, 226R may be inferred. In some embodiments, a sensor, such as a Hall effect sensor, may also be positioned on or near the gear train of the respective electric motors 269L, 269R to provide added assurance that the movement of the gear train, drive axles 226L, 226R and/or other components in the left and right fully electric drive systems 123L, 123R: (1) corresponds with the operator-requested speed and direction of the vehicle, and optionally, (2) corresponds with other safety-related inputs received by VIM 107 to justify continued movement of the vehicle. To do this, the voltage output from this sensor may be posted directly on the CAN-Bus 102 for receipt and processing by VIM 107. Alternatively or additionally, as shown in FIG. 13A, respective left and right electric transaxles 217L, 217R position feedback sensors may be connected via dedicated electrical paths to respective I/O terminals, pins or ports of communications interface 183 of VIM 107 for receipt and processing of the sensor output voltage by VIM 107. Using the sensor output voltage, VIM 107 may verify actual motion against expected motion of one or more drive output component(s) in the gear train of the electric transaxles 217L, 217R as discussed above as well as confirm that the sensor voltage output lies within expected values and corresponds with safety-related messages received by VIM 107 via CAN-Bus 102 or via analog or digital inputs received via one or more terminals, pins or ports on communications interface 183 from one or more VIM I/O 108.

The proximity to one another and configuration of drive system 103 components on either the left or right sides of the drive system 103, such as left controller 220L, and left electric transaxle 217L on the one side, and right controller 220R and right electric transaxle 217R on the other, together with the relatively short 8 millisecond communication signals helps enable fast assessment and drive correction computations in response to changing input commands from the user. In other words, the relatively short distance for communication signals to travel together with the 8 millisecond reporting of both desired and current direction of rotation, speed, and acceleration of respective drive axles 226L, 226R helps enable respective electronic controllers 220L, 220R to compute new target directions and speeds for the respective left and right electric transaxles 217L, 217R according to the motion profile PID and feed forward algorithms to close the difference with a previously commanded drive output command from VIM 107 while also receiving new drive output commands from the VIM 107 which require a new output command from respective electronic controllers 220L, 220R. Once each electronic controller 220L, 220R determine what output to provide to respective left and right electric transaxles 217L, 217R, it does so immediately as described above.

VIM 107 of drive and control system 300 may also incorporate output messages posted by SCM 105. In some embodiments of drive and control system 300, SCM 105 may include IMU 130, which may include MPU 137 as discussed above for drive and control systems 100, 200. Functionality of SCM 105 and/or IMU 131 of drive and control system 300 may be the same or similar to that described above for drive and control systems 100, 200. Consequently, VIM 107 of drive and control system 300 may be configured to dynamically adjust the drive output signal to either the left or the right or to both the left and right electronic controllers 220L, 220R to keep driving in a straight line irrespective of small changes in the position of either lap bar 109L, 109R away from the forward 15 degree position (or any other generally parallel alignment), a tolerance parameter that may be tuned as discussed above. Thus, if the vehicle is being driven on a side hill, drive and control system 300 can be configured to automatically compensate for drift in heading of the vehicle, thereby reducing the workload of the user. The ability to automatically maintain the heading of the vehicle in this way may be switched on or off by the user as desired.

Figure 21:
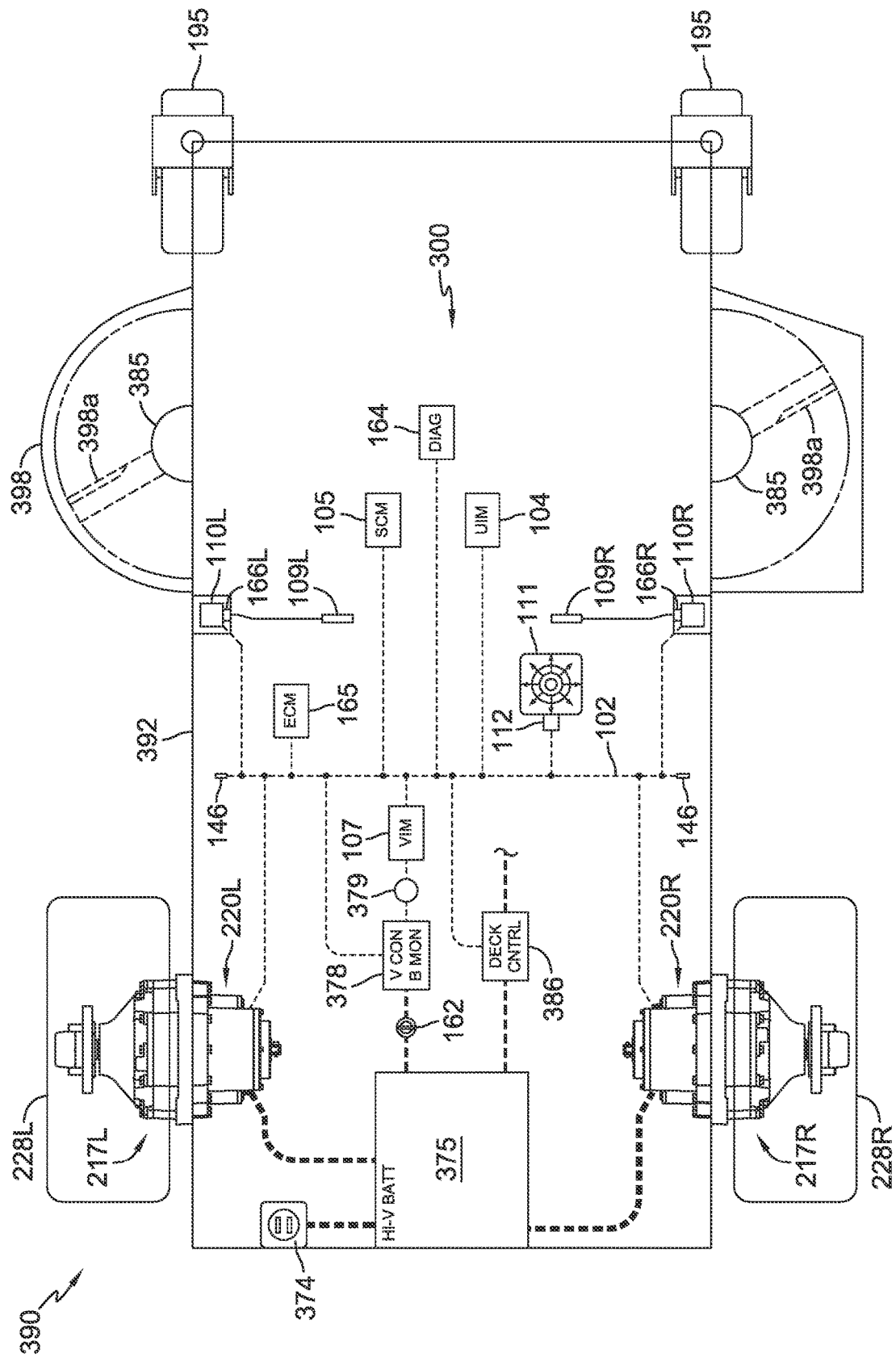
FIG. 21 is a schematic view of a fully electric vehicle incorporating a vehicle drive and control system in accordance with the instant disclosure.

FIG. 21 depicts a fully electric zero turn vehicle 390, which is similar in many respects to vehicle 290, but which incorporates at least some aspects of the drive and control system 300 described above. In this embodiment, vehicle 390 includes a frame 392, a CAN-Bus network 102, left and right lap bars 109L, 109R, left and right LBSMs 110L, 110R, VIM 107 including VIM I/O 108, SCM 105, UIM 104, (optional) ECM 165, (optional) DIAG 164, electrical power source 106 including high voltage battery 375 (e.g., 48V) that is connected to a charge receptacle 374, a pair of caster wheels 195, and left and right fully electric drive systems 123L, 123R comprising left and right electronic controllers 220L, 220R coupled to left and right electric transaxles 217L, 217R for driving left and right drive wheels 228L, 228R via left and right drive axles 226L, 226R. Blades 398a of mower deck 398 are powered by electric deck motors 385 connected to and controlled by deck controller 386.

In addition to or instead of left and right lap bars 109L, 109R and left and right LBSMs 110L, 110R, drive and control system 300 of vehicle 390 may include a joystick 111 that may be coupled to a joystick sensor module 112, and joystick sensor module 112 may be connected to CAN-Bus 102 to provide alternative steering and drive input. It will be understood that vehicle 390 may also include other steering and drive input systems 101, such as steering wheel 113, steering wheel sensor 114, foot pedals 115L, 115R, and foot pedal sensor modules 116L, 116R as described above. It will also be understood that the drive and control system 300 and related components of vehicle 390 shown herein can also be used in an autonomous vehicle.

A key switch 162 is disposed between high voltage battery 375 (e.g. 48V) and voltage controller and battery monitor 378, and emergency stop switch 379 is disposed between voltage controller and battery monitor 378 and VIM 107. VIM 107 and voltage controller and battery monitor 378 are both connected to CAN-Bus 102. Deck controller 386 may optionally be an analog device and wired directly to the VIM 107. Similar to the previous embodiment, an optional battery monitor 277 may also be connected to network 102 and high voltage battery 375, although battery monitor 277 could be connected directly to VIM 107 rather than to network 102.

Vehicle 390 may include an interface, such as a touch sensitive display screen, connected to drive and control system 300 for receiving user input. Further, by installing optional ECM 165, drive and control system 300, like drive and control system 100 and 200, may receive user input via a remote device (not shown) wirelessly connected to UIM 104 or to VIM 107 via Wi-Fi, cellular, satellite, Bluetooth, digital spectrum modulation (DSM) or other wireless protocols or technologies. All embodiments discussed in this application contemplate, and can accommodate, use of a remote device with UIM 104 or to VIM 107. In this embodiment, ECM 165 includes receiver components to accept commands from the remote control device, and may include optional processor components featuring onboard logic to process commands and liaise between the remote device and the UIM 104 or VIM 107. Although disclosed in FIG. 21 as a separate component, internal wireless functionality of ECM 165 can feature as part of VIM 107, thus preventing the need for connecting ECM 165 to the VIM 107.

ECM 165 connects to CAN-Bus 102 and permits a user to use a remote device to connect with vehicle 390. As a result, the remote device can communicate with UIM 104 or VIM 107 to enable operation of any of the components of vehicle 390.

Figure 10A:
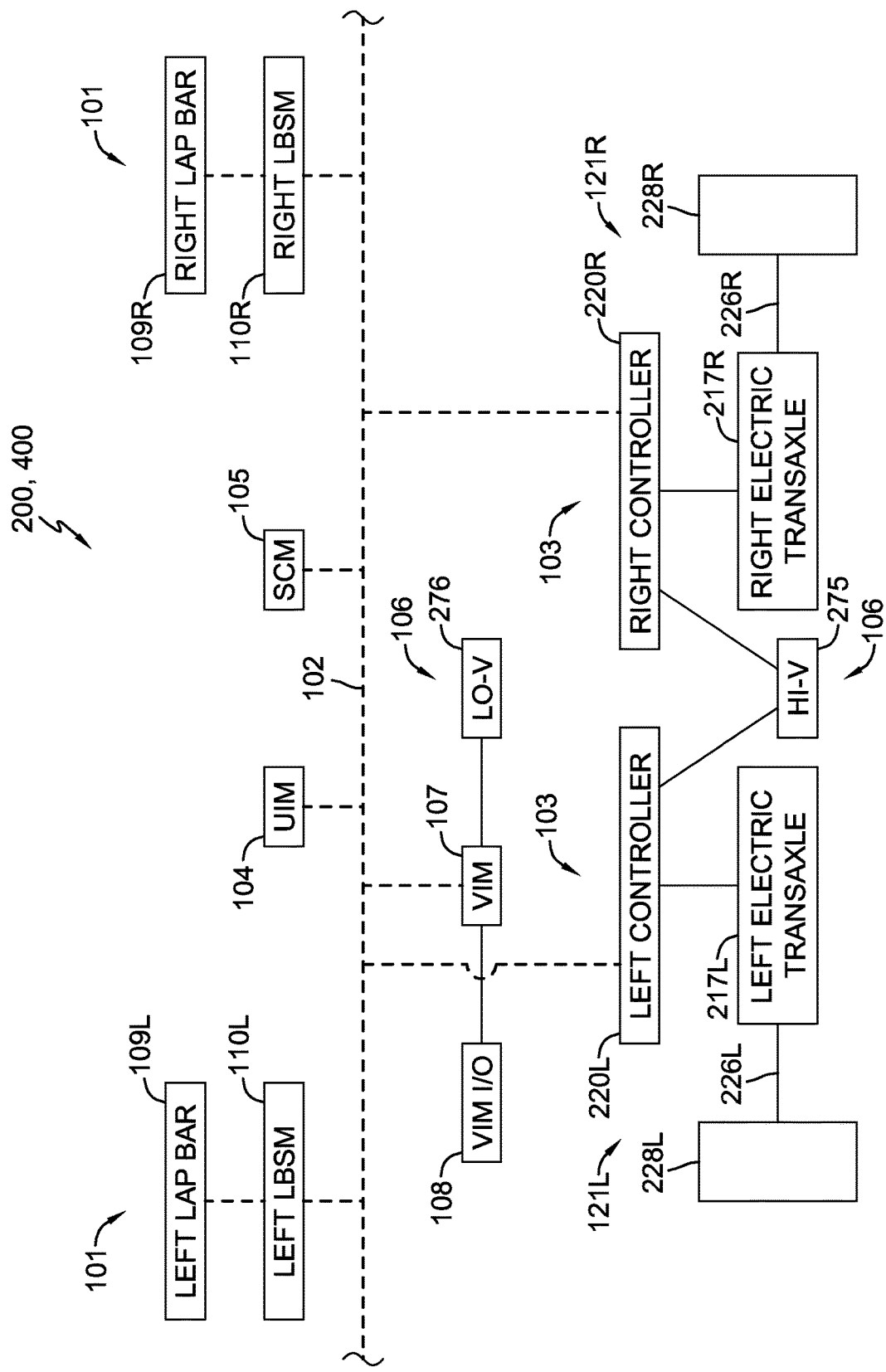
Figure 10B:
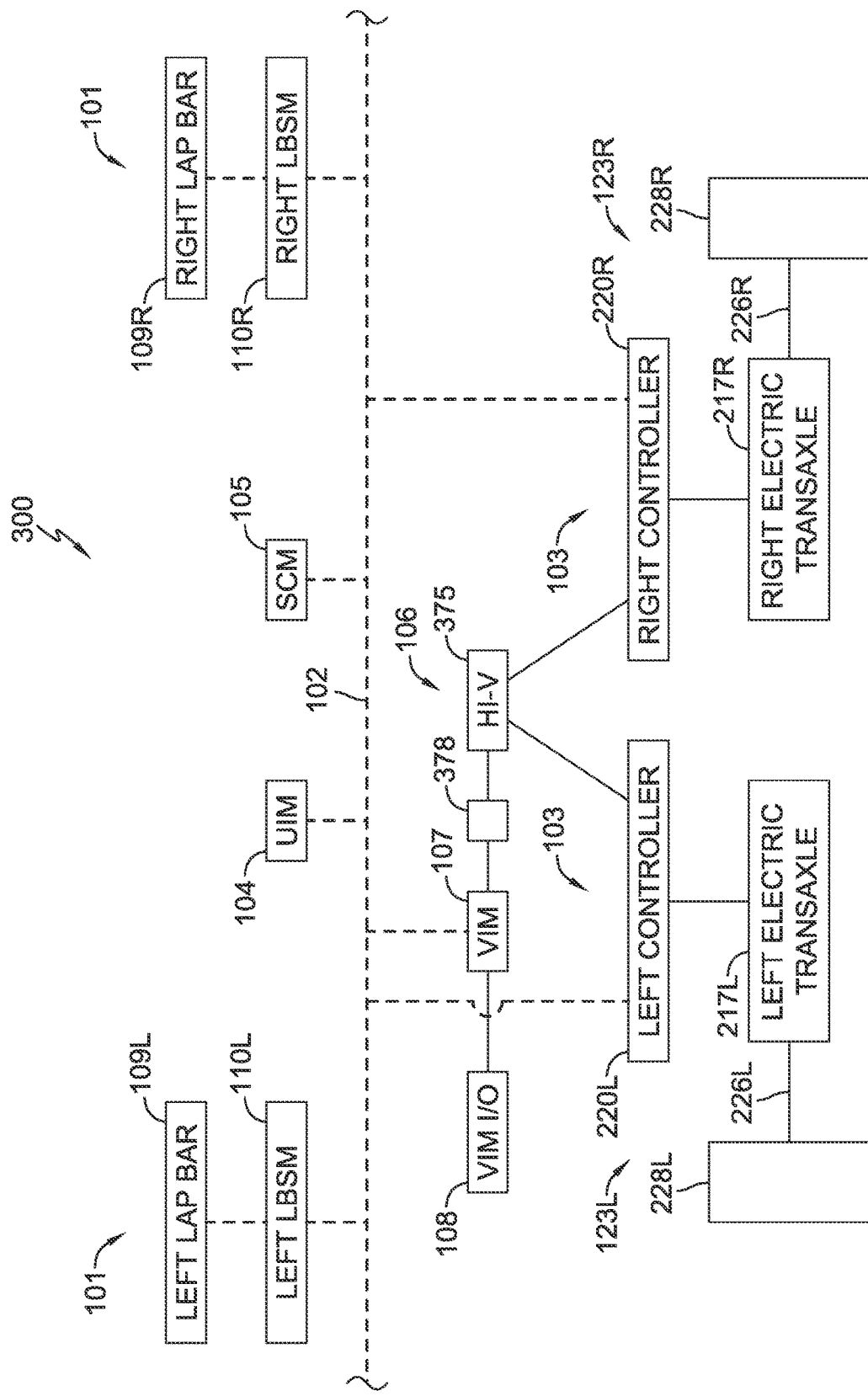
Figure 12C:
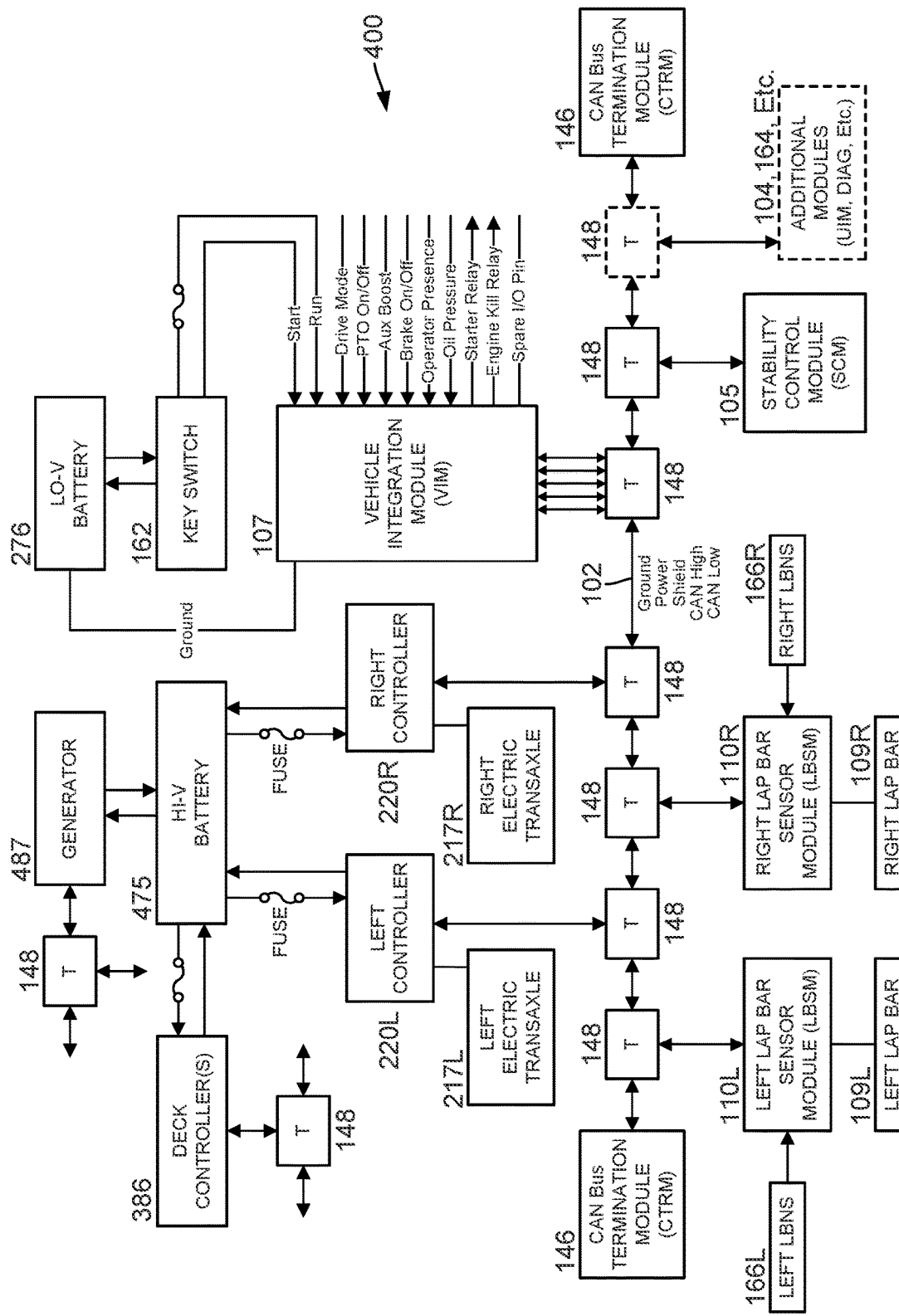
FIG. 12C is a schematic view of another aspect of the vehicle drive and control system shown in FIG. 10A.

Referring to FIGS. 10A, 11A, 12C, and 13A, embodiments of drive and control system 400 for a hybrid vehicle are shown that are similarly configured to that previously shown and described for drive and control system 200 but with a few differences. For example, as shown in FIGS. 10A and 12C, unlike drive and control system 200, drive and control system 400 includes high voltage battery 475 configured to provide 48V to one or more deck controllers 386 coupled to CAN-Bus 102 for controlling the operation of one or more electric deck motors for driving one or more power-takeoff implements. In addition, drive and control system 400 includes a generator 487 that is coupled to CAN-Bus 102. As described above for drive and control system 200, left and right electronic transaxles 217L, 217R of drive and control system 400 may include respective left and right gearboxes to transfer power from left and right electric drive motors 269L, 269R to respective left and right drive axles 226L, 226R. For example, left and right electric drive motors 269L, 269R may be coupled to the input end of the respective left and right gearboxes, and left and right drive axles 226L, 226R may be coupled to the output end of the respective left and right gearboxes.

Figure 22:
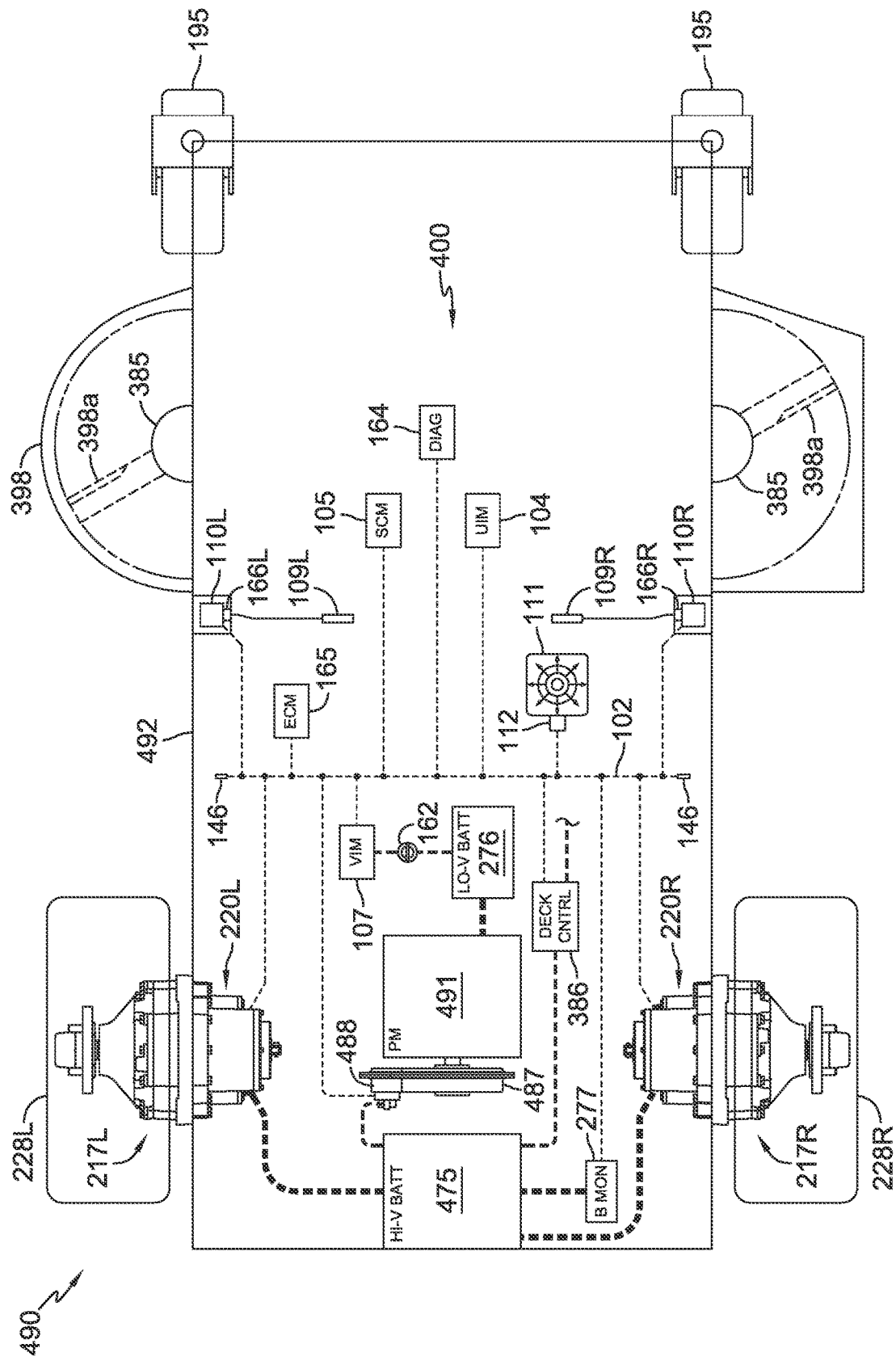
FIG. 22 is a schematic view of a another hybrid vehicle incorporating a vehicle drive and control system in accordance with the instant disclosure.

FIG. 22 depicts another hybrid electric zero-turn vehicle 490, which is similar in many respects to vehicles 290 and 390, but which incorporates at least some aspects of the drive and control system 400 described above. In this embodiment, vehicle 490 includes a frame 492, a CAN-Bus network 102, left and right lap bars 109L, 109R, left and right LBSMs 110L, 110R, VIM 107 including VIM I/O 108, SCM 105, UIM 104, (optional) ECM 165, (optional) DIAG 164, electrical power source 106 including low voltage battery 276 (e.g., 12V) and high voltage battery 475 (e.g., 48V), a pair of caster wheels 195, and left and right hybrid electric drive systems 121L, 121R comprising left and right electronic controllers 220L, 220R coupled to left and right electric transaxles 217L, 217R for driving left and right drive wheels 228L, 228R via left and right drive axles 226L, 226R. Blades 398a of mower deck 398 are powered by electric deck motors 385 connected to and controlled by deck controller 386.

Vehicle 490 also includes a prime mover 491 (e.g. an internal combustion engine), which drives a generator 487. Generator 487, which is controlled by generator controller 488 connected to CAN-Bus 102, is driven directly by a horizontal output shaft of prime mover 491. Generator 487 may optionally be driven by a vertical output shaft of a prime mover or by a power transfer assembly as depicted in vehicle 290. A horizontal output shaft configuration of prime mover 491 may be employed to improve ground clearance of vehicle 490 and better protect generator 487 (and associated electrical connections and cables) by enabling interposition of plate or other guard structures between the ground (or turf) and components such as prime mover 491 and generator 487.

In addition to or instead of left and right lap bars 109L, 109R and left and right LBSMs 110L, 110R, drive and control system 400 of vehicle 490 may include a joystick 111 that may be coupled to a joystick sensor module 112, and joystick sensor module 112 may be connected to CAN-Bus 102 to provide alternative steering and drive input. It will be understood that vehicle 490 may also include other steering and drive input systems 101, such as steering wheel 113, steering wheel sensor 114, foot pedals 115L, 115R, and foot pedal sensor modules 116L, 116R as described above. It will also be understood that the drive and control system 400 and related components of vehicle 490 shown herein can also be used in an autonomous vehicle.

A key switch 162 is disposed between low voltage battery 276 (e.g. 12V) and VIM 107, and low voltage battery 276 is connected to prime mover 491. An optional battery monitor 277 may also be connected to CAN-Bus 102 and high voltage battery 475, although battery monitor 277 could be connected directly to VIM 107 rather than to Can-Bus 102. For this embodiment, elements that may be identical to those described above are shown with identical numerals, whereas those elements that may be modified or connected differently are depicted with similar numerals but using a different prefix (e.g., battery 275, battery 375 and battery 475). Deck controller 386 may optionally be an analog device and wired directly to the VIM 107.

Vehicle 490 may include an interface, such as a touch sensitive display screen, connected to drive and control system 400 for receiving user input. Further, by installing optional ECM 165, drive and control system 400, like drive and control system 100, 200 and 300, may receive user input via a remote device (not shown) wirelessly connected to UIM 104 or to VIM 107 via Wi-Fi, cellular, satellite, Bluetooth, digital spectrum modulation (DSM) or other wireless protocols or technologies. All embodiments discussed in this application contemplate, and can accommodate, use of a remote device with UIM 104 or to VIM 107. In this embodiment, ECM 165 includes receiver components to accept commands from the remote control device, and may include optional processor components featuring onboard logic to process commands and liaise between the remote device and the UIM 104 or VIM 107. Although disclosed in FIG. 22 as a separate component, internal wireless functionality of ECM 165 can feature as part of VIM 107, thus preventing the need for connecting ECM 165 to the VIM 107.

ECM 165 connects to CAN-Bus 102 and permits a user to use a remote device to connect with vehicle 490. As a result, the remote device can communicate with UIM 104 or VIM 107 to enable operation of any of the components of vehicle 490.

Figure 10C:
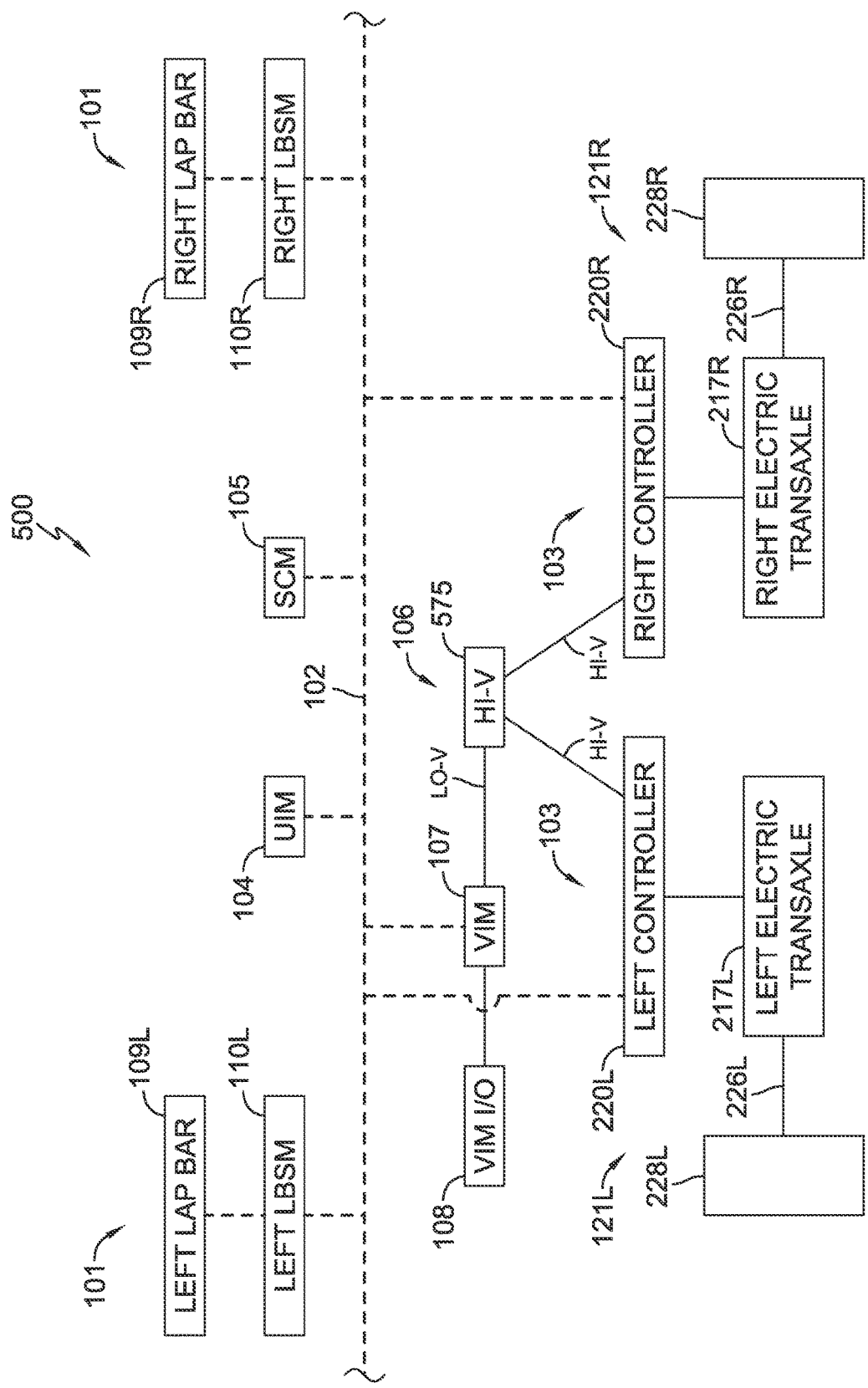
Figure 12D:
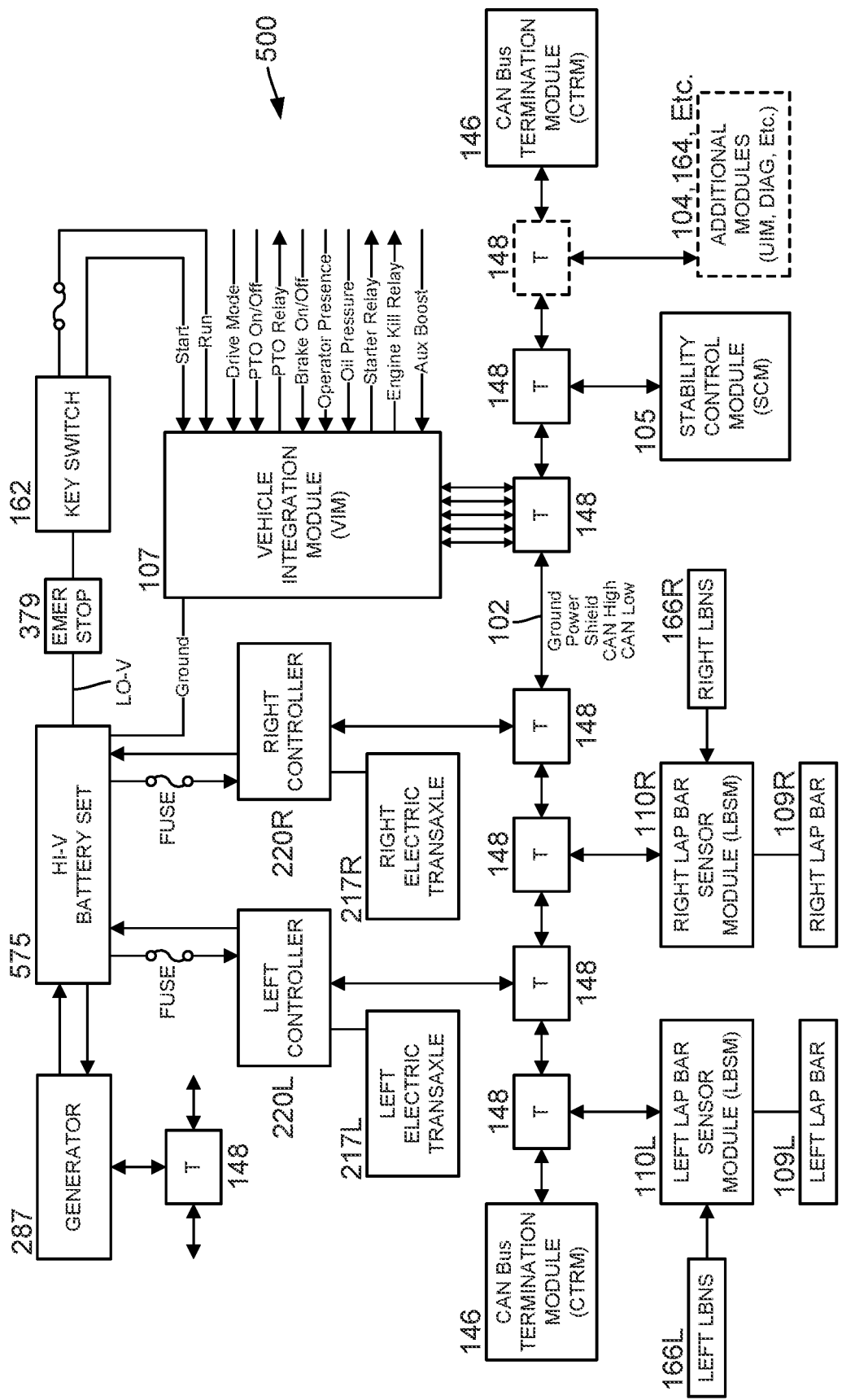
FIG. 12D is a schematic view of another aspect of the vehicle drive and control system shown in FIG. 10C.

Referring to FIGS. 10C, 11A, 12D, and 13A, embodiments of drive and control system 500 for a hybrid vehicle are shown that are similarly configured to that previously shown and described for drive and control systems 200, but which incorporates some of the features of drive and control systems 300 and 400. For example, as shown in FIGS. 10C and 12D, drive and control system 500 includes high voltage battery 575 configured to provide 48V to (1) drive left and right hybrid electric drive systems 121L, 121R, which include left and right electronic controllers 220L, 220R coupled to left and right electric transaxles 217L, 217R for driving left and right drive wheels 228L, 228R via left and right drive axles 226L, 226R, and to provide (2) one or more deck controllers 386 coupled to CAN-Bus 102 for controlling the operation of one or more electric deck motors for driving one or more power-takeoff implements. In addition, drive and control system 500 includes a generator 587 that is coupled to CAN-Bus 102. In this embodiment, high voltage battery 575 is designed to deliver approximately 12V via a voltage filter to key switch 162 which when in the run position completes the circuit to provide 12V to VIM 107. Similar to drive and control system 200, left and right electronic transaxles 217L, 217R of drive and control system 500 may include respective left and right gearboxes to transfer power from left and right electric drive motors 269L, 269R to respective left and right drive axles 226L, 226R. For example, left and right electric drive motors 269L, 269R may be coupled to the input end of the respective left and right gearboxes, and left and right drive axles 226L, 226R may be coupled to the output end of the respective left and right gearboxes.

Figure 23:
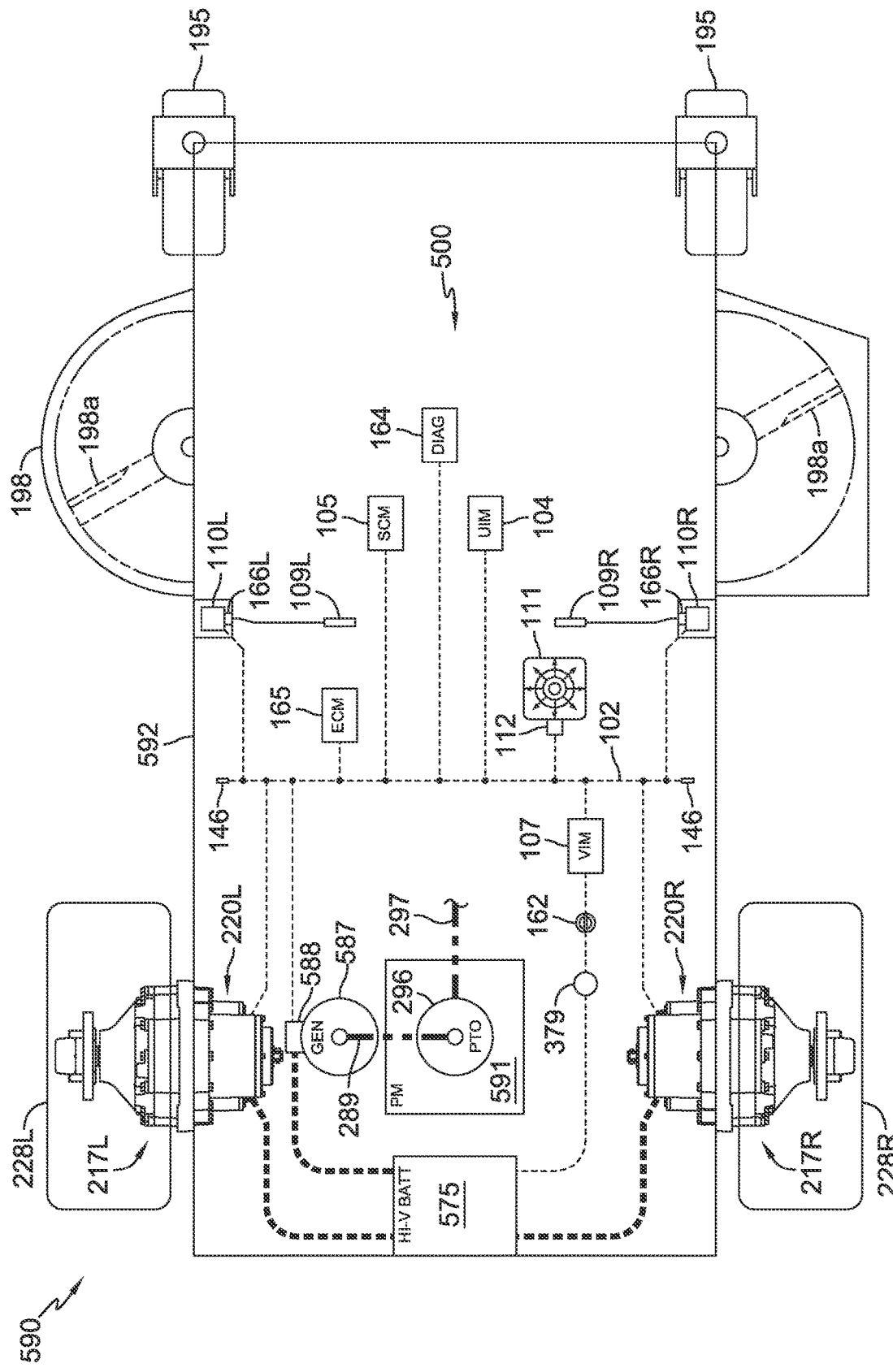
FIG. 23 is a schematic view of another hybrid vehicle incorporating a vehicle drive and control system in accordance with the instant disclosure.

FIG. 23 depicts another hybrid electric zero-turn vehicle 590, which is similar in many respects to vehicle 290, 390, and 490, but which incorporates at least some aspects of the drive and control system 500 described above. In this embodiment, vehicle 590 includes a frame 592, a CAN-Bus network 102, left and right lap bars 109L, 109R, left and right LBSMs 110L, 110R, VIM 107 including VIM I/O 108, SCM 105, UIM 104, (optional) ECM 165, (optional) DIAG 164, electrical power source 106 including high voltage battery 575 (e.g., 48V), a pair of caster wheels 195, and left and right hybrid electric drive systems 121L, 121R comprising left and right electronic controllers 220L, 220R coupled to left and right electric transaxles 217L, 217R via for driving left and right drive wheels 228L, 228R via left and right drive axles 226L, 226R.

Vehicle 590 also includes a prime mover 591 (e.g. an internal combustion engine), which drives a power take-off clutch/brake 296 that drives a power transfer assembly 297 (represented schematically as a belt and pulley assembly) to power blades 198a on mowing deck 198. Generator 587 is also connected to prime mover 591 by means of power transfer assembly 289 (represented schematically as a belt and pulley assembly) and controlled by generator controller 588. It should be noted that generator 587 may optionally be directly driven by an output shaft of prime mover 591. A high voltage battery 575 (e.g., 48V) is engaged to generator 587 and provides power to both of the left and right electric transaxles 217L, 217R.

In addition to or instead of left and right lap bars 109L, 109R and left and right LBSMs 110L, 110R, drive and control system 500 of vehicle 590 may include a joystick 111 that may be coupled to a joystick sensor module 112, and joystick sensor module 112 may be connected to CAN-Bus 102 to provide alternative steering and drive input. It will be understood that vehicle 290 may also include other steering and drive input systems 101, such as steering wheel 113, steering wheel sensor 114, foot pedals 115L, 115R, and foot pedal sensor modules 116L, 116R as described above. It will also be understood that the drive and control system 200 and related components of vehicle 290 shown herein can also be used in an autonomous vehicle.

A key switch 162 is disposed between emergency stop switch 379 and VIM 107. For this embodiment, elements that may be identical to those described above are shown with identical numerals, whereas those elements that may be modified or connected differently are depicted with similar numerals but using a different prefix (e.g., prime mover 191, 291, 391, and 591).

Vehicle 590 may include an interface, such as a touch sensitive display screen, connected to drive and control system 500 for receiving user input. Further, by installing optional ECM 165, drive and control system 500, may receive user input via a remote device (not shown) wirelessly connected to UIM 104 or to VIM 107 via Wi-Fi, cellular, satellite, Bluetooth, digital spectrum modulation (DSM) or other wireless protocols or technologies. All embodiments discussed in this application contemplate, and can accommodate, use of a remote device with UIM 104 or to VIM 107. In this embodiment, ECM 165 includes receiver components to accept commands from the remote control device, and may include optional processor components featuring onboard logic to process commands and liaise between the remote device and the UIM 104 or VIM 107. Although disclosed in FIG. 23 as a separate component, internal wireless functionality of ECM 165 can feature as part of VIM 107, thus preventing the need for connecting ECM 165 to the VIM 107.

ECM 165 connects to CAN-Bus 102 and permits a user to use a remote device to connect with vehicle 590. As a result, the remote device can communicate with UIM 104 or VIM 107 to enable the Start Relay, enable the Kill Relay, power mowing blade(s) 198a by disengaging the blades' associated electric clutch-brake-pulley mechanism (discussed above), and steer, drive, and return the vehicle to the neutral (no drive) setting.

While the invention has been described in connection with what is presently considered to be the most practical and preferred embodiment, it is to be understood that the invention is not to be limited to the disclosed embodiment(s). Rather, the invention is intended to cover various modifications and equivalent arrangements included within the spirit and scope of the appended claims, which scope is to be accorded the broadest interpretation so as to encompass all such modifications and equivalent structures as permitted under the law. It should also be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

Having described the invention in detail with reference to certain preferred embodiments, it will be understood that modifications and variations exist within the scope and spirit of the present disclosure.

What is claimed is:

1. A lawn mower, comprising:
 a CAN-Bus operable to communicate signals to and from one or more vehicle components;
 a plurality of controllers coupled to the CAN-Bus, each of the plurality of controllers comprising a respective microprocessor and a respective memory;
 a first traction wheel and a second traction wheel disposed on opposing sides of the lawn mower;
 a first electric drive motor configured to drive the first traction wheel;
 a second electric drive motor configured to drive the second traction wheel;
 a steering input device configured to receive a first user input for a desired direction of motion;
 one or more drive input devices configured to receive a second user input for a desired speed of motion;
 a steering input sensor connected to the steering input device, wherein the steering input sensor is configured to detect a steering input position of the steering input device and post, on the CAN-Bus, a steering input signal that corresponds with the steering input position; and
 a drive input sensor connected to the one or more drive input devices, wherein the drive input sensor is configured to detect a drive input position of the one or more drive input devices and post, on the CAN-Bus, a drive input signal that corresponds with the drive input position;

wherein the plurality of controllers are configured to collectively:
  receive the steering input signal and the drive input signal on the CAN-Bus; and
  generate, based on the steering input signal and the drive input signal, a first drive signal to drive the first electric drive motor and a second drive signal to drive the second electric drive motor to obtain the desired speed of motion and the desired direction of motion.

2. The lawn mower of claim 1, further comprising a first position feedback sensor associated with the first electric drive motor, and a second position feedback sensor associated with the second electric drive motor.

3. The lawn mower of claim 2, wherein the plurality of controllers are further configured to collectively generate the first drive signal and the second drive signal further based on a first actual position and a second actual position.

4. The lawn mower of claim 2, further comprising:
  a first transaxle including the first electric drive motor, a first gear train, and the first position feedback sensor, wherein the first position feedback sensor is configured to detect a first actual position of the first gear train; and
  a second transaxle including the second electric drive motor, a second gear train, and the second position feedback sensor, wherein the second position feedback sensor is configured to detect a second actual position of the second gear train.

5. The lawn mower of claim 4, wherein the plurality of controllers are further configured to collectively generate the first drive signal and the second drive signal further based on the first actual position and the second actual position.

6. The lawn mower of claim 1, wherein the plurality of controllers are further configured to collectively:
  update the first drive signal based on a comparison of a first expected motion to a first actual motion associated with the first electric drive motor; and
  update the second drive signal based on a comparison of a second expected motion to a second actual motion associated with the second electric drive motor.

7. The lawn mower of claim 1, wherein each of the first drive signal and the second drive signal includes a direction of rotation and at least one of a speed or an acceleration.

8. The lawn mower of claim 1, wherein the plurality of controllers comprise:
  a first controller configured to use a first motion profile algorithm based on first tunable parameters stored in a first memory of the first controller to individually drive the first electric drive motor; and
  a second controller configured to use a second motion profile algorithm based on second tunable parameters stored in a second memory of the second controller to individually drive the second electric drive motor.

9. The lawn mower of claim 1, wherein the plurality of controllers are configured to send, via the CAN-Bus, a control signal to reduce a travel speed of the lawn mower to a predetermined speed, irrespective of the steering input position and of the steering input device and the drive input position of the one or more drive input devices, in response to receiving or detecting one or more fault conditions, errors, or data lying outside of predetermined ranges or limits.

10. The lawn mower of claim 1, wherein one or more of the plurality of controllers are configured to process a blade auxiliary boost input signal to at least maintain constant rotation of at least one mowing blade under increased load or increased travel speed of the lawn mower.

11. The lawn mower of claim 1, wherein the steering input device includes a steering wheel, and wherein the one or more drive input devices include one or more pedals.

12. A utility vehicle, comprising:
  a vehicle bus operable to communicate signals to and from one or more vehicle components;
  a plurality of controllers;
  a first traction wheel and a second traction wheel disposed on opposing sides of the utility vehicle;
  a first electric drive motor configured to drive the first traction wheel;
  a second electric drive motor configured to drive the second traction wheel;
  a steering wheel configured to receive a first user input for a desired direction of motion;
  one or more pedals configured to receive a second user input for a desired speed of motion;
  a steering input sensor connected to the steering wheel, wherein the steering input sensor is configured to detect a steering input position of the steering wheel and transmit, via the vehicle bus, a steering input signal that corresponds with the steering input position; and
  a drive input sensor connected to the one or more pedals, wherein the drive input sensor is configured to detect a drive input position of the one or more pedals and transmit, via the vehicle bus, a drive input signal that corresponds with the drive input position;
  wherein the plurality of controllers are configured to collectively:
    receive the steering input signal and the drive input signal via the vehicle bus; and
    generate, based on the steering input signal and the drive input signal, a first drive signal to drive the first electric drive motor and a second drive signal to drive the second electric drive motor to obtain the desired speed of motion and the desired direction of motion.

13. The utility vehicle of claim 12, further comprising a first position feedback sensor associated with the first electric drive motor, and a second position feedback sensor associated with the second electric drive motor.

14. The utility vehicle of claim 13, wherein the plurality of controllers are further configured to collectively generate the first drive signal and the second drive signal further based on a first actual position and a second actual position.

15. The utility vehicle of claim 13, further comprising:
  a first transaxle including the first electric drive motor, a first gear train, and the first position feedback sensor, wherein the first position feedback sensor is configured to detect a first actual position of the first gear train; and
  a second transaxle including the second electric drive motor, a second gear train, and the second position feedback sensor, wherein the second position feedback sensor is configured to detect a second actual position of the second gear train.

16. The utility vehicle of claim 15, wherein the plurality of controllers are further configured to collectively generate the first drive signal and the second drive signal further based on the first actual position and the second actual position.

17. The utility vehicle of claim 12, wherein the plurality of controllers are further configured to collectively:
  update the first drive signal based on a comparison of first expected motion and a first actual motion associated with the first electric drive motor; and update the second drive signal based on a comparison of a second expected motion and a second actual motion associated with the second electric drive motor.

18. A utility vehicle, comprising:
a plurality of controllers;
a first traction wheel and a second traction wheel disposed on opposing sides of the utility vehicle;
a first electric drive motor configured to drive the first traction wheel;
a second electric drive motor configured to drive the second traction wheel;
a steering input device configured to receive a first user input for a desired direction of motion;
one or more drive input devices configured to receive a second user input for a desired speed of motion;
a steering input sensor connected to the steering input device, wherein the steering input sensor is configured to detect a steering input position of the steering input device and transmit a steering input signal that corresponds with the steering input position; and
a drive input sensor connected to the one or more drive input devices, wherein the drive input sensor is configured to detect a drive input position of the one or more drive input devices and transmit a drive input signal that corresponds with the drive input position;
wherein the plurality of controllers are configured to collectively:
receive the steering input signal and the drive input signal; and
generate, based on the steering input signal and the drive input signal, a first drive signal to drive the first electric drive motor and a second drive signal to drive the second electric drive motor to obtain the desired speed of motion and the desired direction of motion.

19. The utility vehicle of claim 18, further comprising a first position feedback sensor associated with the first electric drive motor, and a second position feedback sensor associated with the second electric drive motor.

20. The utility vehicle of claim 19, wherein the plurality of controllers are further configured to collectively generate the first drive signal and the second drive signal further based on a first actual position and a second actual position.

21. The utility vehicle of claim 19, further comprising:
a first transaxle including the first electric drive motor, a first gear train, and the first position feedback sensor, wherein the first position feedback sensor is configured to detect a first actual position of the first gear train; and
a second transaxle including the second electric drive motor, a second gear train, and the second position feedback sensor, wherein the second position feedback sensor is configured to detect a second actual position of the second gear train.

22. The utility vehicle of claim 21, wherein the plurality of controllers are further configured to collectively generate the first drive signal and the second drive signal further based on the first actual position and the second actual position.

23. The utility vehicle of claim 18, wherein the plurality of controllers are configured to continuously:
update the first drive signal based on a comparison of a first expected motion and a first actual motion of the first electric drive motor; and
update the second drive signal based on a comparison of compare a second expected motion and a second actual motion of the second electric drive motor.

24. The utility vehicle of claim 18, wherein each of the first drive signal and the second drive signal includes a direction of rotation and at least one of a speed or an acceleration.

25. The utility vehicle of claim 18, wherein the plurality of controllers comprise:
a first controller configured to use a first motion profile algorithm based on first tunable parameters stored in a first memory of the first controller to individually drive the first electric drive motor; and
a second controller configured to use a second motion profile algorithm based on second tunable parameters stored in a second memory of the second controller to individually drive the second electric drive motor.

26. The utility vehicle of claim 18, wherein the plurality of controllers are configured to send a control signal to reduce a travel speed of the utility vehicle to a predetermined speed, irrespective of the steering input position of the steering input device and the drive input position of the one or more drive input devices, in response to receiving or detecting one or more fault conditions, errors, or data lying outside of predetermined ranges or limits.

27. The utility vehicle of claim 18, wherein one or more of the plurality of controllers are configured to process a blade auxiliary boost input signal to at least maintain constant rotation of at least one mowing blade under increased load or increased travel speed of the utility vehicle.

28. The utility vehicle of claim 18, wherein the steering input device includes a steering wheel, and wherein the one or more drive input devices include one or more pedals.

* * * * *